US007097407B2

(12) United States Patent
Kurohori et al.

(10) Patent No.: US 7,097,407 B2
(45) Date of Patent: Aug. 29, 2006

(54) MOUNTING STRUCTURE FOR MOUNTING FOLDABLE TWO-WHEEL VEHICLE ON FOUR-WHEEL VEHICLE

(75) Inventors: Seiichi Kurohori, Saitama (JP); Hiromi Furuhashi, Saitama (JP); Masayoshi Orita, Saitama (JP); Tsutomu Harano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 194 days.

(21) Appl. No.: 10/231,106

(22) Filed: Aug. 30, 2002

(65) Prior Publication Data

US 2003/0080535 A1 May 1, 2003

(30) Foreign Application Priority Data

Sep. 4, 2001 (JP) ............................. 2001-267854

(51) Int. Cl.
*B62D 33/04* (2006.01)
(52) U.S. Cl. .................. 414/462; 414/545; 414/556; 296/37.6; 410/3
(58) Field of Classification Search ............ 414/462, 414/498, 537, 541, 545, 556; 410/3, 6, 7, 410/30; 280/278, 287; 180/208; 224/924; 296/37.6, 205
See application file for complete search history.

(56) References Cited

U.S. PATENT DOCUMENTS

| | | | | |
|---|---|---|---|---|
| 1,990,757 A | * | 2/1935 | Stlles .......................... 293/127 |
| 2,616,754 A | * | 11/1952 | Stahl ........................ 296/183.1 |
| 3,245,713 A | * | 4/1966 | Ogilvie ....................... 296/37.6 |
| 3,354,976 A | * | 11/1967 | Javier .......................... 180/208 |
| 3,417,834 A | * | 12/1968 | Smith .......................... 180/208 |
| 3,513,926 A | * | 5/1970 | Paget, Jr. ..................... 180/208 |
| 3,734,558 A | * | 5/1973 | Stead .......................... 296/158 |
| 3,788,238 A | * | 1/1974 | Bennett .......................... 410/6 |
| 4,089,542 A | * | 5/1978 | Westerman ................. 280/639 |
| 4,126,349 A | * | 11/1978 | Nelson et al. ............. 296/37.6 |
| 4,135,761 A | * | 1/1979 | Ward .......................... 296/37.6 |
| 4,566,842 A | * | 1/1986 | Clarke ........................ 414/462 |
| 4,685,695 A | * | 8/1987 | LeVee ...................... 280/441.2 |
| 4,685,860 A | * | 8/1987 | McFarland .................. 414/720 |
| 4,732,403 A | * | 3/1988 | Grattapaglia ................ 280/278 |
| 5,029,666 A | * | 7/1991 | Baldoni ..................... 180/208 |
| 5,097,922 A | | 3/1992 | Stagi |
| 5,183,129 A | * | 2/1993 | Powell ....................... 180/208 |
| 5,199,842 A | * | 4/1993 | Watt et al. ................. 414/537 |
| 5,308,214 A | * | 5/1994 | Crain et al. ................ 414/541 |
| 5,511,908 A | * | 4/1996 | Van Valkenburgh et al. ..................... 405/129.55 |

(Continued)

FOREIGN PATENT DOCUMENTS

JP 7-228284 8/1995

(Continued)

*Primary Examiner*—James W. Keenan
(74) *Attorney, Agent, or Firm*—Birch, Stewart, Kolasch & Birch, LLP

(57) ABSTRACT

A two-wheel vehicle foldable to have a width equivalent to the width of a license number plate can be contained in a door, side walls, or a rear wall of a four-wheel vehicle. Handles and steps of the two-wheel vehicle can be folded so that the vehicle width becomes equivalent to the width of the license number plate. Accordingly, containing space on the four-wheel vehicle at the time of mounting the two-wheel vehicle can be made to be small. As a result, vehicle compartment space of the four-wheel vehicle can be secured, and the two-wheel vehicle can be easily mounted onto the four-wheel vehicle.

17 Claims, 43 Drawing Sheets

U.S. PATENT DOCUMENTS

| | | | |
|---|---|---|---|
| 6,030,018 A * | 2/2000 | Clare et al. | 296/37.6 |
| 6,413,033 B1 * | 7/2002 | Monroig, Jr. | 414/480 |
| 2003/0070855 A1 * | 4/2003 | Horii et al. | 180/208 |
| 2005/0052045 A1 * | 3/2005 | Juzwiak | 296/37.6 |

FOREIGN PATENT DOCUMENTS

| | | |
|---|---|---|
| JP | 10-250455 A | 9/1998 |

* cited by examiner

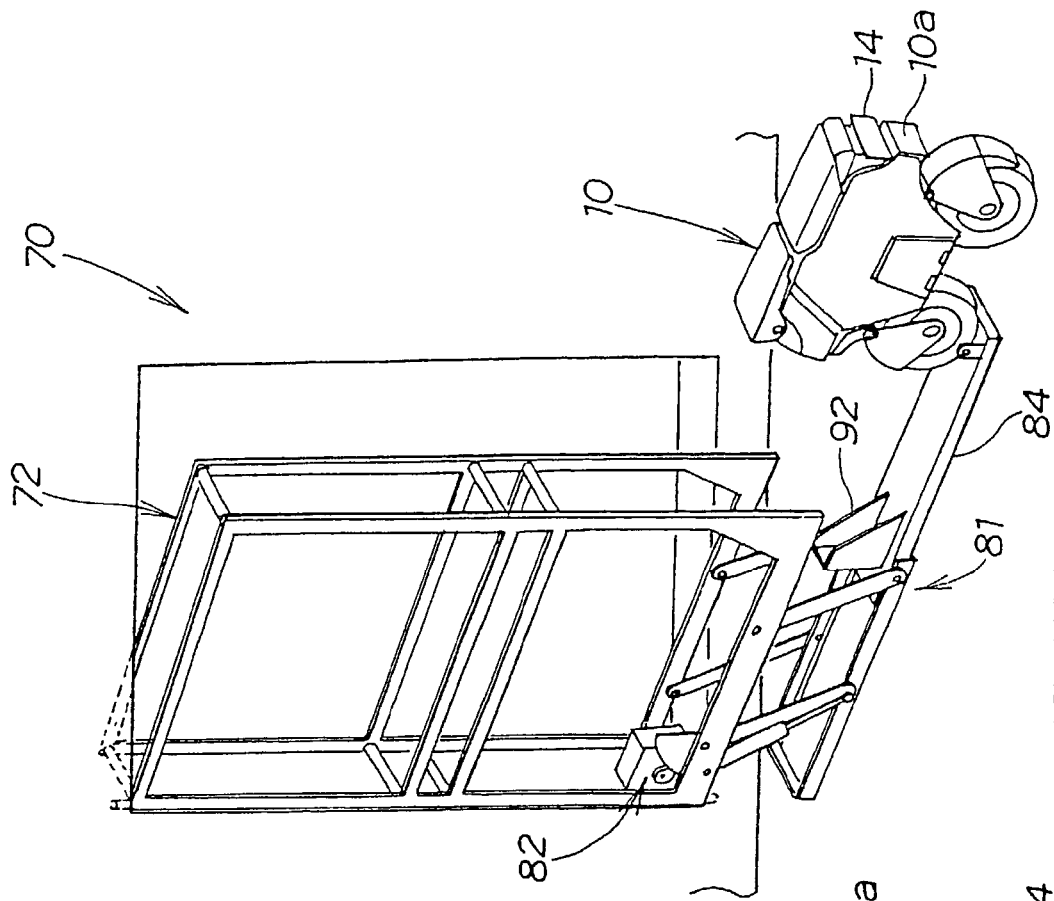
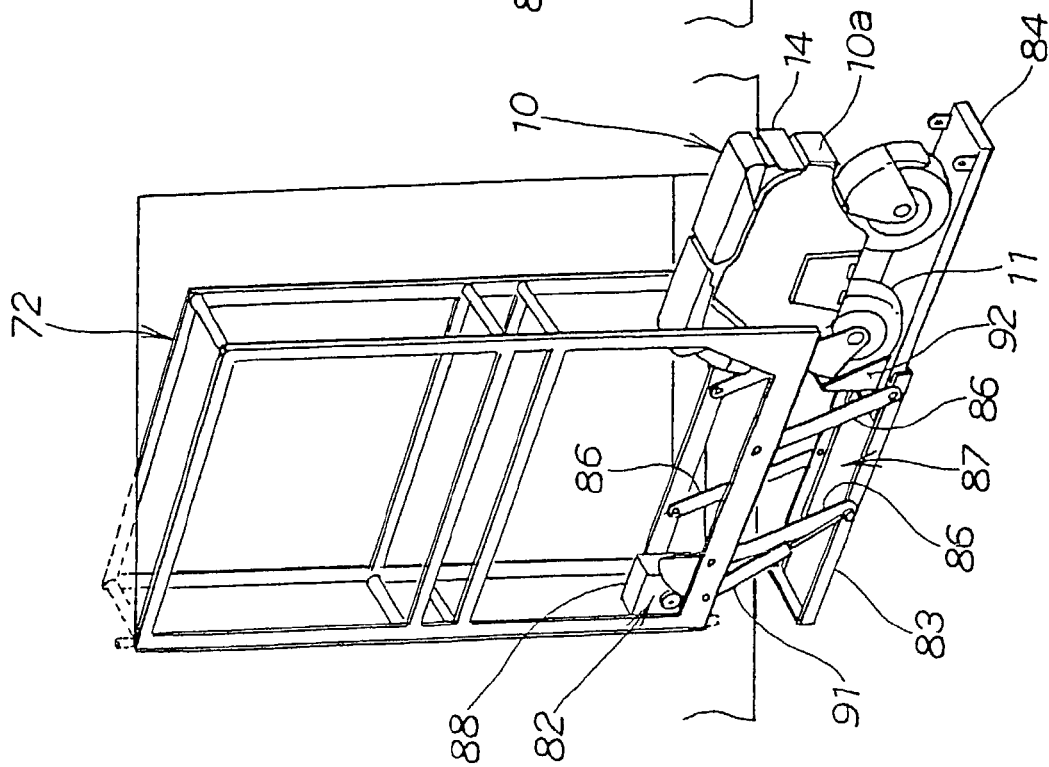
FIG. 7(b)
FIG. 7(a)

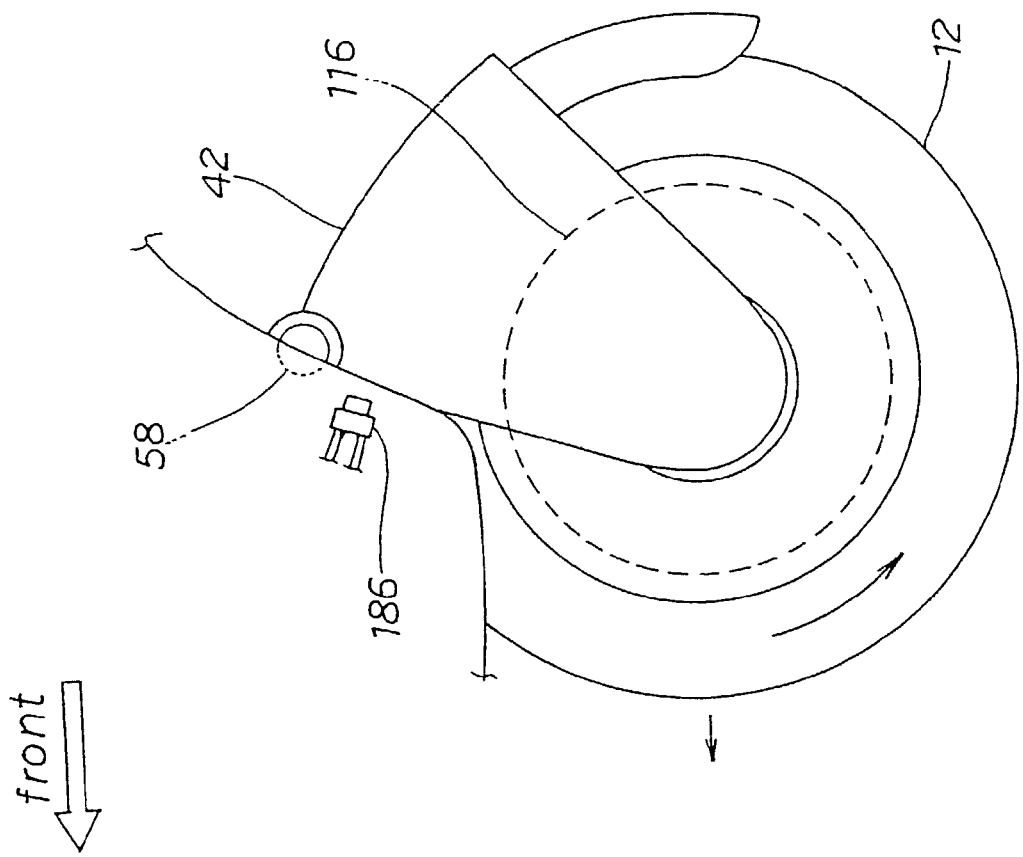
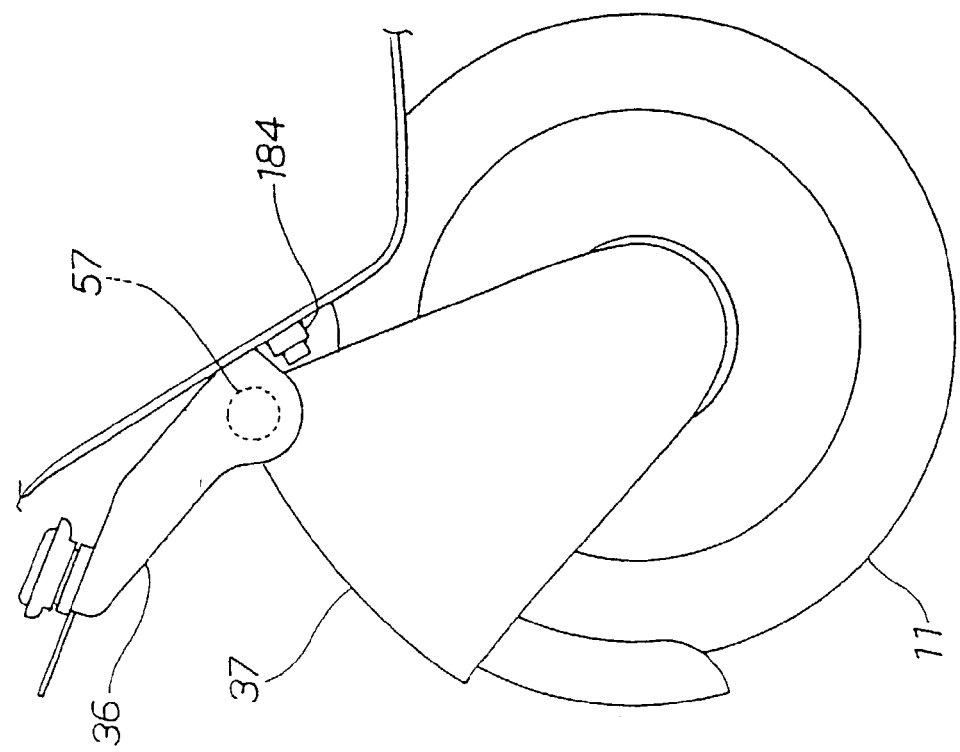
FIG. 21(a)
FIG. 21(b)

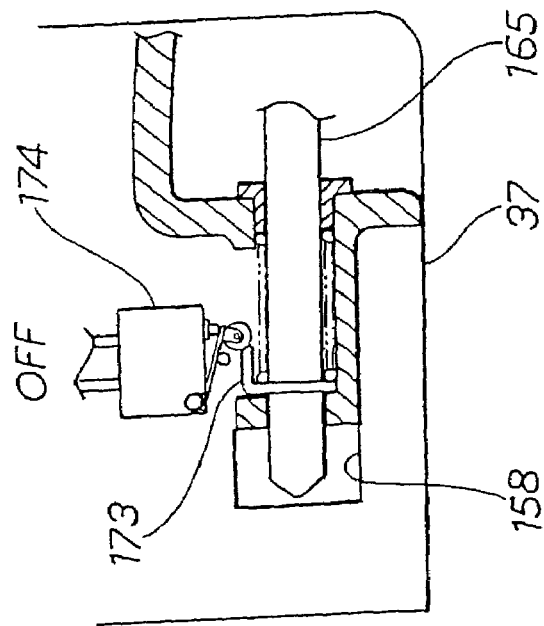
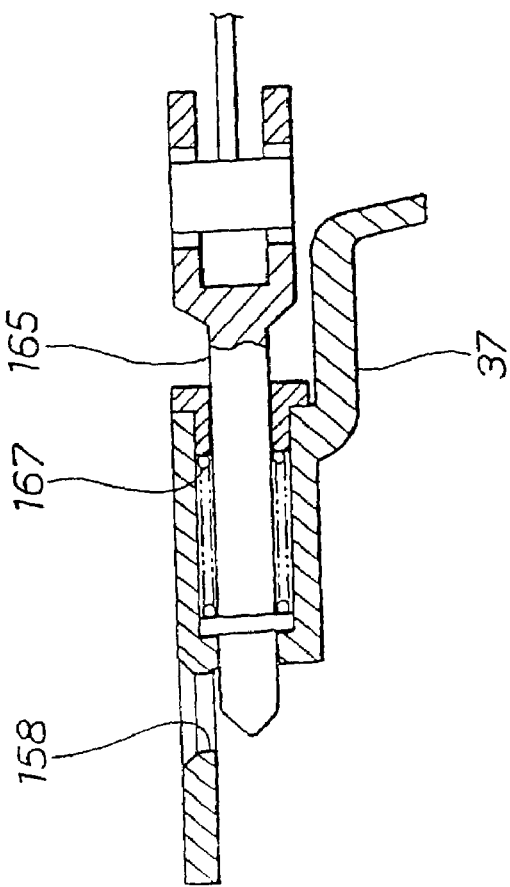
FIG. 23(b)
FIG. 23(a)

MOUNTING STRUCTURE FOR MOUNTING FOLDABLE TWO-WHEEL VEHICLE ON FOUR-WHEEL VEHICLE

CROSS-REFERENCE TO RELATED APPLICATION

The present application claims priority under 35 U.S.C. §119 to Japanese Patent Application No. 2001-267854, filed Sep. 4, 2001, the entire contents of which is hereby incorporated by reference.

BACKGROUND OF THE INVENTION

1. Field of the Invention

The present invention relates to a mounting structure for mounting two-wheel vehicle on four-wheel vehicle in which the size of the containing space needed for mounting a folded two-wheel vehicle on a four-wheel vehicle is reduced, and the two-wheel vehicle can be easily mounted on the four-wheel vehicle.

2. Description of Background Art

A mounting structure for mounting a foldable bicycle on a four-wheel vehicle is known. One example is shown in Japanese Patent Laid-Open No. Hei 7-228284 for a "Tricycle".

FIG. 3 in the above-mentioned publication shows a tricycle in the state of being mounted in the vehicle compartment by folding a handle post portion to the rear side. FIG. 2 in the publication shows a plan view of the tricycle having two front and one rear wheel.

The above-mentioned tricycle has a large vehicle width due to the two front wheels. Therefore, a containing space on a four-wheel vehicle must have a large width because the pedals provided at the tip ends of the foot step levers 3 are projected to the left and right. With this device, the object is simply to mount the tricycle on a four-wheel vehicle, and reduction of space is not taken into consideration. Therefore, a large space for exclusive use is required in the compartment of the four-wheel vehicle, and it is not easy to mount the folded tricycle onto the four-wheel vehicle.

SUMMARY AND OBJECTS OF THE INVENTION

Accordingly, it is an object of the present invention to reduce the containing space for the folded two-wheel vehicle, and to make it possible to mount the two-wheel vehicle on a portion of a four-wheel vehicle which has not been present in the related art. Another object is to provide the means for easy mounting of the two-wheel vehicle onto the four-wheel vehicle, by improving the mounting structure for mounting the foldable two-wheel vehicle on the four-wheel vehicle.

In order to attain the above object, the present invention provides a two-wheel vehicle foldable to a width equal to the width of a license number plate which can be contained in a vehicle body component member of a four-wheel vehicle.

Since the vehicle width of the two-wheel vehicle is equal to the width of the license number plate, the containing space at the time of mounting the two-wheel vehicle on the four-wheel vehicle can be reduced. Further, the two-wheel vehicle can be mounted on the four-wheel vehicle while sufficiently securing a vehicle compartment space in the four-wheel vehicle, and the operation of mounting the two-wheel vehicle onto the four-wheel vehicle can be easily carried out.

In a second aspect of the present invention, the foldable two-wheel vehicle has a structure in which a handle post is fitted to a front portion of a vehicle body so as to be foldable in the front-rear direction of the vehicle body, and handles are fitted to the handle post so as to be foldable in the vehicle width direction. Further, steps are fitted to lower portions of side portions of the vehicle body so as to be foldable in the vehicle width direction, a front wheel support member for supporting a front wheel is fitted to the vehicle body so as to be swingable to the rear side of the vehicle body, and a rear wheel support member for supporting a rear wheel is fitted to the vehicle body so as to be swingable to the front side of the vehicle body. After folding the vehicle in this manner, the two-wheel vehicle is folded into a substantially rectangular parallelepiped form.

With the foldable two-wheel vehicle folded into a substantially rectangular parallelepiped form by folding the handle post, the handles, the steps and the front and rear wheels, the containing space for the two-wheel vehicle provided on the four-wheel vehicle side may be substantially rectangular parallelepiped in shape. Thus, the degree of freedom in designing the containing space can be increased.

In a third aspect of the present invention, rearview mirrors are provided at end portions of the handles, and the rearview mirrors are rotatably fitted to the handles so as to have an interval substantially equal to the interval in the vehicle width direction of the handles when the handles are folded.

With the rearview mirrors provided at the end portions of the handles rotatably fitted to the handles, the rearview mirrors which might be projected in the vehicle width direction when the handles are folded can be folded into a more compact form.

In a fourth aspect of the present invention, the vehicle body component member of the four-wheel vehicle is a side wall or a rear wall.

Since the vehicle body component member for containing the two-wheel vehicle is the side wall or rear wall of the four-wheel vehicle, the two-wheel vehicle can be utilized as a strength member for the side wall or rear wall, and, therefore, the four-wheel vehicle can be reduced in weight. In addition, since the containing of the two-wheel vehicle requires only a space with a small width in the side wall or rear wall, the vehicle compartment space can be utilized more effectively.

In a fifth aspect of the present invention, the side wall or rear wall of the four-wheel vehicle includes an outer panel member which permits the inside to be seen therethrough.

Since the two-wheel vehicle mounted on the four-wheel vehicle can be visually recognized from the outside, the folded two-wheel vehicle can be recognized at a glance, thus enhancing the attractiveness of the both the four-wheel and the two wheel vehicles.

In a sixth aspect of the present invention, the vehicle body component member of the four-wheel vehicle is a door.

When, for example, the door is opened and the two-wheel vehicle is contained into the door through an end portion of the door, the operation of mounting the two-wheel vehicle can be easily carried out.

In a seventh aspect of the present invention, the door includes a rail member which can be drawn out and can be used as a bridge between the ground and the door at the time of mounting the two-wheel vehicle.

By moving the two-wheel vehicle on the rail member, it is possible to easily mount the two-wheel vehicle.

In an eighth aspect of the present invention, the rail member has a lifter structure, and the rail member can be raised and lowered by an electric motor.

The rail member becomes an electric lifter, and the operations of loading and unloading the two-wheel vehicle can be performed more easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) and (b) are views (latter half) for illustrating the actions of loading and unloading the two-wheel vehicle and a constitution therefor according to the present invention;

FIGS. 21(a) and (b) are views illustrating the folding action for the front and rear wheels according to the present invention;

FIGS. 23(a) and (b) are views illustrating the condition of a lock detection switch according to the present invention;

DETAILED DESCRIPTION OF THE
PREFERRED EMBODIMENTS

A preferred embodiment of the present invention will be described below based on the accompanying drawings. The drawings are to be looked at according to the posture of symbols.

Figure 1:
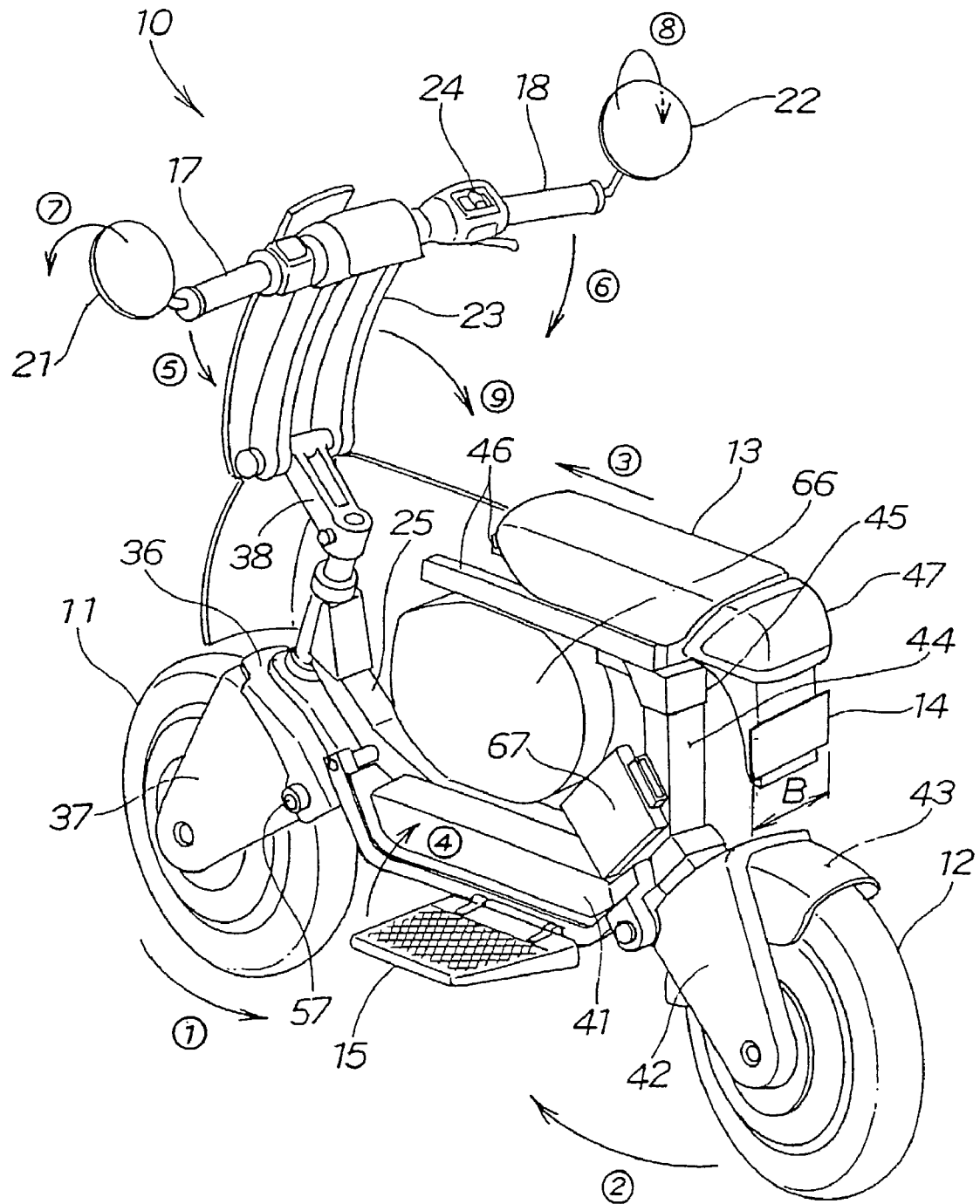
FIG. 1 is a perspective view of a foldable two-wheel vehicle according to the present invention.

FIG. 1 is a perspective view of a foldable two-wheel vehicle according to the present invention, and the foldable two-wheel vehicle 10 (hereinafter referred to as "the two-wheel vehicle 10") is a foldable-type vehicle which can be partly folded to reduce the outside dimension thereof and can be mounted, for example, on a four-wheel vehicle or the like.

In the two-wheel vehicle 10, a front wheel 11 and a rear wheel 12 can respectively be moved, namely, folded in the directions of arrows (1), (2). A seat 13 can be moved forward (in the direction of arrow (3)). Projecting portions, for example, steps 15, 16 (the step 16 on the deep side is not shown) as foot rests for the driver, handles 17, 18 and rearview mirrors 21, 22 can respectively be folded in the directions of arrows (4) to (8) so as to be within the width B of a license number plate 14 (hereinafter referred to simply as "the number plate 14") fitted to a rear portion. Moreover, a handle post 23 for supporting the handles 17, 18 can be folded to the rear side of the vehicle body (in the direction of arrow (9)).

A motor operating switch 24 (folding switch) is provided on the handle 18 for operating an electric motor incorporated in the rear wheel 12 (to be described later). The motor folds the front and rear wheels 11, 12 or return the front and rear wheels 11, 12 from the folded conditions to the original positions at low speeds. This operation will hereinafter be expressed as "unfold the front and rear wheels 11, 12". The front and rear wheels 11, 12 can be folded by tilting a movable portion (not shown) of the motor operating switch 24 to the side of a mark "FOLD", and the front and rear wheels 11, 12 can be unfolded by tilting the movable portion to the side of a mark "UNFOLD".

Figure 2:
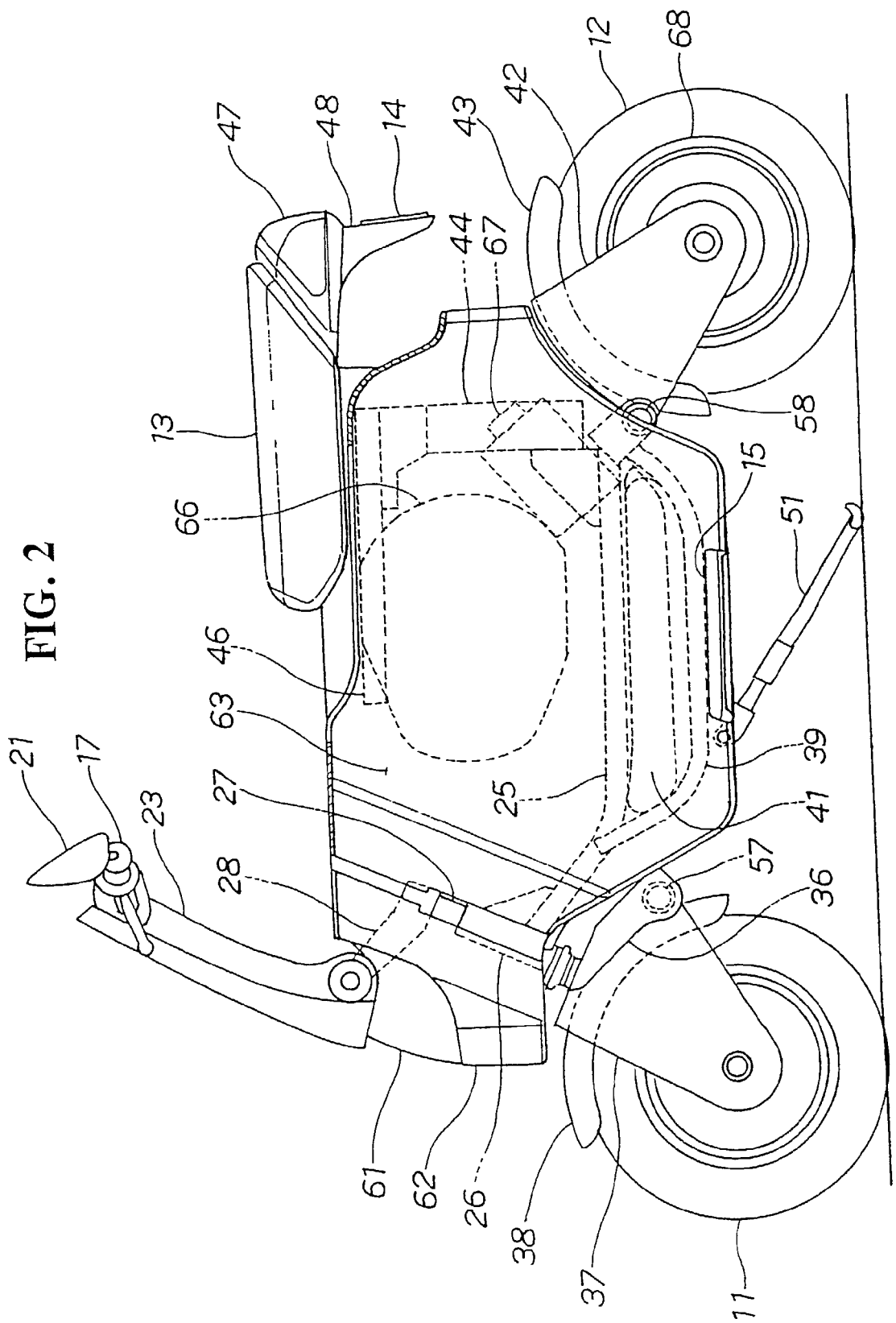
FIG. 2 is a side view of the two-wheel vehicle according to the present invention.

FIG. 2 is a side view of the two-wheel vehicle according to the present invention. The two-wheel vehicle 10 has a construction in which a head pipe 26 is fitted to the front end of a vehicle body frame 25, and a handle shaft 27 is rotatably fitted to the head pipe 26, an upper portion arm 28 is fitted to the upper end of the handle shaft 27. The handle post 23 is fitted to the upper portion arm 28 so as to be oscillatable in the front-rear direction of the vehicle body. A left-right pair of handles 17, 18 (the handle 18 on the deep side is also an accelerator; see FIG. 1) are fitted to an upper portion of the handle post 23 so as to be foldable to the inside in the left-right direction. The rearview mirrors 21, 22 (the rearview mirror 22 on the deep side is not shown) are respectively fitted to the respective tip ends of the handles 17, 18 so as to be rotatable in the front-rear direction with the handle shaft as a center. A lower portion arm 36 is fitted to the lower end of the handle post 27, a front swing arm 37 for supporting the front wheel 22 in the manner of cantilever from the left side is oscillatably fitted to a rear portion of the lower portion arm 36. Lastly, the front wheel 11 is rotatably fitted to an end portion of the front swing arm 37, and an upper portion of the front wheel 11 is covered with a front fender 38 fitted to the swing arm 37.

In addition, the two-wheel vehicle 10 has a construction in which, as shown, a left-right pair of under frames 39 are fitted to a lower portion of the vehicle body frame 25, a left-right pair of batteries 41 are fitted thereon, a rear swing arm 42 as a rear wheel support member is swingably fitted to a rear portion of the vehicle body frame 25, and the rear wheel 12 is rotatably fitted to an end portion of the rear swing arm 42. An upper portion of the rear wheel 12 is covered with a rear fender 43, a seat post 44 is erected from a rear portion of the vehicle body frame 25, a seat frame 45 and a left-right pair of seal rails 46 are fitted to the upper end of the seat post 44, and a seat 13 is fitted to the seat rails 46 so as to be slidable in the front-rear direction of the vehicle body.

A tail lamp 47 is integrally fitted to a rear portion of the seat 13, the number plate 14 is fitted to a lower portion of the tail lamp 47 through a bracket 48, and a stand 51 is vertically rotatably fitted to the under frame 39 on the left side at a lower portion of the vehicle body frame 25. Floor form steps 15, 16 (the step 16 on the deep side is not shown) are upwardly rotatably fitted to lower portions of both left and right side portions of the vehicle body frame 25.

Also shown is a front swing shaft 57 for the front swing arm 37, a rear swing shaft 58 for the rear swing arm 42, a head lamp 61, a front cover 62, and side covers 63 And 64 (the side cover 64 on the deep side is not shown) on the left and right sides of the vehicle body frame. When the left and right side covers 63, 64 are mated with each other, an opening portion is formed between the seat rails 46 under the seat, and a helmet or luggage containing space is formed between the left and right side covers in the opening portion. A containing net 66 for containing small articles is provided by hooking on the seat rails on the lower side of the seat rails 46. A control unit 67 is fitted to the seat post 44.

The rear wheel 12 is a wheel-in motor type wheel in which an electric motor which is driven by the batteries 41 and the control unit 67 and will be described later is incorporated in a wheel 68.

The seat 13 opens the upper side of the containing net 66 by being slidden from the riding position shown in the figure to the rear side of the vehicle body, whereby small articles can be put into and taken out of the containing net 66 through the above-mentioned opening portion.

A folding action of the two-wheel vehicle 10 described above will be briefly described.

Figure 3:
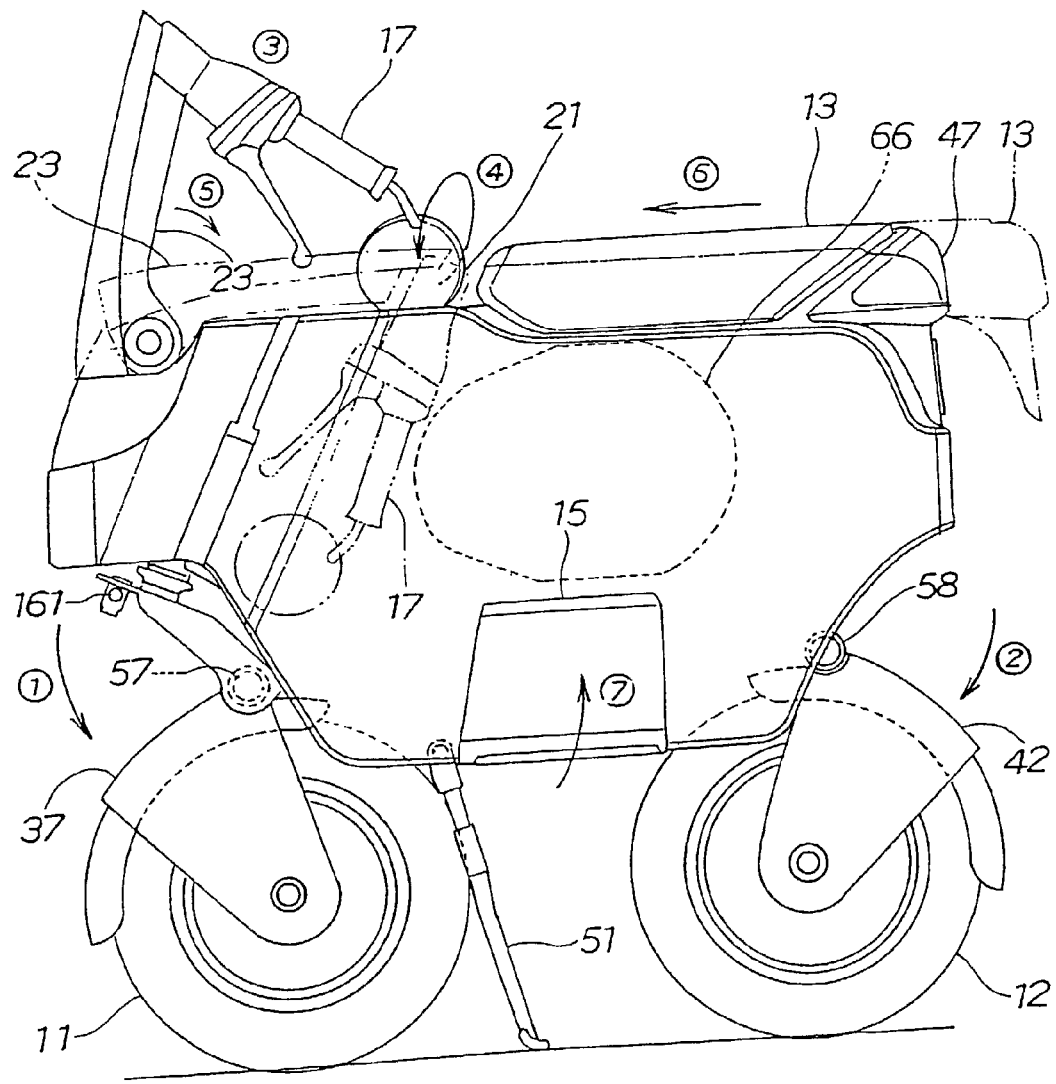
FIG. 3 is an action view for illustrating the folding of the two-wheel vehicle according to the present invention.

FIG. 3 is an action view for illustrating the folding of the two-wheel vehicle according to the present invention, and description will be made sequentially in correspondence with arrows (1) to (7) shown in FIG. 1.

In the condition shown in FIG. 2, a brake of the front wheel 11 is first applied to lock the front wheel 11, and then a switch for operating the electric motor of the rear wheel 12 is made. Namely, the rear wheel 12 is rotated in the same rotating direction as at the time of running (this is the forward direction). As a result, the rear wheel 12 approaches the front wheel 11 in FIG. 3, so that the front swing arm 37 on the side of the front wheel 11 and the rear swing arm 42 on the side of the rear wheel 12 are swung in the directions of arrows (1), (2) with the front swing shaft 57 and the rear swing shaft 58 as centers, respectively. When the above-mentioned switch is made, the control unlit drives the motor after releasing lock mechanisms for the front and rear wheels. The procedure for this will be described later.

The handles 17, 18 (the handle 18 on the deep side is not shown) are folded to the inside as indicated by ③, the rearview mirrors 21, 22 (the rearview mirror 22 on the deep side is not shown) are folded as arrow (4), the handle post 23 is tilted to the rear side of the vehicle body as arrow (5), and the handles 17, 18 and the rearview mirrors 21, 22 are contained into the vehicle body through the above-mentioned opening portion. In this case, the containing net 66 and the handles 17, 18 do not interfere with each other. Thus, folding can be performed even with luggage contained in the containing net 66.

The seat 13 is moved forward as arrow (6).

The steps 15, 16 (the step 16 on the deep side is not shown) are kicked up to the upper side as arrow (7).

By this, folding of the two-wheel vehicle 10 is completed. The sequence of folding is not limited to the above. Alternatively, for example, the handle post 23 may be tilted to the rear side together with the folded handles 17, 18 after the seat 13 is moved forward.

By the folding of the front wheel 11 and the rear wheel 12, the minimum height from the ground of the vehicle body becomes greater than the minimum height from the ground at the time of running which is shown in FIG. 2. Therefore, the stand 51 is fixed at a position further swung downwards from the position shown in FIG. 2.

In the condition where the two-wheel vehicle 10 is folded, the two-wheel vehicle 10 has a substantially rectangular parallelepiped form which is flat to the left and right and has a width substantially equal to the width 170 mm of the number plate of the motorcycle. Accordingly, the two-wheel vehicle 10 can be easily contained in a component member of the four-wheel vehicle, particularly, in an outer plate. The mounting of the two-wheel vehicle in the outer plate also acts to reinforce the four-wheel vehicle.

Figure 4:
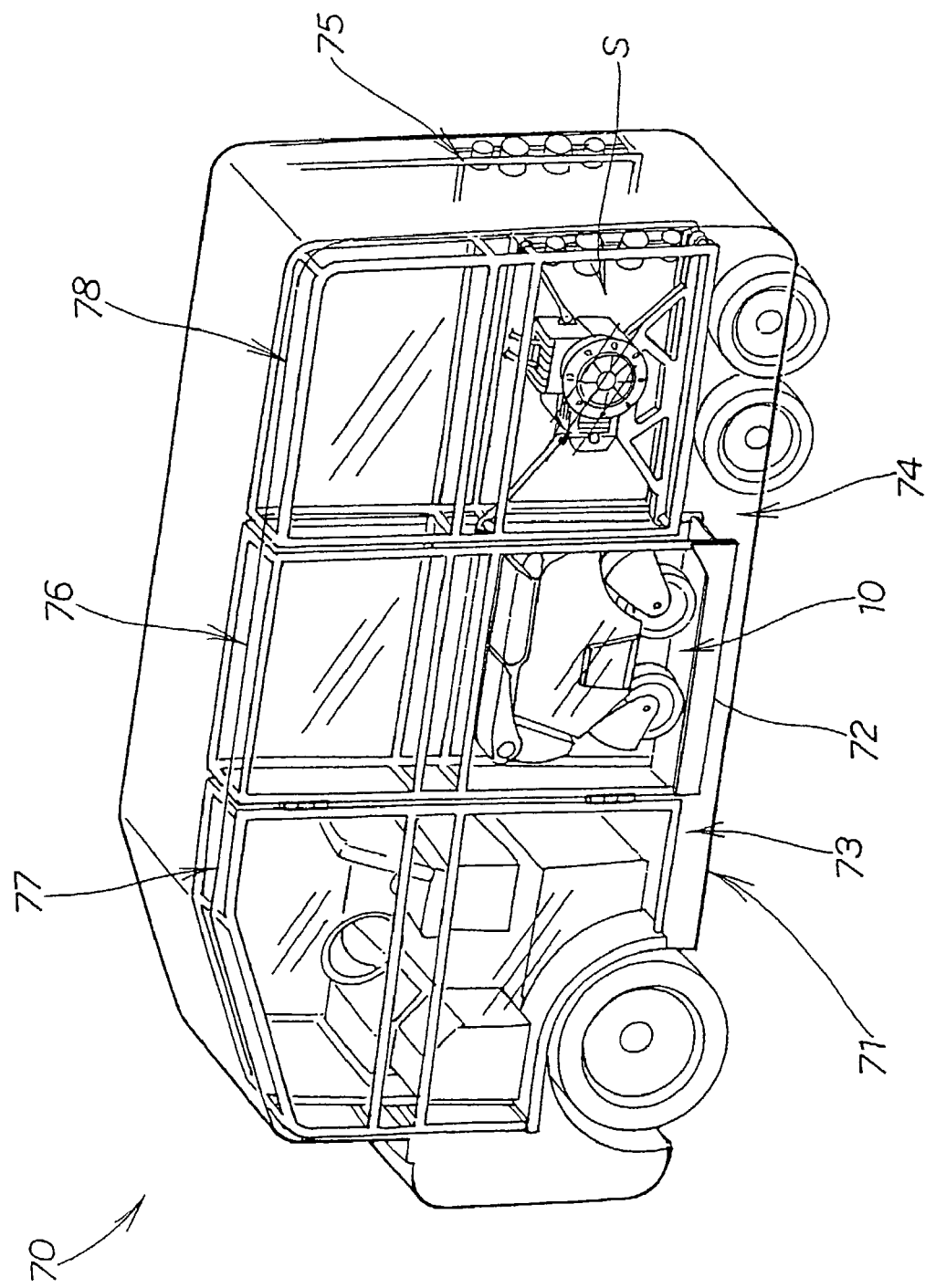
FIG. 4 is a perspective view showing the condition where the two-wheel vehicle is mounted on a four-wheel vehicle according to the present invention.

FIG. 4 is a perspective view showing the condition where the two-wheel vehicle is mounted on the four-wheel vehicle according to the present invention, and shows the condition where the two-wheel vehicle 10 is contained in a door 72 fitted to a side body 71 constituting the vehicle body of the four-wheel vehicle 70.

The two-wheel vehicle 10 has component portions so folded that the vehicle width is contained within the width of the number plate, as described above. Therefore, it is possible to reduce the width of the containing space and to reduce the thickness of the door 72, so that a vehicle compartment space of the four-wheel vehicle 70 can be sufficiently secured.

The four-wheel vehicle 70 has a construction in which the doors 72 having only the outer profiles 72' composed of pipe material as vehicle body component members and side walls 73, 74 as vehicle body component members are provided with outer panels 76, 77, 78 as transparent or translucent outer panel members (glass or the like) permitting the inside to be seen therethrough. Therefore, the two-wheel vehicle 10 mounted on the four-wheel vehicle 70 can be visually recognized from the outside, and the four-wheel vehicle 70 permitting the folded two-wheel vehicle 10 mounted thereon to be recognized at a glance has a characteristic design. This feature can enhance the attractiveness of the article of commerce, and ensures that the user will not forget to load or unload the two-wheel vehicle 10.

The four-wheel vehicle 70 includes an on-vehicle generator 301 disposed in a lower portion space S of the side wall 74. The on-vehicle generator 301 is a multi-pole alternator which is of a water-cooled 4-cycle engine integral type, and incorporates a starter. These will be described later.

Figure 5:
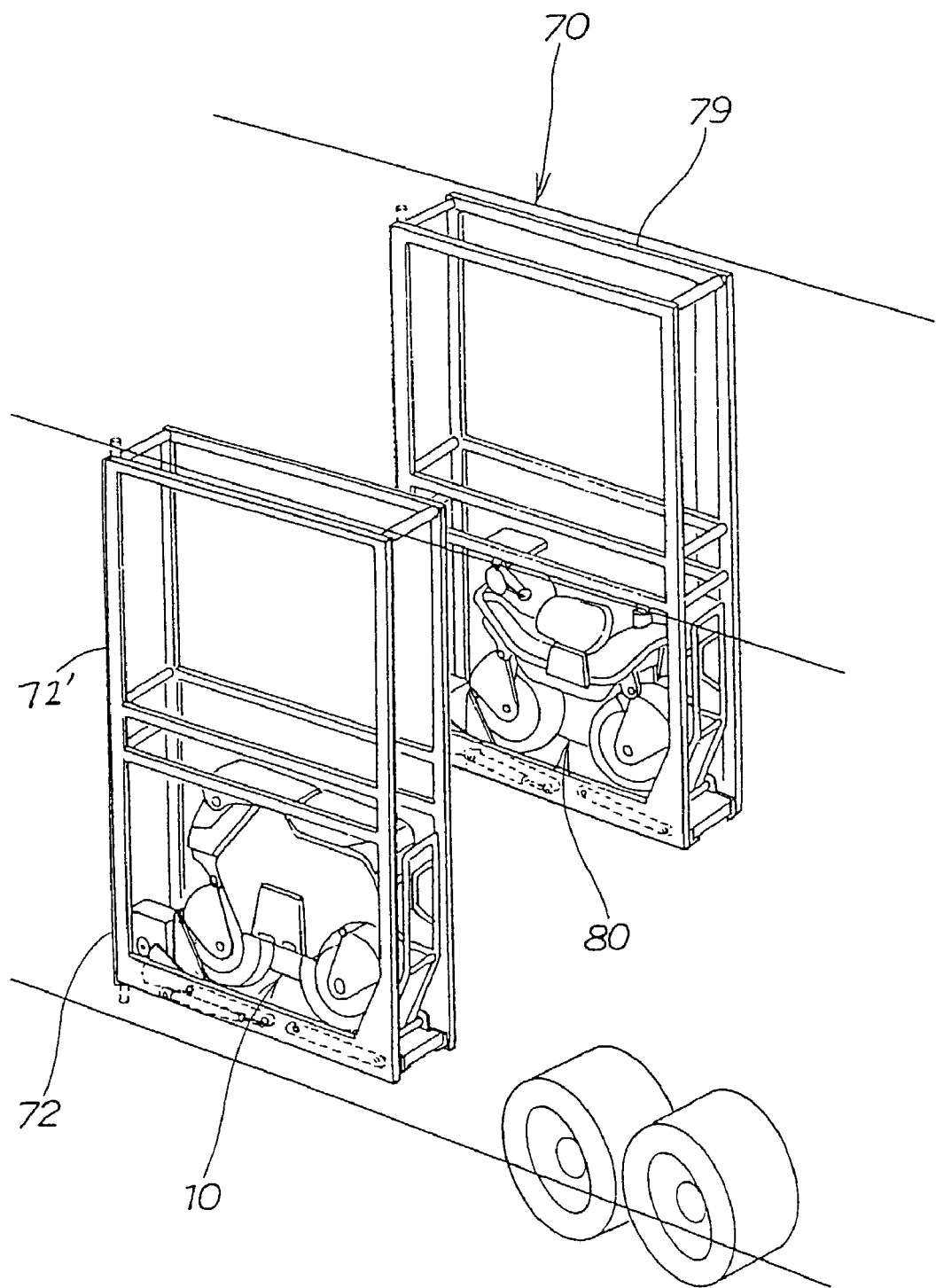
FIG. 5 is a perspective view showing two kinds of two-wheel vehicles mounted on the four-wheel vehicle according to the present invention.

FIG. 5 is a perspective view showing two kinds of two-wheel vehicles mounted on the four-wheel vehicle according to the present invention, and shows the condition where the two-wheel vehicle 10 is contained in the door 72 on the left side of the four-wheel vehicle 70. Further, a foldable two-wheel vehicle 80 (hereinafter referred to simply as "the two-wheel vehicle 80") is contained in the door 79 on the right side. The two-wheel vehicle 80 will be described later.

Thus, the four-wheel vehicle 10 can disposed a plurality of the two-wheel vehicles 10, 80 in the doors 72, 79 or in other vehicle body component members.

Loading and unloading action of the two-wheel vehicle shown in FIG. 4 onto and from the four-wheel vehicle will be described referring to FIGS. 6 to 8.

Figure 6B:
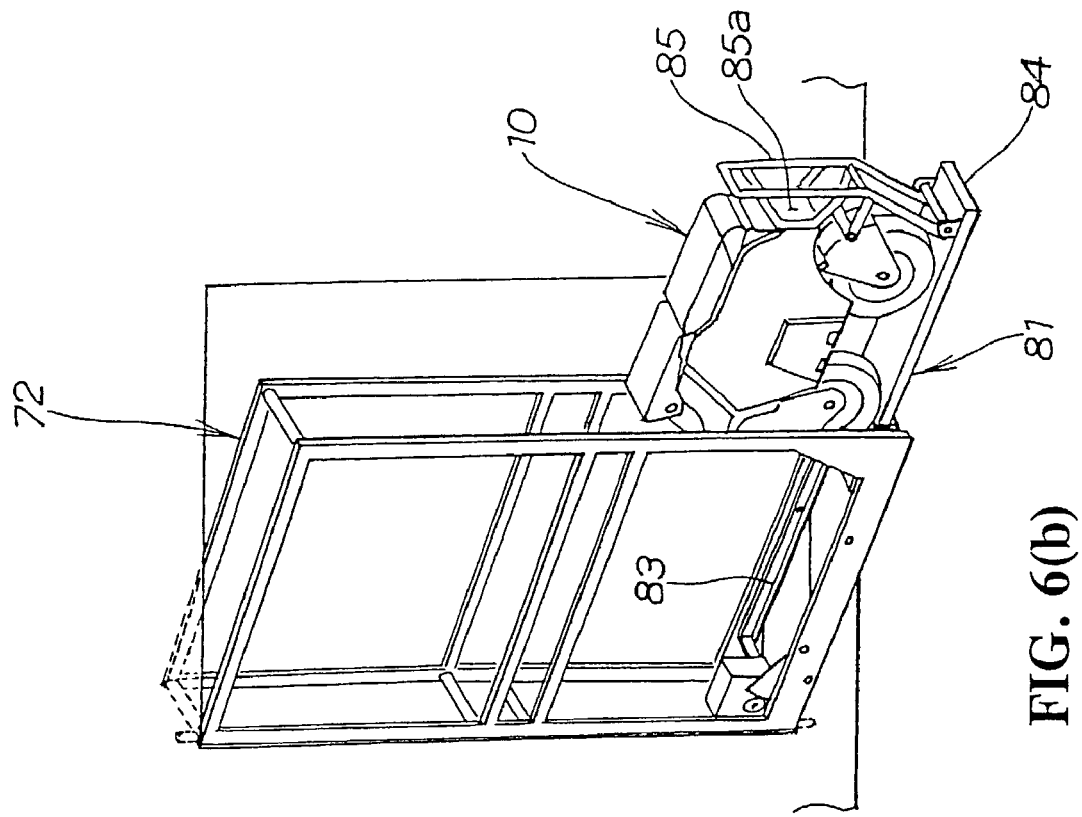
FIGS. 6(a) and (b) are views (former half) illustrating the actions of loading and unloading the two-wheel vehicle and a constitution therefor according to the present invention.
Figure 6A:
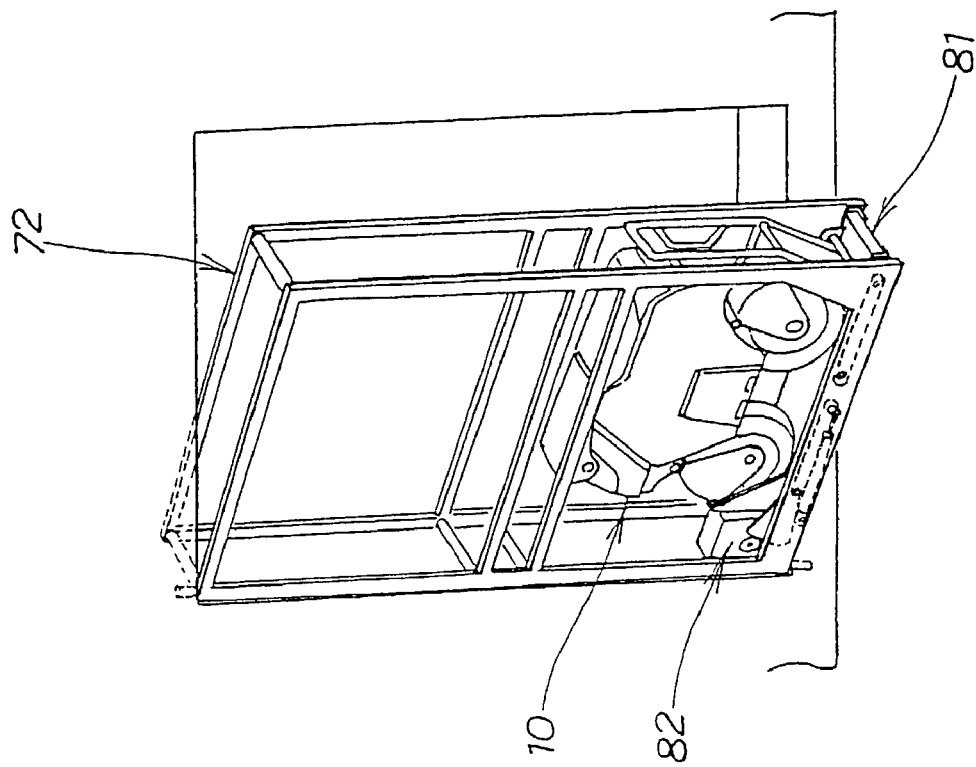

FIGS. 6(a) and (b) are action views (former half) for illustrating the action of loading and unloading the two-wheel vehicle and a constitution therefor according to the present invention, and show the case of unloading the two-wheel vehicle.

In FIG. 6(a), first, the door 72 is opened, and is fixed by a door-fixing mechanism (not shown) so that the door is immobile in a position opened to a predetermined degree (about 85°). The door 72 includes a slide device 81 for horizontally sliding the two-wheel vehicle 10, and a lift device 82 for raising and lowering the two-wheel vehicle 10.

In FIG. 6(b), a slide lock of the slide device 81 is unlocked, and the two-wheel vehicle 10 is drawn out from the inside to the outside of the door 72 by pulling a holding member (described later) by the slide device 81.

The slide device 81 includes a rail member 83 provided at a lower portion of the door 72, a slide plate 84 slidably fitted to the rail member 83 and functioning for mounting the two-wheel vehicle 10 thereon, and the holding member 85 detachably fitted to an upper portion of an end portion of the slide plate 84 and functioning for holding a rear portion of the two-wheel vehicle 10. The holding member 85 includes a magnet 85a for attraction to a metallic member (the number plate 14 may be used) or a magnet provided on the side of the two-wheel vehicle 10.

FIGS. 7(a) and (b) are views (latter half) for illustrating the action of loading and unloading the two-wheel vehicle and a constitution therefor according to the present invention, and show the case of unloading the two-wheel vehicle.

In FIG. 7(a), the lift device 82 provided in the door 72 is operated by operating a switch provided in the surrounding of a meter of the four-wheel vehicle (the switch may be provided on the inside of the door), to lower the rail member 83, whereby the two-wheel vehicle 10 mounted on the slide plate 84 is lowered, and the holding member 85 (See FIG. 6(b)) is detached from the slide plate 84.

The lift device 82 includes a parallel link 87 included of links 86 . . . ( . . . represents plurality, here and hereinafter) fitted to the rail member 83, a driving device 88 for driving the parallel link 87, and a gas damper spring 91 bridgingly disposed between the lower end of the door 72 and the rail member 83 for alleviating a downward force exerted on the parallel link 87. A stopper member 92 is fitted to a front portion of the slide plate 84 so as to restrain the front wheel 11 of the two-wheel vehicle 10 from moving forward.

A magnet 10a is provided on the side of the two-wheel vehicle 10 to be attracted by the holding member 85. By this, the operations of tatting the two-wheel vehicle 10 in and out can be performed more easily.

In FIG. 7(b), the stand (not shown) of the two-wheel vehicle 10 is set out, then the two-wheel vehicle 10 is unloaded from the slide plate 84 and is made to stand alone. By this, the operation of unloading the two-wheel vehicle 10 from the four-wheel vehicle 70 is completed.

An operation of loading the two-wheel vehicle 10 onto the four-wheel vehicle 70 can be carried out by reversing the above-described procedure.

Thus, by providing the door 72 with the slide device 81 and the lift device 82, the operations of loading and unloading the two-wheel vehicle 10 onto and from the four-wheel vehicle 70 can be carried out easily and swiftly.

Figure 8:
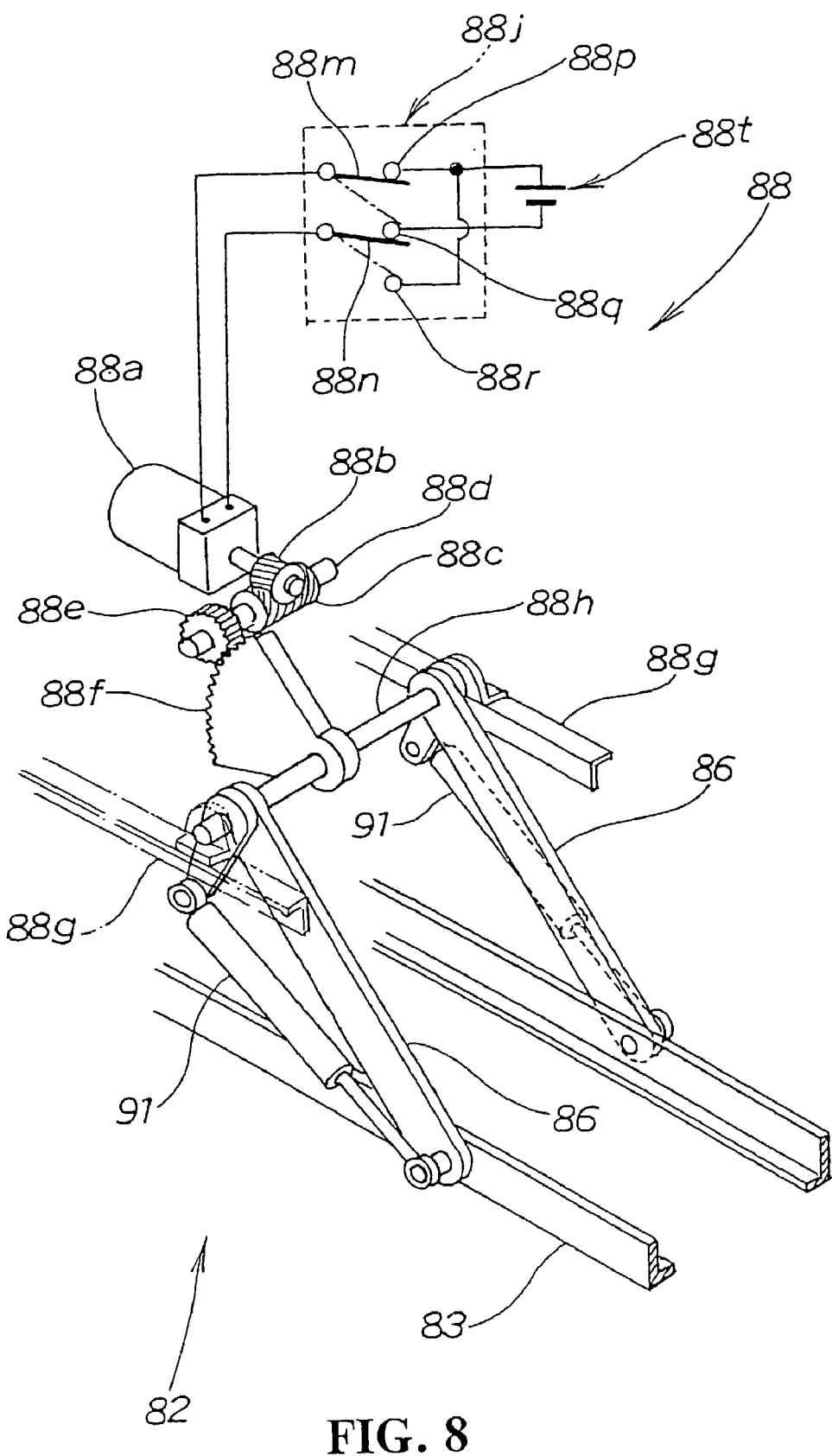
FIG. 8 is a perspective view showing a lift device provided in a door of the four-wheel vehicle according to the present invention.

FIG. 8 is a perspective view of the lift device provided in the door of the four-wheel vehicle according to the present invention. The driving device 88 of the lift device 82 includes an electric motor 88a serving as a drive source, a first worm gear 88b connected to an output shaft of the electric motor 88a, and a second worm gear 88c meshed with the first worm gear 88b. A first shaft 88d is integrally fitted to the second worm gear 88c and having both ends rotatably fitted in the door 72, a drive gear 88e is fitted to the first shaft 88d. A sector formed driven gear 88f is meshed with the drive gear 88e, and a second shaft 88h fitted to the driven gear 88f, fitted integrally with the links 86, 86 and having both ends rotatably fitted to frames 88g, 88g in the door 72. A lift changeover switch 88j (provided in the vicinity of a meter panel of the four-wheel vehicle or on the inside of the door) for changing over the rotating direction of the above-mentioned electric motor 88a, namely, changing over the raising and lowering of the rail member 83. Also shown are movable contacts 88m and 88n, fixed contacts 88p, 88q, and 88r, and a battery 88t. Since the first and second gears are worm gears, the position of the lift device 82 can be maintained even when the electric motor is not supplied with electric current.

For example, when the rail member 83 is lowered by supply of an electric current from the battery 88t to the electric motor 88a when the movable contact 88m is connected to the fixed contact 88p and the movable contact 88n is connected to the fixed contact 88q, the rail member 83 is raised by supply of an electric current from the battery 88t to the electric motor 88a when the movable contact 88m is connected to the fixed contact 88q and the movable contact 88n is connected to the fixed contact 88r.

Figure 9B:
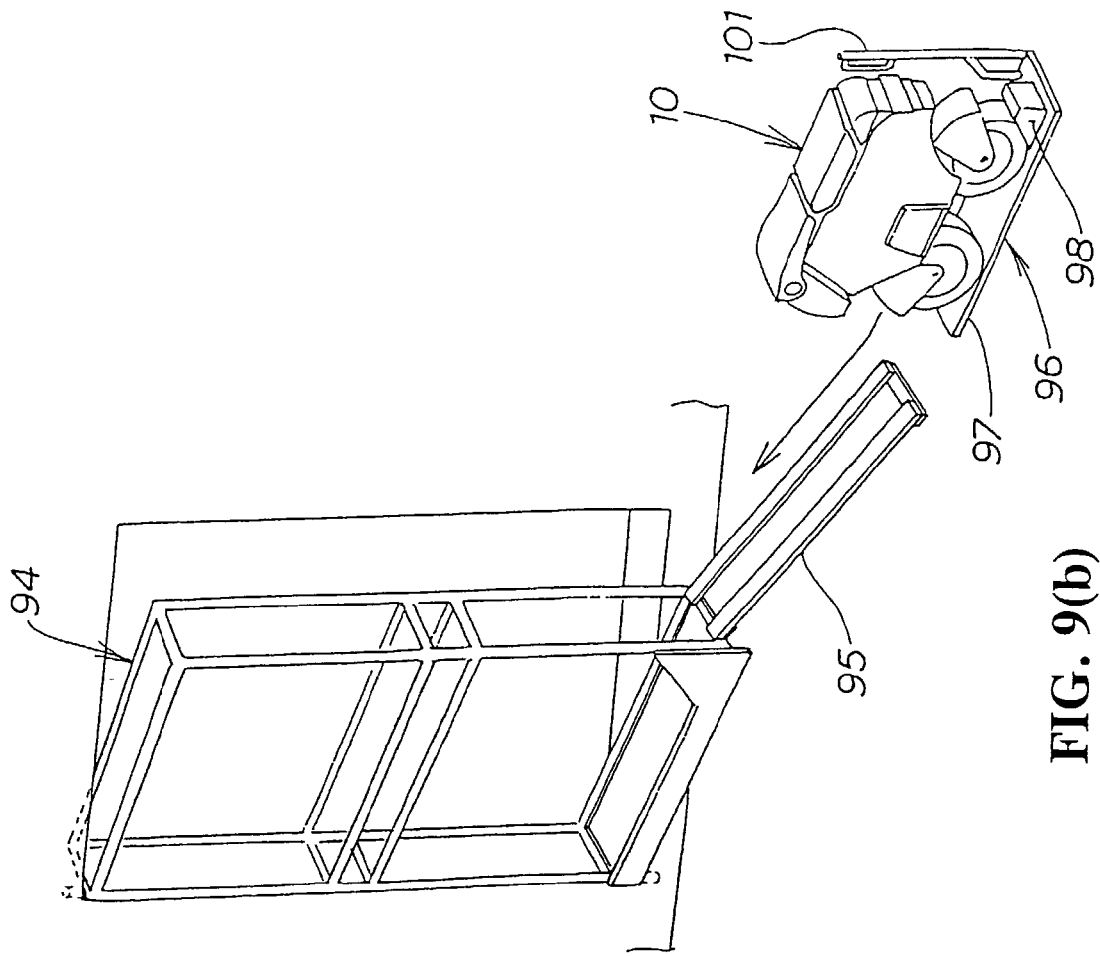
FIGS. 9(a) and (b) are views (former half) for illustrating another action of loading and unloading the two-wheel vehicle and a constitution therefor according to the present invention.
Figure 9A:
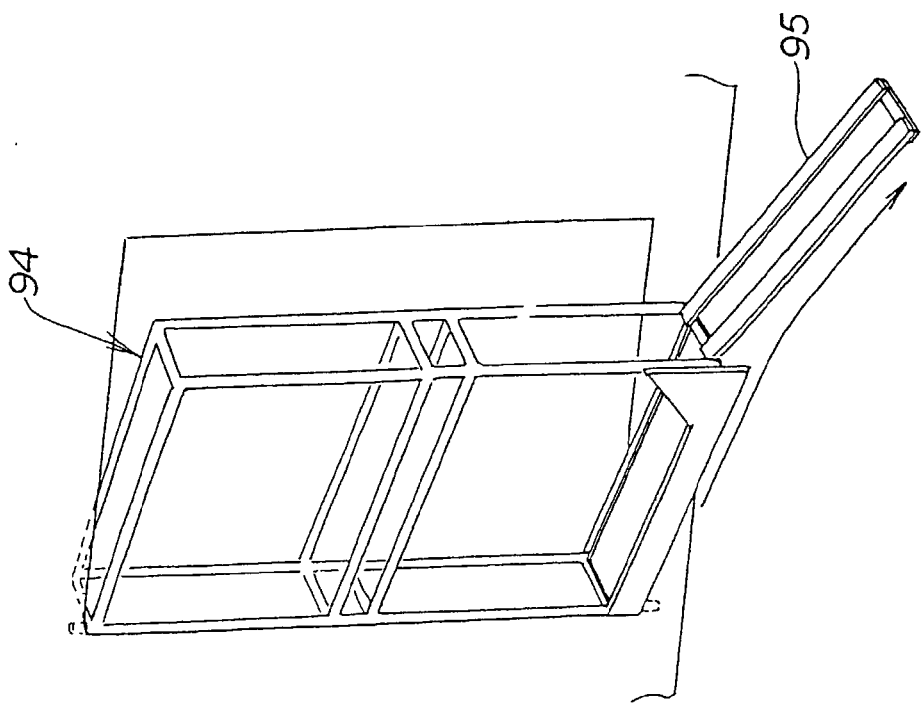

FIGS. 9(a) and (b) are views (former half) for illustrating another action of loading and unloading the two-wheel vehicle and a constitution therefore according to the present invention, and show the loading of the two-wheel vehicle.

In FIG. 9(a), a door 94 of the four-wheel vehicle is opened, a rail member 95 is drawn out from the inside of the door 94 to the outside, and the rail member 95 is bridgingly set between the door 94 and the ground.

Thus, the door 94 includes the rail member 95 which can be drawn out and can be bridgingly set between the ground and the door 94 at the times of loading and unloading the two-wheel vehicle 10.

In FIG. 9(b), the two-wheel vehicle 10 is mounted on a truck 96, and the truck 96 is pushed upwards along the rail member 95 as indicated by the arrow. The truck 96 may be preliminarily disposed on the rail member 95 and the two-wheel vehicle 10 may be mounted on the rail member 95.

The truck 96 includes a mount portion 97 for mounting the two-wheel vehicle 10 thereon, a rear portion stopper 98 provided at a rear portion of the mount portion 97 for holding the rear wheel 12 of the two-wheel vehicle 10, a handle 101 erected from a side portion of the rear end of the mount portion 97, and a plurality of rollers (not shown) provided on the lower surface of the mount portion 97 so as to roll on the rail member 95.

Figure 10A:
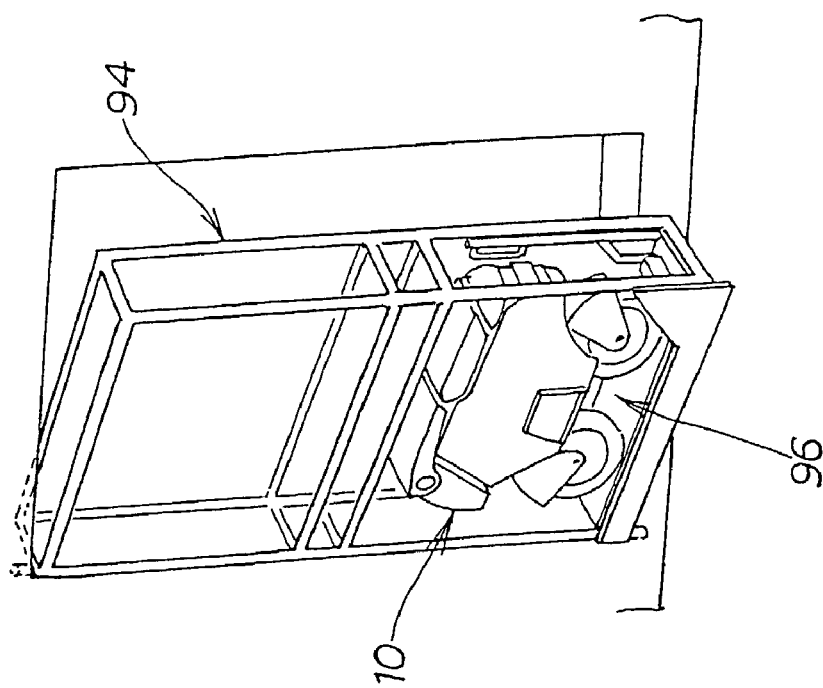
FIGS. 10(a) and (b) are views (latter half) for illustrating another action of loading and unloading the two-wheel vehicle and a constitution therefor according to the present invention.

FIGS. 10(a) and (b) are views (latter half) for illustrating another action of loading and unloading the two-wheel vehicle and a constitution therefor according to the present invention, and again show the loading of the two-wheel vehicle.

In FIG. 10(a), the truck 96 is pushed upwards along the rail member 95 by gripping the handle 101, and the two-wheel vehicle 10 together with the truck 96 is pushed into the door 94 as indicated by the arrow.

Figure 10B:
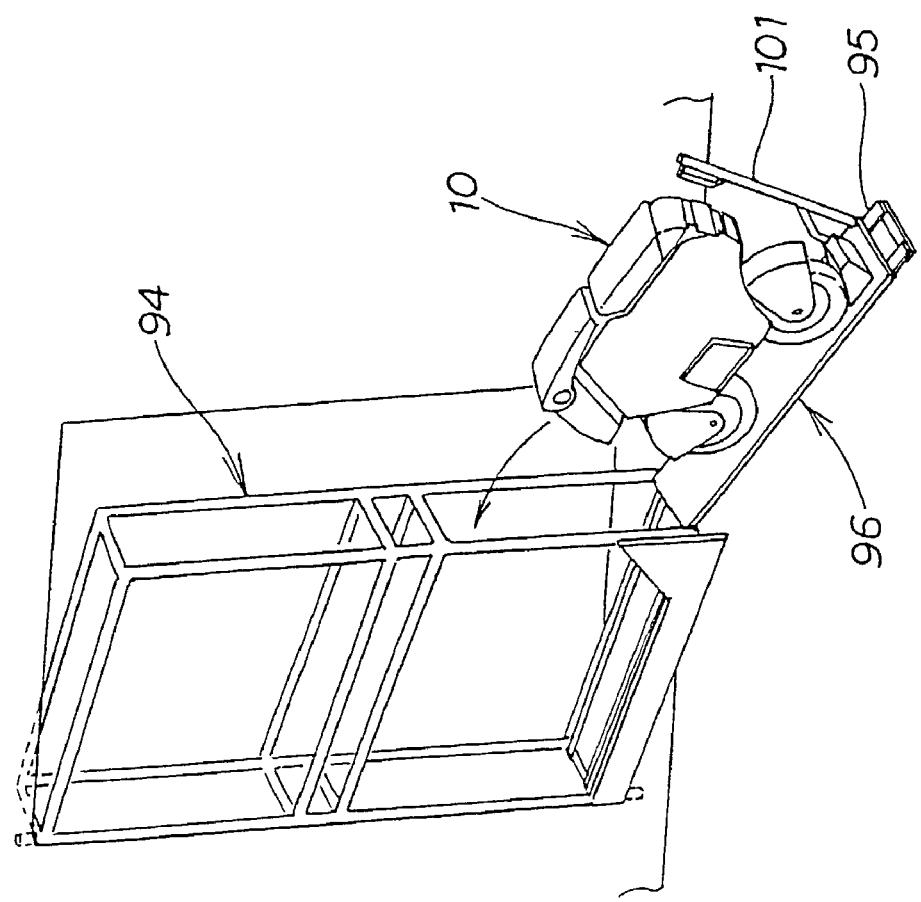

FIG. 10(b) shows the condition where the two-wheel vehicle 10 mounted on the truck 96 is contained in the door 94. At this time, the truck 96 and the two-wheel vehicle 10 are fixed by lock mechanisms (not shown) so that they do not move in the door 94. Therefore, the operation of loading the two-wheel vehicle 10 onto the four-wheel vehicle 70 is completed.

While the two-wheel vehicle has been mounted into the left-side door in the present embodiment, it is not limitative, and this system can naturally be applied in the same manner to the right-side door or the rear-side door. The door is not limited to the type of being opened to the outside, and may be of the type of being opened to the inside of the vehicle compartment. In that case, the two-wheel vehicle is once loaded into the vehicle compartment by use of a ladder rail and then contained into the door, so that the lift mechanism need not be provided in the door, and a light door can be adopted.

As has been described referring to FIGS. 1 and 4 above, the present invention is firstly characterized in that the two-wheel vehicle 10 foldable to a width within the width B of the number plate 14 can be contained in the door 72, the side walls 73, 74 or the rear wall 75 of the four-wheel vehicle 70.

Since the two-wheel vehicle 10 can be folded to a width equal to or smaller than the width B of the number plate, the containing space for mounting the two-wheel vehicle 10 on the four-wheel vehicle 70 can be made to be small, the vehicle compartment space of the four-wheel vehicle 70 can be sufficiently secured, and the operation of mounting the two-wheel vehicle 10 onto the four-wheel vehicle 70 can be easily carried out.

As has been described referring to FIGS. 1 and 3, the present invention is secondly characterized in that the two-wheel vehicle 10 has a structure in which the handle post 23 is fitted to a front portion of the vehicle body so as to be foldable in the front-rear direction of the vehicle body. The handles 17, 18 are fitted to the handle post 23 so as to be foldable in the vehicle width direction, the steps 15, 16 are fitted to lower portions of side portions of the vehicle body so as to be foldable in the vehicle width direction, and the front wheel swing arm 37 for supporting the front wheel 11 is fitted to the vehicle body so as to be swingable to the rear side of the vehicle body. Also, the rear wheel swing arm 42 for supporting the rear wheel 12 is fitted to the vehicle body so as to be swingable to the front side of the vehicle body, whereby the two-wheel vehicle 10 is foldable into a substantially rectangular parallelepiped form.

With the two-wheel vehicle 10 turned into the substantially rectangular parallelepiped form by folding the handle post 23, the handles 17, 18, the steps 15, 16 and the front and rear wheels 11, 12, the containing space for the two-wheel vehicle 10 provided on the side of the four-wheel vehicle 70 (See FIG. 4) also may be substantially rectangular parallelepiped in shape. As such, the degree of freedom in designing the containing space can be increased.

The present invention is thirdly characterized in that, in FIG. 1 and in FIG. 37 to be described later, the handles 17, 18 are provided with the rearview mirrors 21, 22 at end portions thereof, and the rearview mirrors 21, 22 are rotatably fitted to the handles 17, 18 so as to have an interval substantially equal to the interval in the vehicle width direction of the handles 17, 18 when the handles 17, 18 are folded.

Since the rearview mirrors 21, 22 provided at end portions of the handles 17, 18 are rotatably fitted to the handles 17, 18, the portions of the handles 17, 18 can be folded into a more compact form.

As has been described referring to FIG. 4, the present invention is fourthly characterized in that the vehicle body component member of the four-wheel vehicle 70 is the side wall 73, 74 or the rear wall 75.

With the vehicle body component member for containing the two-wheel vehicle 10 being the side wall 73, 74 or the rear wall 75 of the four-wheel vehicle 70, the two-wheel vehicle 10 can function as a strength member for the side wall 73, 74 or the rear wall 75. In addition, with the two-wheel vehicle 10 small in width being contained in the side wall 73, 74 or the rear wall 75, a collected large vehicle compartment space can be formed, as compared with the case of containing the two-wheel vehicle 10 in, for example, a part of the vehicle compartment, and the vehicle compartment space can be utilized more effectively.

The present invention is fifthly characterized in that, as shown in FIG. 4, the outer panel 76, 77, 78 permitting the inside to be seen therethrough is provided at least one portion of the door 72, the side walls 73, 74 and the rear wall 75 of the four-wheel vehicle 70.

The two-wheel vehicle 10 mounted on the four-wheel vehicle 70 can be visually recognized from the outside, so that the four-wheel vehicle 70 permitting the two-wheel vehicle 10 mounted thereon to be recognized at a glance has a characteristic design, and the attractiveness of the article of commerce can be enhanced.

As has been described referring to FIGS. 4 to 7, the present invention is sixthly characterized in that the vehicle body component member of the four-wheel vehicle 70 is the door 72.

With a structure in which, for example, the door 72 is opened and the two-wheel vehicle 10 is contained into the door 72 through an end of the door 72, the operation of mounting the two-wheel vehicle 10 can be easily carried out.

As has been described referring to FIGS. 9 and 10, the present invention is seventhly characterized in that the door 94 includes the rail member 95 which can be drawn out and serve as a bridge between the ground and the door 94 at the time of mounting the two-wheel vehicle 10.

With the two-wheel vehicle 10 moved on the rail member 95, the mounting of the two-wheel vehicle 10 can be easily carried out.

Figure 11:
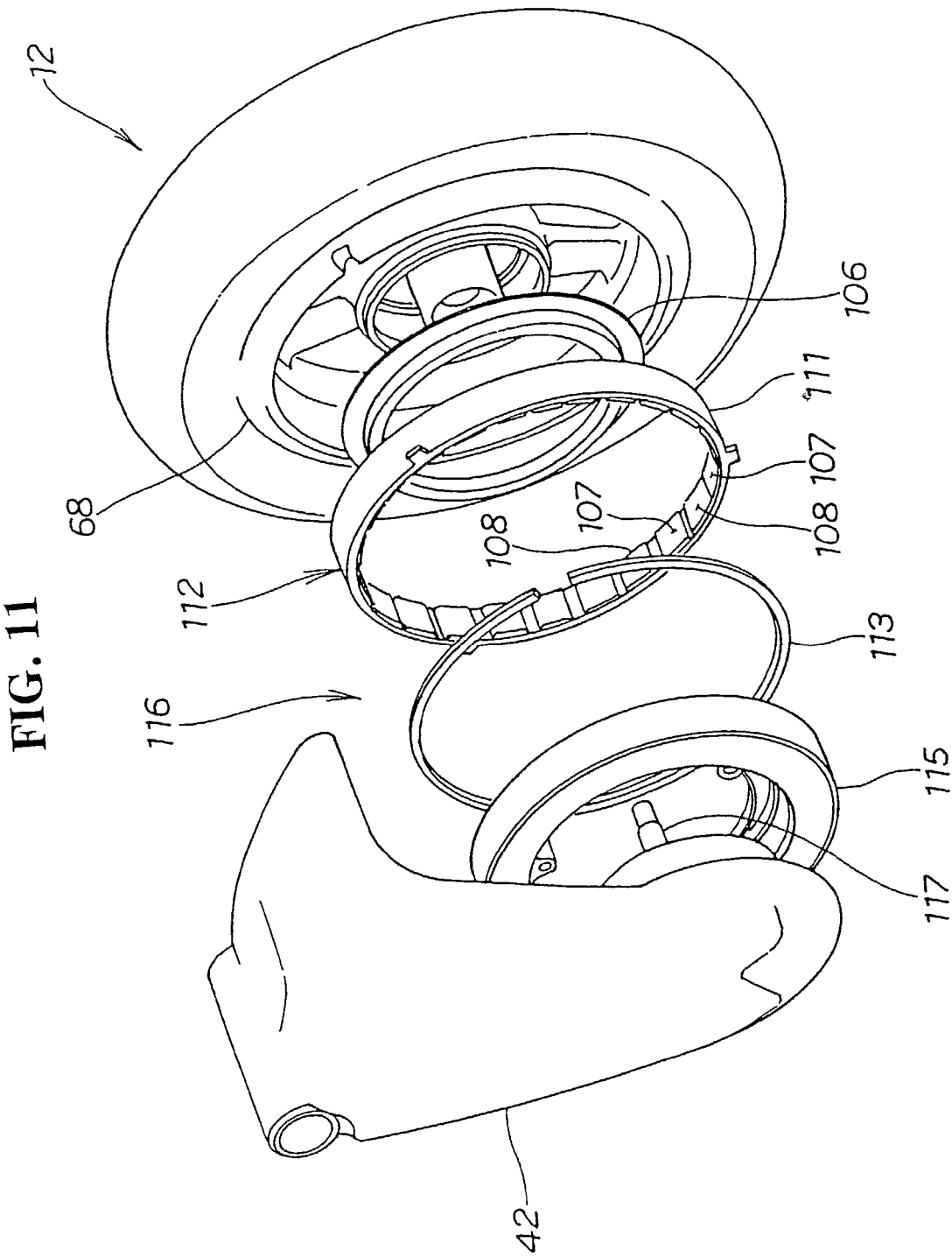
FIG. 11 is an exploded perspective view showing a wheel structure of the two-wheel vehicle according to the present invention.

FIG. 11 is an exploded perspective view showing the wheel structure of the two-wheel vehicle according to the present invention, and shows the wheel 68 of the rear wheel 12.

The wheel 68 of the rear wheel 12 includes a sensor magnet ring 106 to be detected by a rotation sensor (not shown) provided on the side of the rear swing arm 42, a rotary magnet body 112 comprising a plurality of permanent magnets 107, 108 alternately arranged on the inside of a magnetic material ring 111, and a fixing ring 113 for fixing the rotary magnet body 112 in the wheel 68. The rear swing arm 42 includes a stator 115 integrally supporting a stator coil.

The sensor ring 106 is for detecting the rotational frequency of the wheel 68.

The rotary magnet body 112 and the stator 115 are members constituting a three-phase brushless electric motor 116. Numeral 117 denotes an axle of the rear wheel 12.

Figure 12:
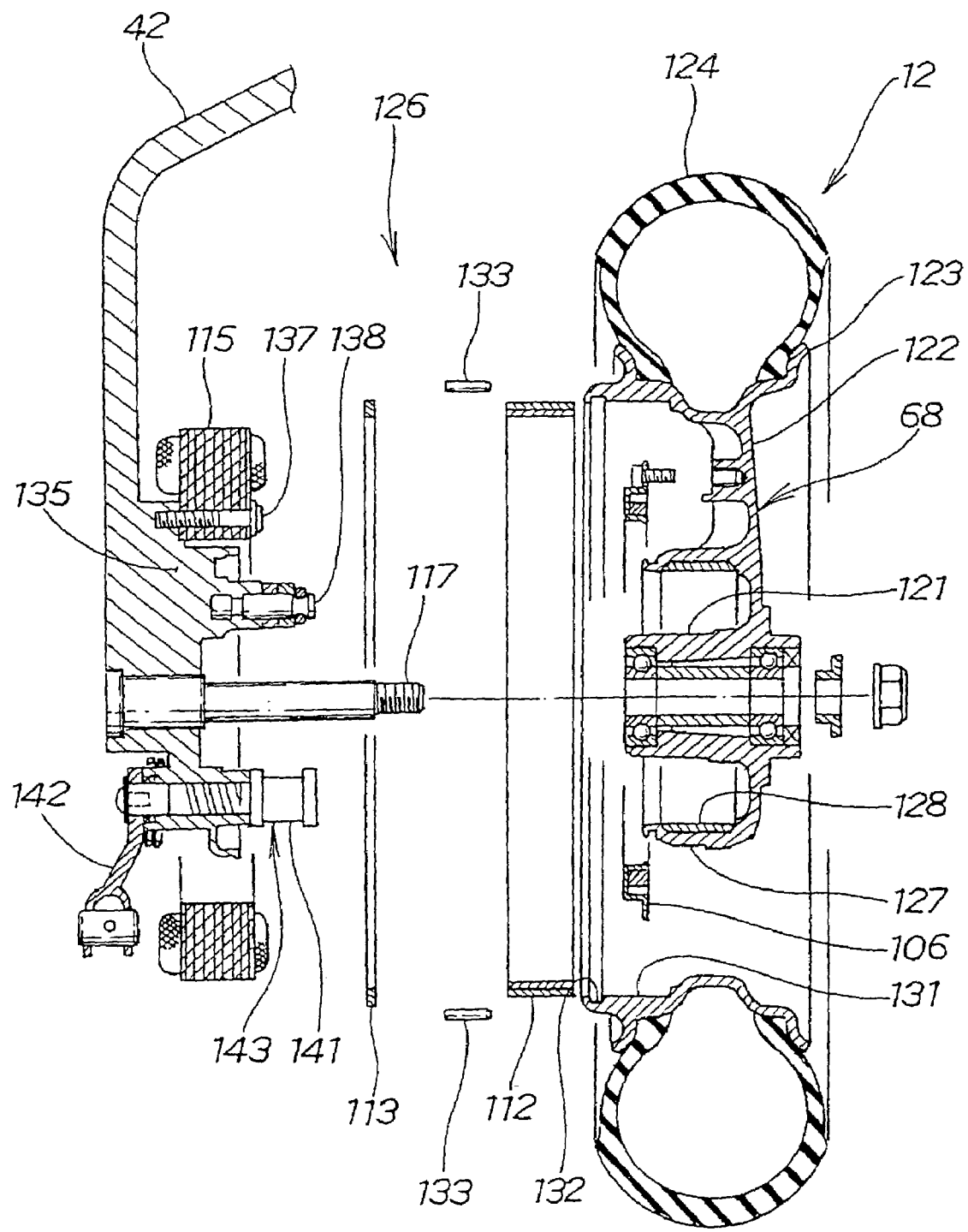
FIG. 12 is a sectional view (exploded view) showing the wheel structure of the two-wheel vehicle according to the present invention.

FIG. 12 is a sectional view (exploded view) showing the wheel structure of the two-wheel vehicle according to the present invention. The wheel 68 includes a hub portion 121 for receiving the axle 117, a disk portion 122 spreading radially outwards from the hub portion 121, and a rim portion 123 provided at the outer circumference of the disk portion 122, with a tire 124 fitted on the rim portion 123.

The disk portion 122 is a portion integrally formed with a drum 127 constituting a drum brake 126 on the side facing the rear swing arm 42. A cast iron liner 128 is insert molded on the inside of the drum 127 for enhancing abrasion resistance and with which a brake shoe (described later) makes contact. A magnet body fitting portion 132 is provided at the inside surface of the rim portion 123 for fitting the rotary magnet body 112, and an annular groove 132 for fitting the fixing ring 113, and 133 . . . denote three positioning pins is provided at an angular interval of 120° for positioning in the rotating direction of the rotary magnet body 112.

The rear swing arm 42 includes a convex portion 135 provided at the periphery of the axle 117, and the stator 115 fitted to the convex portion 135 by bolts 137 . . . , in which the convex portion 135 functions also as a brake panel (which is a component part of the drum brake 126).

Namely, the convex portion 135 is a portion for fitting thereto brake shoe shafts 138, 138 (the brake shoe shaft 138 on one side is not shown) which constitute a swing shaft for the brake shoe (not shown) to be pressed against the inner circumferential surface of the cast iron liner 128 of the drum 127, and a cam shaft 143 which is formed at its one end with a cam 141 for moving the brake shoe to the drum side, and is integrally fitted at its other end with an arm member 142 to be swung attendant on a brake operation.

Figure 13:
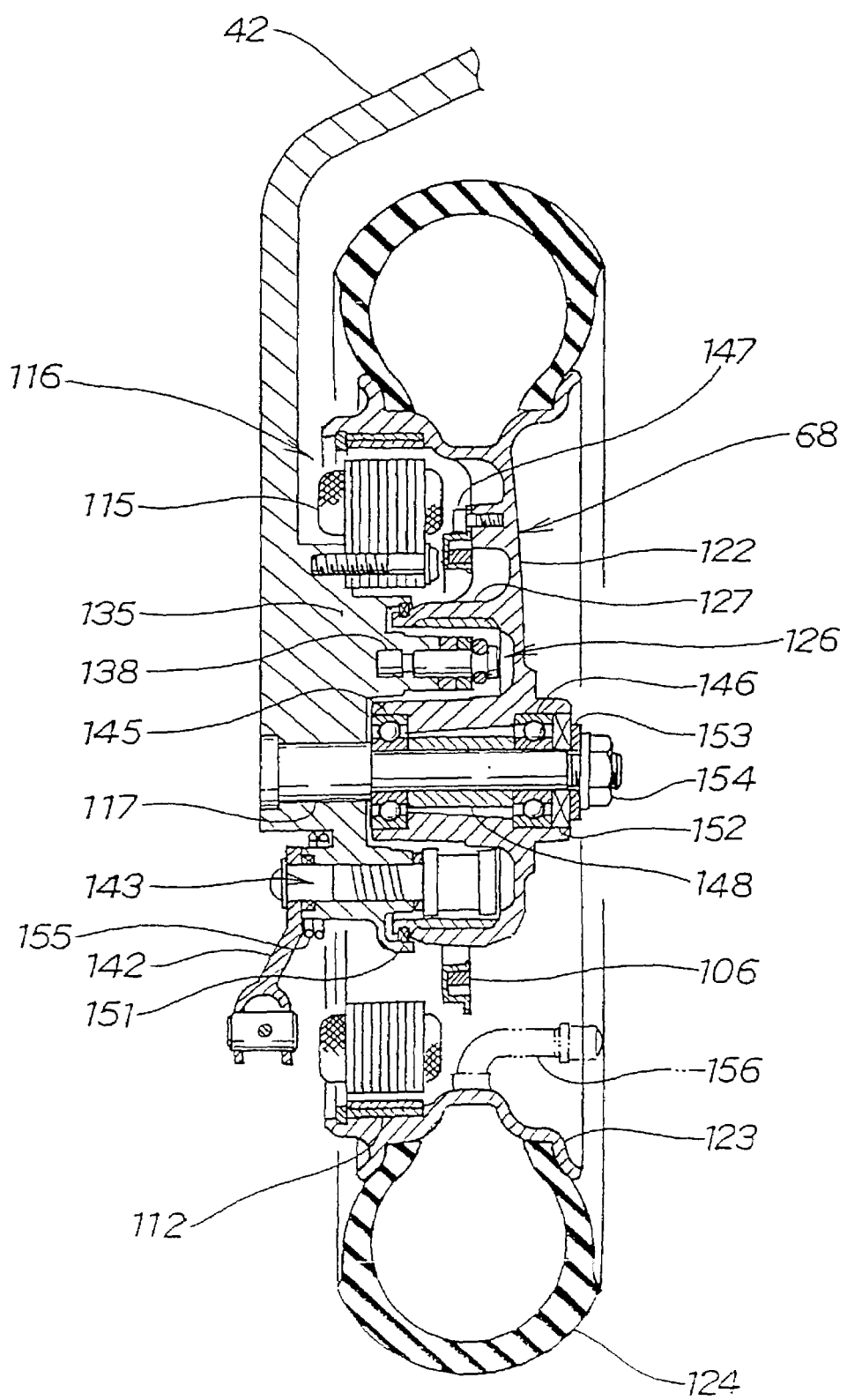
FIG. 13 is a sectional view showing the wheel structure of the two-wheel vehicle according to the present invention.

FIG. 13 is a sectional view showing the wheel structure of the two-wheel vehicle according to the present invention. Shown is the condition where the axle 117, the stator 115 of the electric motor 116, the brake shoe shafts 138, 138 (symbol 138 on one side is not shown) of the drum brake 126 and the cam shaft 143 are fitted to the convex portion 135 of the rear swing arm 42. Also shown is the wheel 68 rotatably fitted to the axle 117 through bearings 145, 146, the drum 127 of the drum brake 126 integrally formed on the disk portion 122 of the wheel 68, the sensor ring 106 fitted to the disk portion 122 of the wheel 68 by bolts 147 . . . , and the rotary magnet body 112 fitted to the inner circumferential surface of the rim portion 123. Further shown is a collar 148, dust seals 151 and 152, a washer 153, a nut 154, a return spring 155 for the arm member 142, and an air valve 156 of the tire.

The above-mentioned wheel 68 has a structure in which the electric motor 116 for driving the wheel 68 is incorporated in the wheel 68, and the drum brake 126 for braking the wheel 68 is disposed on the radially inner side of the electric motor 116. Therefore, the electric motor 116 and the drum brake 126 can be disposed concentrically, the width of the wheel 68 can be made small, and a small-type compact wheel 68 can be achieved. Moreover, the drum brake will not be affected by the heat of the motor, and braking performance can be maintained.

Such a wheel structure may be adopted for the front wheel 11 (See FIG. 2).

In addition, since the electric motor 116 and the drum brake 126 are provided on the same side of the disk portion 122 of the wheel 68, it is possible to enhance the assemblability of the electric motor 116 and the drum brake 126 to the wheel 68 and the maintainability of the electric motor 116 and the drum brake 126.

Further, since the rear swing arm 42 as a rear wheel support member for rotatably supporting the wheel 68 functions also as a brake panel of the drum brake 126 and is fitted with the stator 115 of the electric motor 126, the number of component parts can be reduced as compared with the case where a stator-fitting member is provided and/or the brake panel is specially provided. At the time of manufacture, component parts (the brake shoe shaft 138, the brake shoe, the cam shaft 143, the arm portion 142, etc.) of the drum brake 126 and the stator 115 can be preliminarily and partly assembled onto the rear swing arm 42. Separately, the sensor ring 106 and the rotary magnet body 112 can be preliminarily and partly assembled onto the wheel 68. Therefore, by the process of fitting the partly assembled wheel 68 to the partly assembled rear swing arm 42, productivity can be enhanced.

Furthermore, with the wheel 68 provided with the rotary magnet body 112, according to the present invention, a slip ring mechanism for supplying electric current to the stator 115 is not needed and structure is simplified, as compared with the case where, for example, the stator is provided on the side of the wheel. In addition, with the rotary magnet body 112 included of the magnetic material ring 111 and the permanent magnets 107 . . . , 108 . . . fixed on the magnetic material ring 111, the magnetic material ring 111 on which the permanent magnets 107 . . . , 108 . . . are preliminarily fixed can be fitted to the wheel 68. Thus, the process of assembly is improved as compared with the case where, for example, the permanent magnets are fitted directly to the wheel.

Figure 14:
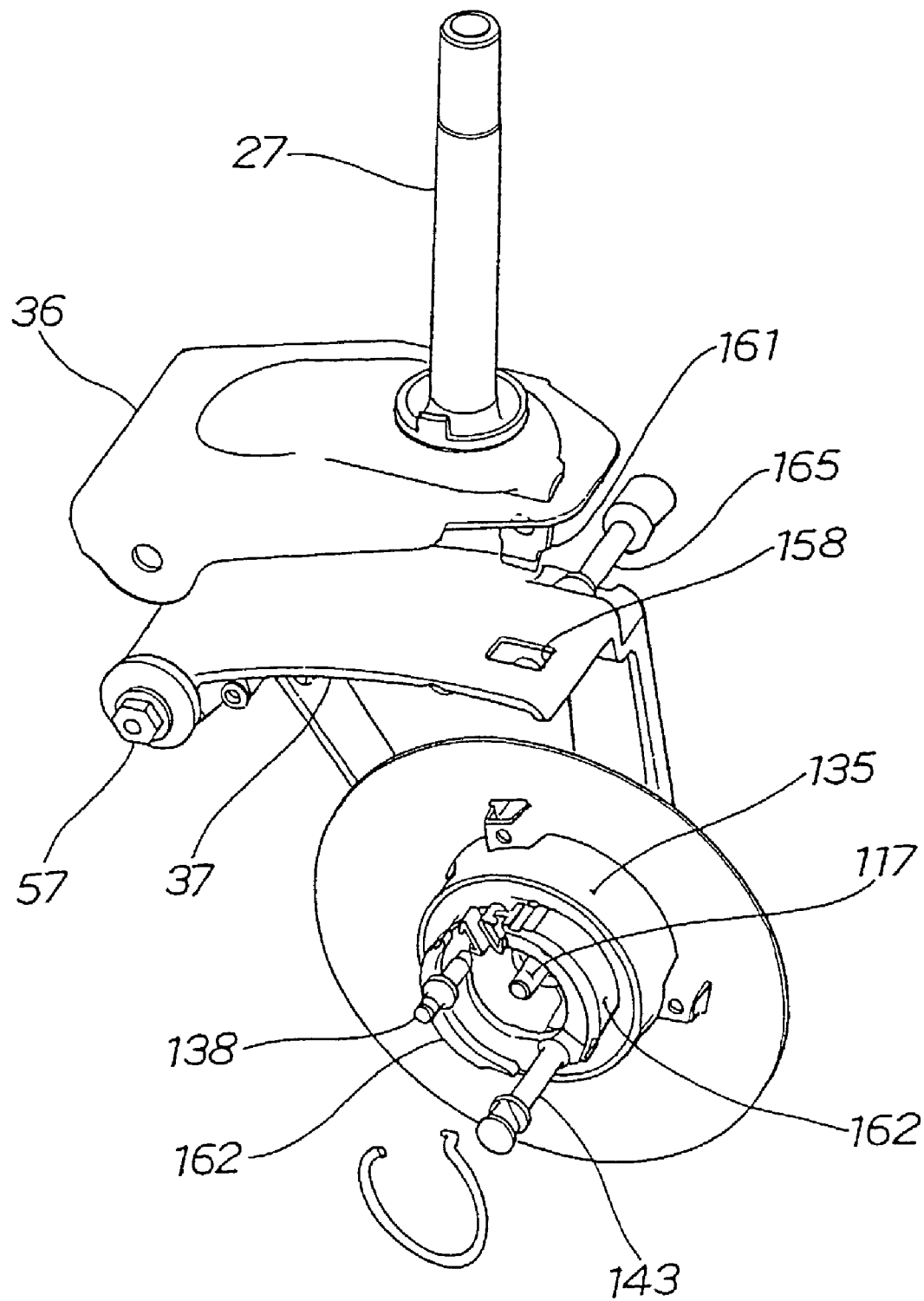
FIG. 14 is a perspective view of a major part on the front wheel side of the two-wheel vehicle according to the present invention.

FIG. 14 is a perspective view of a major part on the front wheel side of the two-wheel vehicle according to the present invention. The lower portion arm 36 is shown fitted to a lower portion of the handle shaft 27, the front swing arm 37 is fitted to the lower portion arm 36 through the front swing shaft 57, a window portion 158 is provided at an upper portion of the front swing arm 37, and a projected piece 161 to be inserted into the window portion 158 is provided on a lower surface of the lower portion arm 36. Brake shoes 162, 162 are swingably fitted to the brake shoe shaft 138 through the cam shaft 143.

Figure 15:
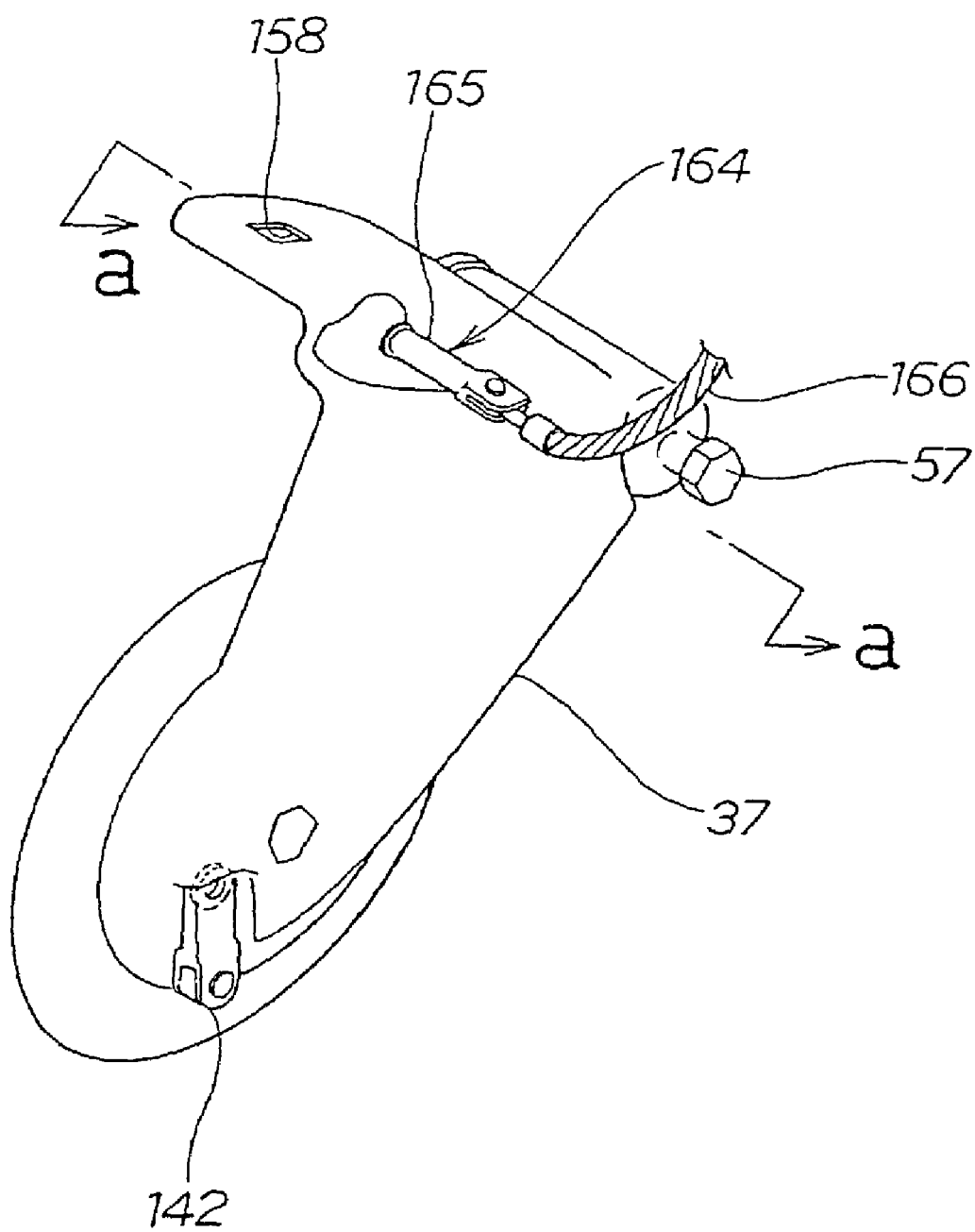
FIG. 15 is a perspective view for illustrating a front swing arm of the two-wheel vehicle according to the present invention.

FIG. 15 is a perspective view for illustrating the front swing arm of the two-wheel vehicle according to the present invention, and shows a construction in which a swing arm lock mechanism 164 for locking the swinging of the front swing arm 37 is provided at an upper portion of the front swing arm 37.

The swing arm lock mechanism 164 includes an arm lock pin 165, and a cable 166 connected to an end portion of the arm lock pin 165.

Figures 16A, 16B:
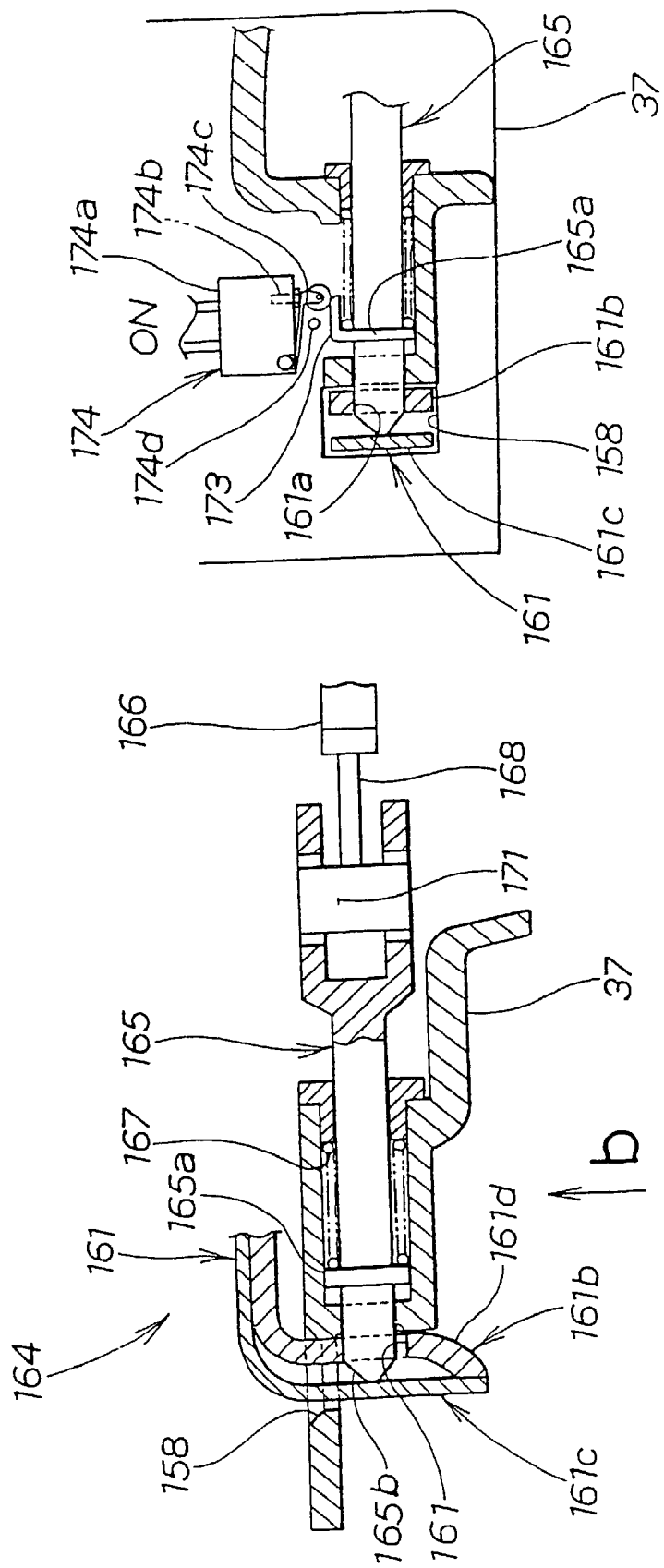
FIGS. 16(a) and (b) are sectional views illustrating a swing arm lock mechanism for the front swing arm according to the present invention.

FIGS. 16(a) and (b) are sectional views for illustrating the swing arm lock mechanism of the front swing arm according to the present invention. FIG. 16(a) is a sectional view taken along line a—a of FIG. 13, and FIG. 16(b) is a view taken along arrow b of FIG. 16(a).

In FIG. 16(a), the swing arm lock mechanism 164 includes the above-mentioned arm lock pin 165, the cable 166, the above-mentioned projected piece 161 which is inserted through the window portion 158 and to which the tip end of the arm lock pin 165 is connected, and a spring 167 for pushing out the arm lock pin 165 to the tip end side. A wire 168 is movably inserted in the cable 166, a wire end member 171 for connection to the arm lock pin 165 is fitted to the tip end of the wire 168.

The projected piece 161 is a member in which a pin penetration member 161b provided with a penetration hole 161a for penetration of the arm lock pin 165 therethrough and a stopper member 161c for restricting the tip end position of the arm lock pin 165 are laid over each other with a gap therebetween. A curved portion 161d is provided at the tip end of the pin penetration member 161b.

The arm lock pin 165 includes a collar portion 165a provided at an intermediate portion thereof, and a tapered portion 165b provided at a tip end portion thereof.

FIG. 16(b), shows a detection piece 173 provided integrally with the arm lock pin 165a, and a lock detection switch 174 which is turned ON and OFF by movements of the detection piece 173 attendant on movements of the arm lock pin 165 in the axial direction.

The lock detection switch 174 includes a switch main body 174a, a rod 174b capable of coming into and out of the switch main body 174a and pushed outwards by an elastic force of a spring (not shown), and a rollered arm 174c brought into contact with the tip end of the rod 174b. The lock detection switch 174 is turned ON when the rod 174b is pushed in from the outside to the inside, and the lock detection switch 174 is turned OFF when the rod 174b is projected from the inside to the outside. Symbol 174d denotes a stopper pin functioning as a stopper for the rollered arm 174c.

In the condition shown in the figure where the arm lock pin 165 is penetrating through the penetration hole 161a of the projected piece 161, namely, in the locked condition, the detection piece 173 pushes in the rod 174b through the rollered arm 174c, so that the lock detection switch 174 is ON.

Figure 17:
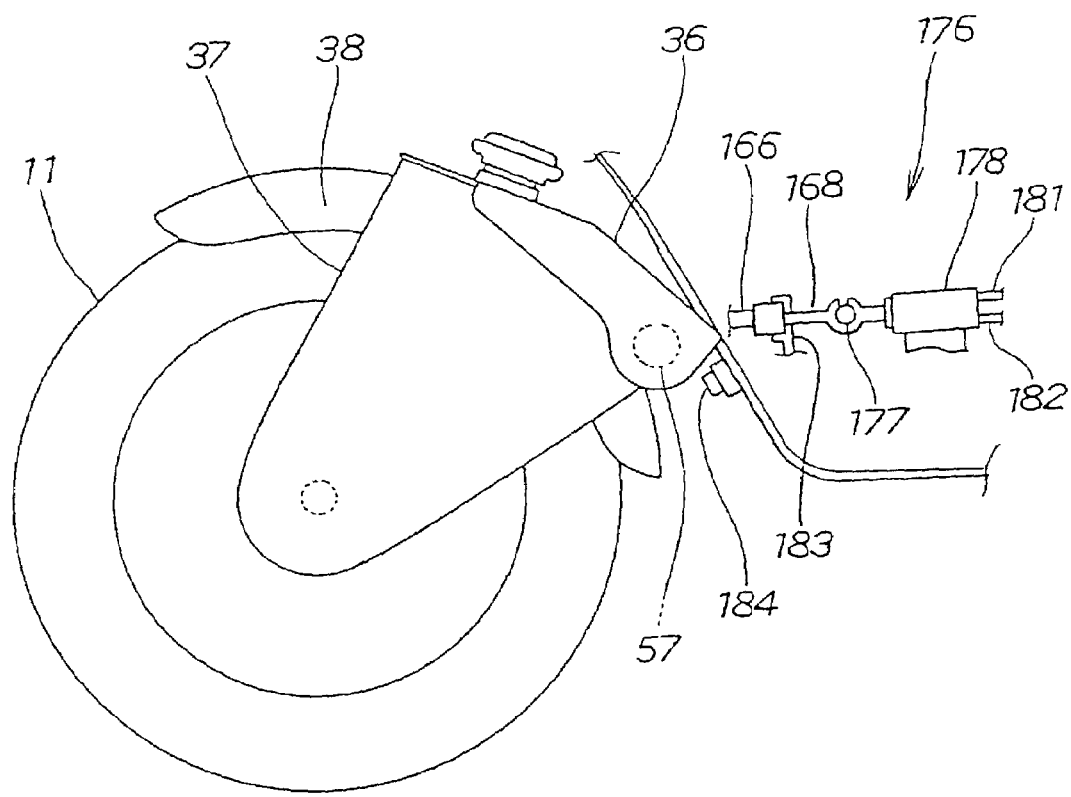
FIG. 17 is a side view of a major part showing a front portion of the two-wheel vehicle according to the present invention.

FIG. 17 is a side view of a major part showing a front portion of the two-wheel vehicle according to the present invention. A swing arm unlocking mechanism 176 for the front swing arm 37 will be described.

The swing arm unlocking mechanism 176 is for ensuring that the front swing arm 37 shown in FIG. 16 can be swung to the rear side of the vehicle body with reference to the lower portion arm 36 by releasing the connection between the projected piece 161 and the arm lock pin 165 shown in FIGS. 16(a) and (b). The figure shows the condition where a wire end member 177 is fitted to an end portion of the wire 168 of the cable 166, and the wire end member 177 is connected to a solenoid-type actuator 178. Conductors 181, 182 pass electric current to the actuator 178, an end portion fitting member 183 is provided on the vehicle body side for fitting an end portion of the cable 166, and a front wheel folding detection switch 184 with which the front fender 38 or the swing arm 37 comes into contact when the swing arm 37 is swung most (namely, the folding is completed), whereby the contact is detected.

Figure 18:
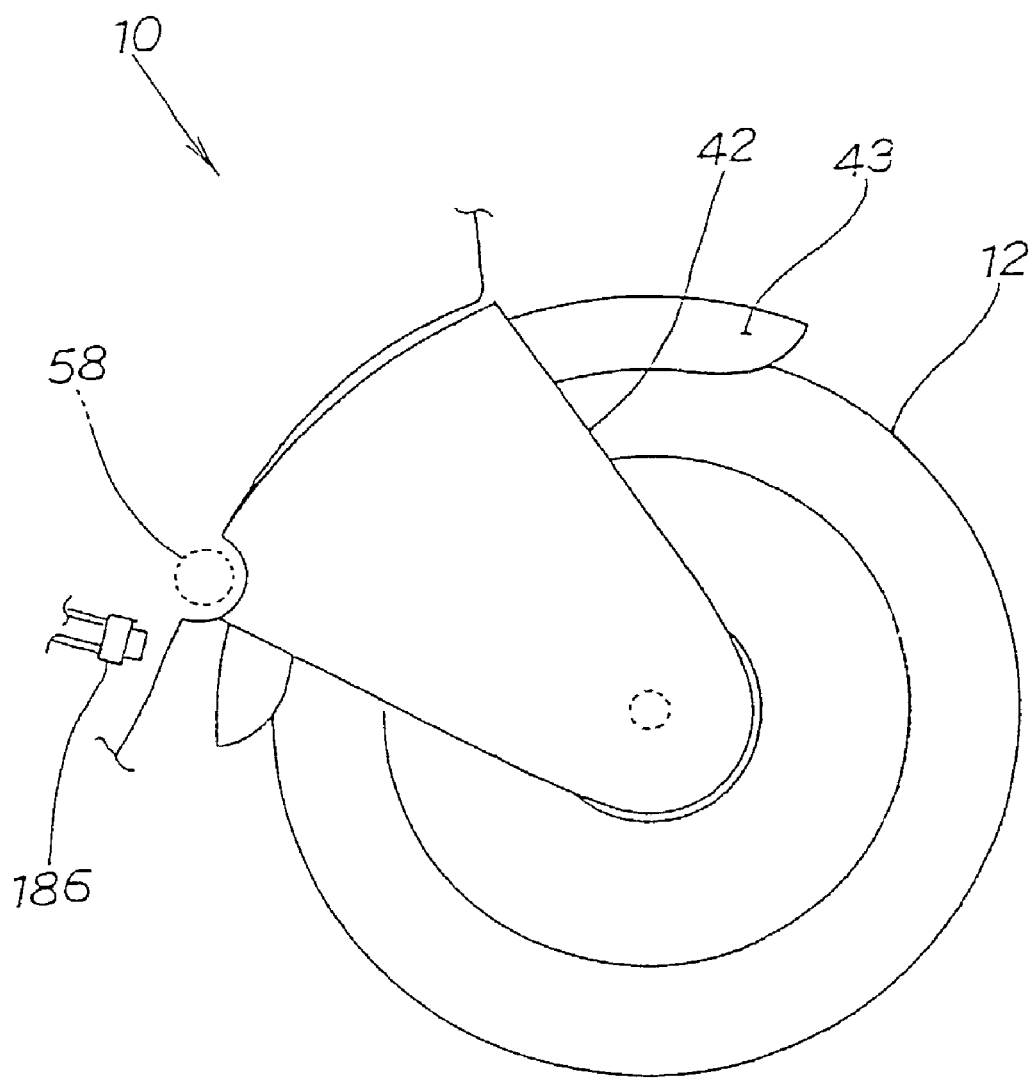
FIG. 18 is a side view of a major part showing a rear portion of the two-wheel vehicle according to the present invention.

FIG. 18 is a side view of a major part showing a rear portion of the two-wheel vehicle according to the present invention, and shows the rear swing arm 42 and the rear wheel 12.

A rear wheel folding detection switch 186 for detecting the contact of the rear fender 43 or the swing arm 42 when the rear swing arm 42 is swung most (namely, the folding is completed) is provided in the vicinity of the rear swing shaft 58, on the side of the vehicle body of the two-wheel vehicle 10. The same mechanisms as the swing arm lock mechanism 164 (See FIG. 15) and the swing arm unlocking mechanism 176 (See FIG. 17) provided on the side of the front wheel 11 (See FIG. 17) are provided also on the side of the rear wheel 12.

The action of folding the front wheel 11 and the rear wheel 12 described above will be described below.

Figure 19:
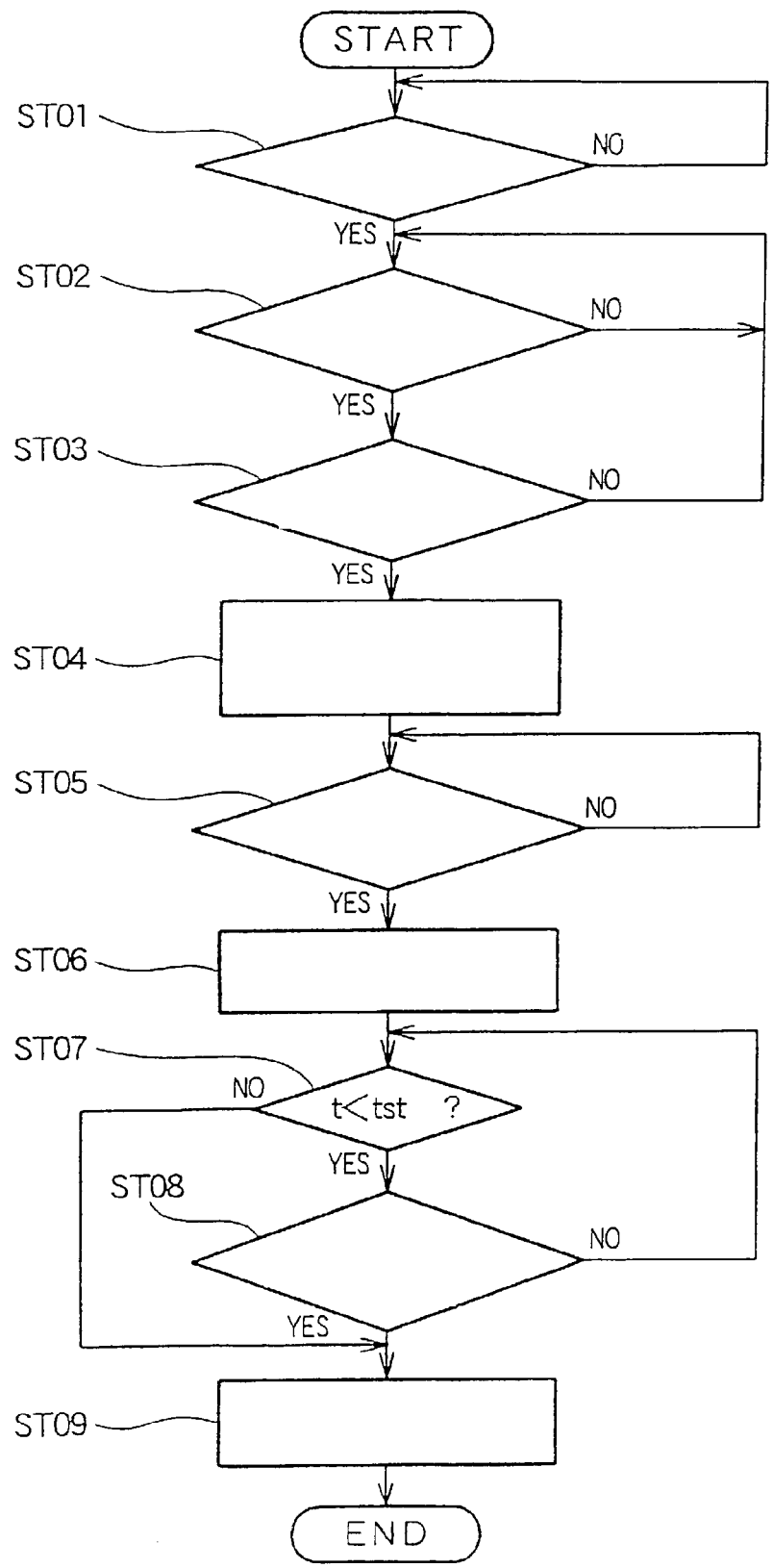
FIG. 19 is a flowchart illustrating the main points of folding the front and rear wheels of the two-wheel vehicle according to the present invention.

FIG. 19 is a flowchart for illustrating the main points of folding the front wheels of the two-wheel vehicle according to the present invention. ST X X represent the step number.

ST01: It is judged whether or not a folding switch (Here, the motor operating switch is referred to as the folding switch in the meaning of using the switch by tilting to the "FOLD" side.) provided on the handle is ON.

When the folding switch is OFF (NO), ST01 is carried out again.

When the folding switch is ON (YES), ST02 is entered.

ST02: It is judged whether or not the front brake has been operated by gripping a front brake lever.

When the front brake has not been operated (NO), ST02 is again carried out.

When the front brake has been operated (YES), ST03 is entered.

ST03: It is judged whether or not the rear brake lever has been ungripped and the rear brake has not been operated.

When the rear brake has been operated (NO), ST02 is again carried out.

When the rear brake has not been operated (YES), ST04 is entered.

ST04: An electric current is passed to the solenoid to operate the actuator, unlocking the front swing arm and the rear swing arm.

ST05: It is judged whether or not the lock detection switch of the lock pin for locking the front swing arm and the rear swing arm is OFF (namely, whether or not the front swing arm and the rear swing arm are unlocked).

When the lock detection switch is ON (NO) (namely, when the locked condition is detected), ST05 is again carried out.

When the lock detection switch is OFF (YES) (namely, when the unlocked condition is detected), ST06 is entered.

ST06: An electric current is passed to the electric motor to rotate the rear wheel forward, thereby starting the folding of the front and rear wheels.

ST07: It is judged whether or not the lapse of time t from the start of passage of the electric current to the electric motor is shorter than a predetermined period of time tst.

When t≧tst (NO), ST09 is entered. This is for cutting off the passage of electric current so as to protect the motor, because it is judged that the folding is not completed even after the lapse of time normally required for folding, namely, it is judged that there is some trouble.

When t<tst (YES), ST08 is entered.

ST08: It is judged whether or not the folding detection switch for the front and rear wheels is ON, namely, whether or not the front and rear wheels have both been completely folded.

When the folding detection switch for the front and rear wheels is OFF (NO), ST07 is again carried out.

When the folding detection switch for the front and rear wheels is ON (YES), ST09 is entered.

ST09: Passage of electric current to the electric motor and the solenoid is stopped.

Next, the action of folding the front and rear wheels will be described along the flow shown in the flowchart in FIG. 19.

First, in FIG. 1, the motor operating switch 24 provided on the right-side handle 18 is tilted to the "FOLD" side.

Then, when the front brake is operated by gripping the front brake lever (not shown) which will be described later provided on the right-side handle 18, the front lever is locked by the brake lock lever, and a rear brake lever (not shown) provided on the left-side handle 17 is not gripped and therefore the rear brake is not operated, a front brake operation detection switch (not shown) detects that the front brake is operated, whereas a rear brake operation detection switch (not shown) detects that the rear brake is not operated. Concurrently, a control device (not shown) passes an electric current to the solenoid shown in FIG. 17, thereby operating the actuator 178.

Figure 20A:
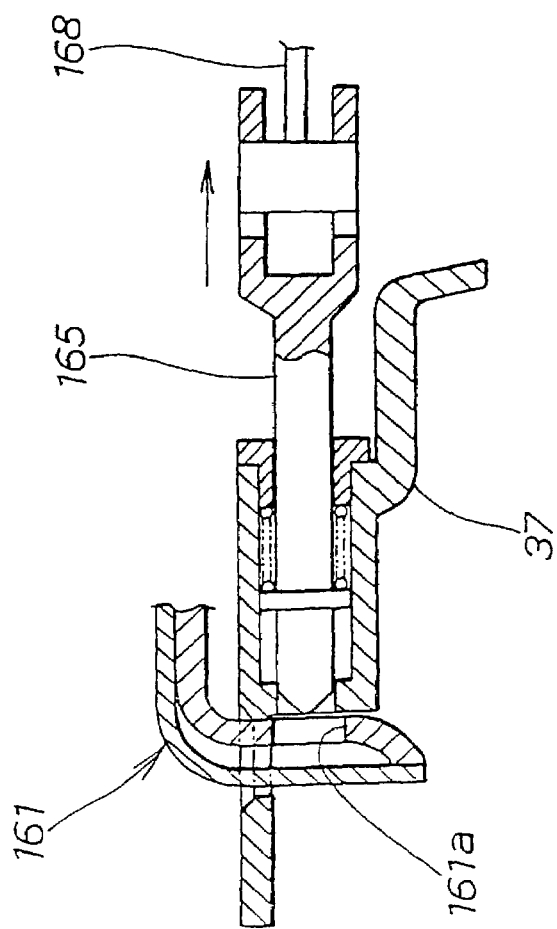
FIGS. 20(a) and (b) are views illustrating the action of the swing arm lock mechanism according to the present invention.

FIGS. 20(a) and (b) are views for illustrating the action of the swing arm unlocking mechanism according to the present invention.

When the actuator 178 (See FIG. 17) is operated, in FIG. 17(a), the arm lock pin 165 is pulled through the wire 168, and is moved as indicated by the arrow, so that the tip end of the arm lock pin 165 is disengaged from the penetration hole 161a of the projected piece 161, and the front swing arm 37 is unlocked.

In FIG. 17(b), when the arm lock pin 165 is disengaged from the penetration hole 161a, the roller of the rollered arm 174c of the lock detection switch 174 comes off from the detection piece 173, so that the lock detection switch 174 is turned OFF.

FIGS. 21(a) and (b) are views for illustrating the action of folding the front and rear wheels according to the present invention.

In FIGS. 17(a) and (b), when the lock detection switch 174 (See FIG. 16(b)) is turned OFF, the control device starts passing an electric current to the electric motor 116, and the rear wheel 12 is driven at a low speed by the electric motor 116. The rotating direction of the electric motor 116, namely, of the rear wheel 12 at this time is the forward rotation direction (the rotating direction at the time of running, namely, the direction of the arrow).

By this, the rear wheel 12 moves to the front side of the vehicle body (the direction of the void arrow (front) is the front side). At this time, the front wheel 11 is in the braked condition and is not moved to the front side of the vehicle body, so that the distance between the front wheel 11 and the rear wheel 12 is decreased. As a result, the front swing arm 37 and the rear swing arm 42 which are respectively unlocked with reference to the vehicle body, are gradually tilted with the front swing shaft 57 and the rear swing shaft 58 as centers, respectively, into folded conditions.

Then, when the predetermined period of time has elapsed from the start of the passage of electric current to the electric motor 116 or when the front wheel folding detection switch 184 and the rear wheel folding detection switch 186 are both turned ON, the control device stops the passage of electric current to the electric motor 116. By this, the folding of the front and rear wheels 11, 12 is completed.

Next, the action of unfolding the front wheel 11 and the rear wheel 12 which have been folded will be described below.

Figure 20B:
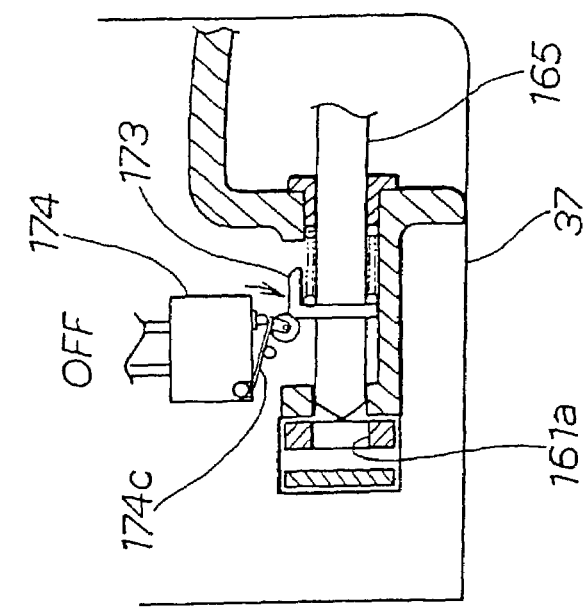

FIG. 20 is a flowchart for illustrating the main points of unfolding the front and rear wheels of the two-wheel vehicle according to the present invention. ST X X represents a step number.

ST11: It is judged whether or not an unfolding switch (Here, the motor operating switch is referred to as the unfolding switch in the meaning of using the motor operating switch by tilting to the "UNFOLD" side.) provided on the handle is ON.

When the unfolding switch is OFF (NO), ST11 is again carried out.

When the unfolding switch is ON (YES), ST12 is entered.

ST12: It is judged whether or not the front brake has been operated by gripping the front brake lever.

When the front brake has not been operated (NO), ST12 is again carried out.

When the front brake has been operated (YES), ST13 is entered.

ST13: It is judged whether or not the rear brake lever has been ungripped and the rear brake has not been operated.

When the rear brake has been operated (NO), ST12 is again carried out.

When the rear brake has not been operated (YES), ST14 is entered.

ST14: It is judged whether or not the lock detection switches on the front swing arm side and on the rear swing arm side are OFF.

When the lock detection switches are ON (NO), ST14 is carried out again.

When the lock detection switches are OFF (YES), ST15 is entered.

ST15: An electric current is passed to the electric motor to rotate the rear wheel reversely, thereby starting to unfold the front and rear wheels.

ST16: It is judged whether or not the lapse of time t from the start of passage of electric current to the electric motor is shorter than a predetermined period of time tst.

When t≧tst (NO), ST16 is again carried out.

When t<tst (YES), ST17 is entered.

ST17: The passage of electric current to the electric motor is stopped.

The condition of ST14 mentioned above will be described referring to the following figure.

FIGS. 23(a), (b) are views for illustrating the condition of the lock detection switch according to the present invention.

In FIG. 23(a), in the condition where the front and rear wheels are folded, the projected piece 161 (See FIG. 20(a)) is located on the outside of the window 158, so that there is nothing that restricts the position of the tip end of the arm lock pin 165, and the arm lock pin 165 is in the condition of being moved to the most left-side position in the figure by an elastic force of the spring 167.

In FIG. 23(b), with the arm lock pin 165 moved to the most left-side position, the roller of the lock detection switch 174 comes off from the detection piece 173, so that the lock detection switch 174 is turned OFF.

Based on this OFF condition, the control device starts passing an electric current to the electric motor 116, in FIGS. 21(a) and (b), so that the front and rear wheels 11, 12 are unfolded.

Next, the condition immediately before completion of the unfolding of the front and rear wheels 11, 12 will be described.

Figure 24A:
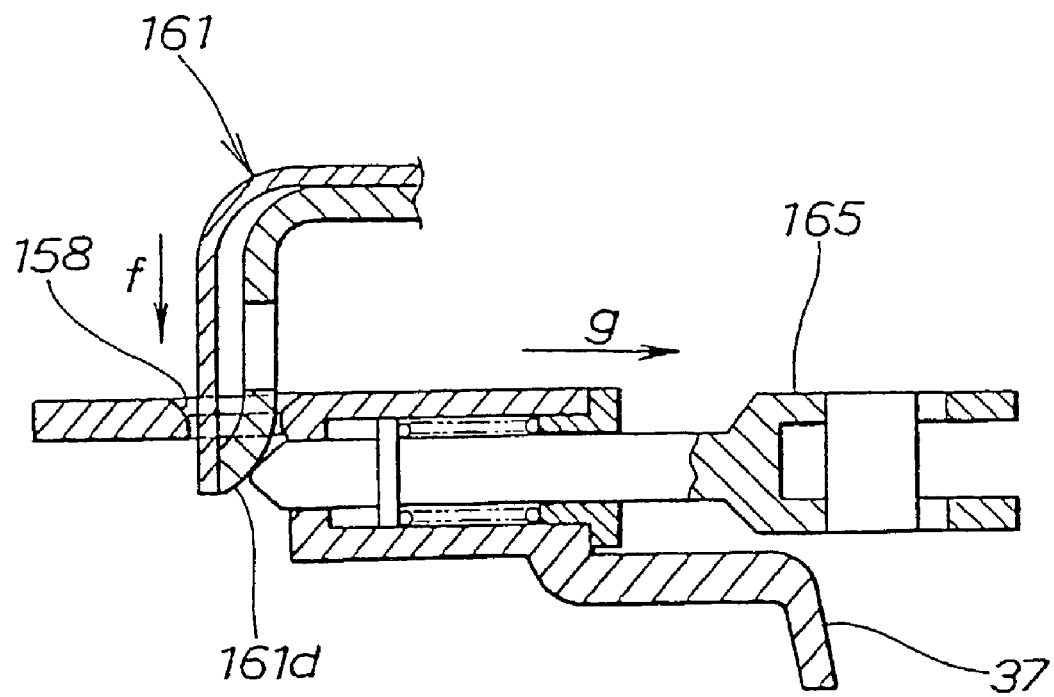
FIGS. 24(a) and (b) are views illustrating the action of the swing arm lock mechanism according to the present invention.

FIGS. 24(a) and (b) are views for illustrating the action of the swing arm lock mechanism according to the present invention.

FIG. 24(a) shows the condition where the unfolding of the front and rear wheels 11, 12 (See FIGS. 21(a) and (b)) has proceeded, the projected piece 161 has entered into the window 158 as indicated by arrow f, and the curved portion 161d of the projected piece 161 has retreated the arm lock pin 165 in the direction of arrow g.

Figure 24B:
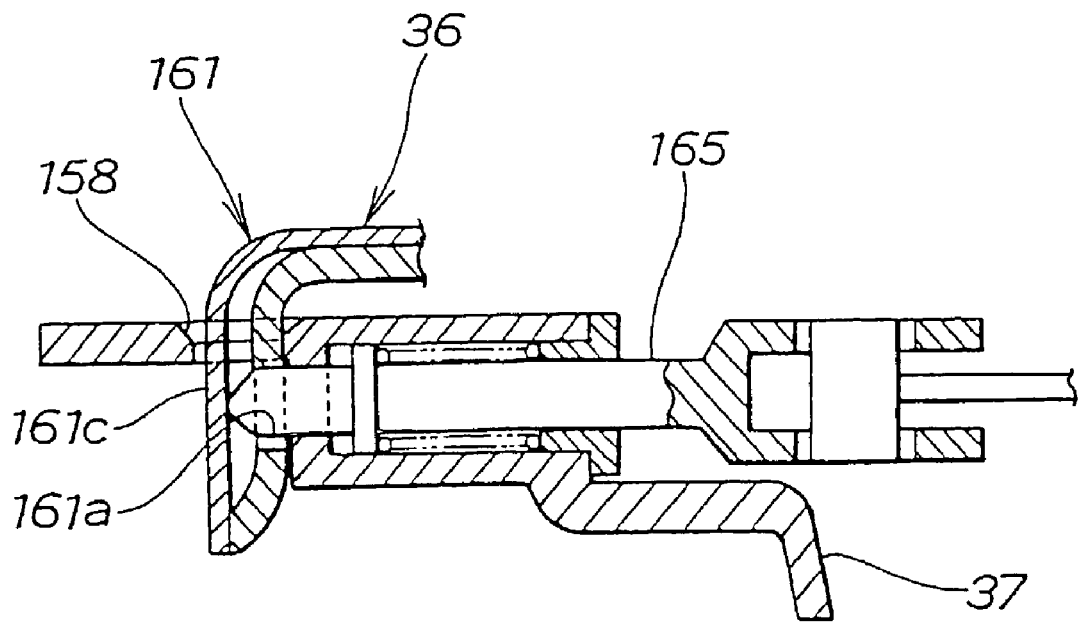

FIG. 24(b) shows the condition where the projected piece 161 has further entered into the window 158 from the condition of FIG. 24(a), and the tip end of the arm lock pin 165 has penetrated through the penetration hole 161a of the projected piece 161 to make contact with the stopper member 161c, namely, the front swing arm 37 is locked with reference to the lower portion arm 36.

Figure 22:
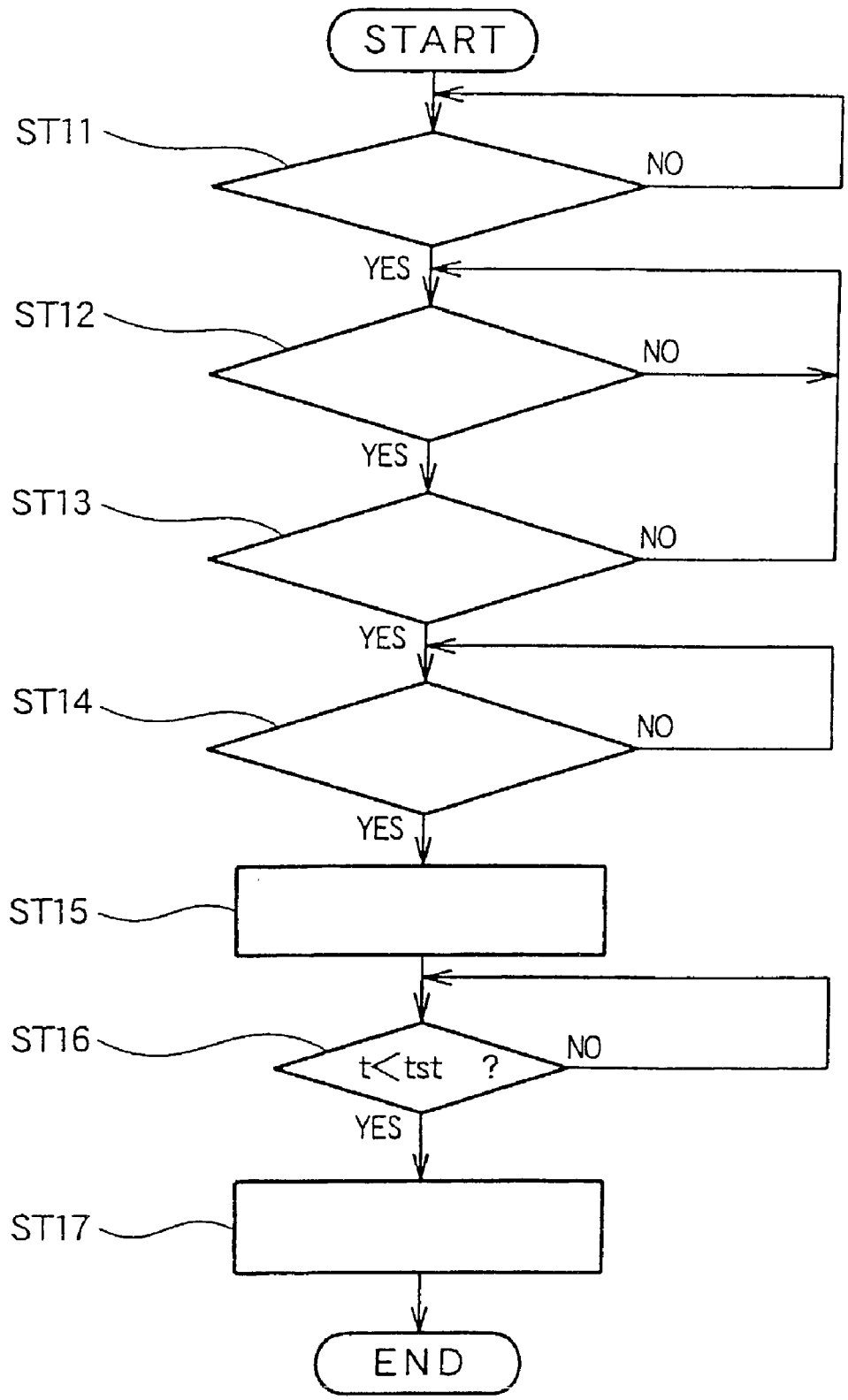
FIG. 22 is a flowchart illustrating the main points of unfolding the front and rear wheels of the two-wheel vehicle according to the present invention.

In this condition, the lock detection switch 174 shown in FIG. 23(b) is ON in the same manner as shown in FIG. 16(b), and based on this ON condition, the passage of electric current to the electric motor 116 (See FIG. 21(b)) is stopped in conjunction with the procedure of ST16 in FIG. 22.

Figure 25:
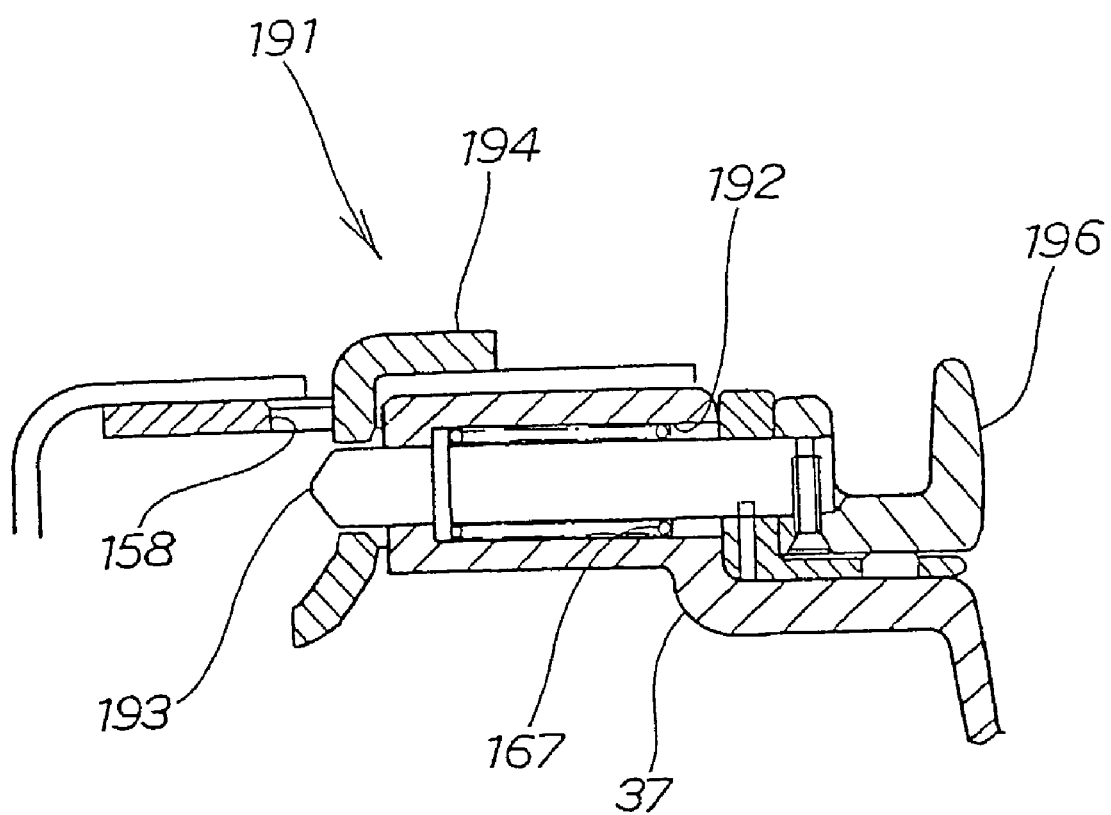
FIG. 25 is a sectional view showing another mode of carrying out the swing arm lock mechanism according to the present invention.

FIG. 25 is a sectional view showing another mode of carrying out the swing arm lock mechanism for the front wheel or the rear wheel according to the present invention.

The swing arm lock mechanism 191 includes an arm lock pin 193 inserted in a pin hole 192 provided in the front swing arm 37, a projected piece 194 inserted through the window portion 158 and connected to a tip end portion of the arm lock pin 193, and the spring 167 for pushing out the arm lock pin 193 to the tip end portion side.

The arm lock pin 193 is provided at its end portion with a handle 196 for pulling manually. With this structure, the front and rear swing arms can be unlocked simply by hand and the folding can also be carried out manually, so that the system becomes low in price and small in weight.

Figure 26:
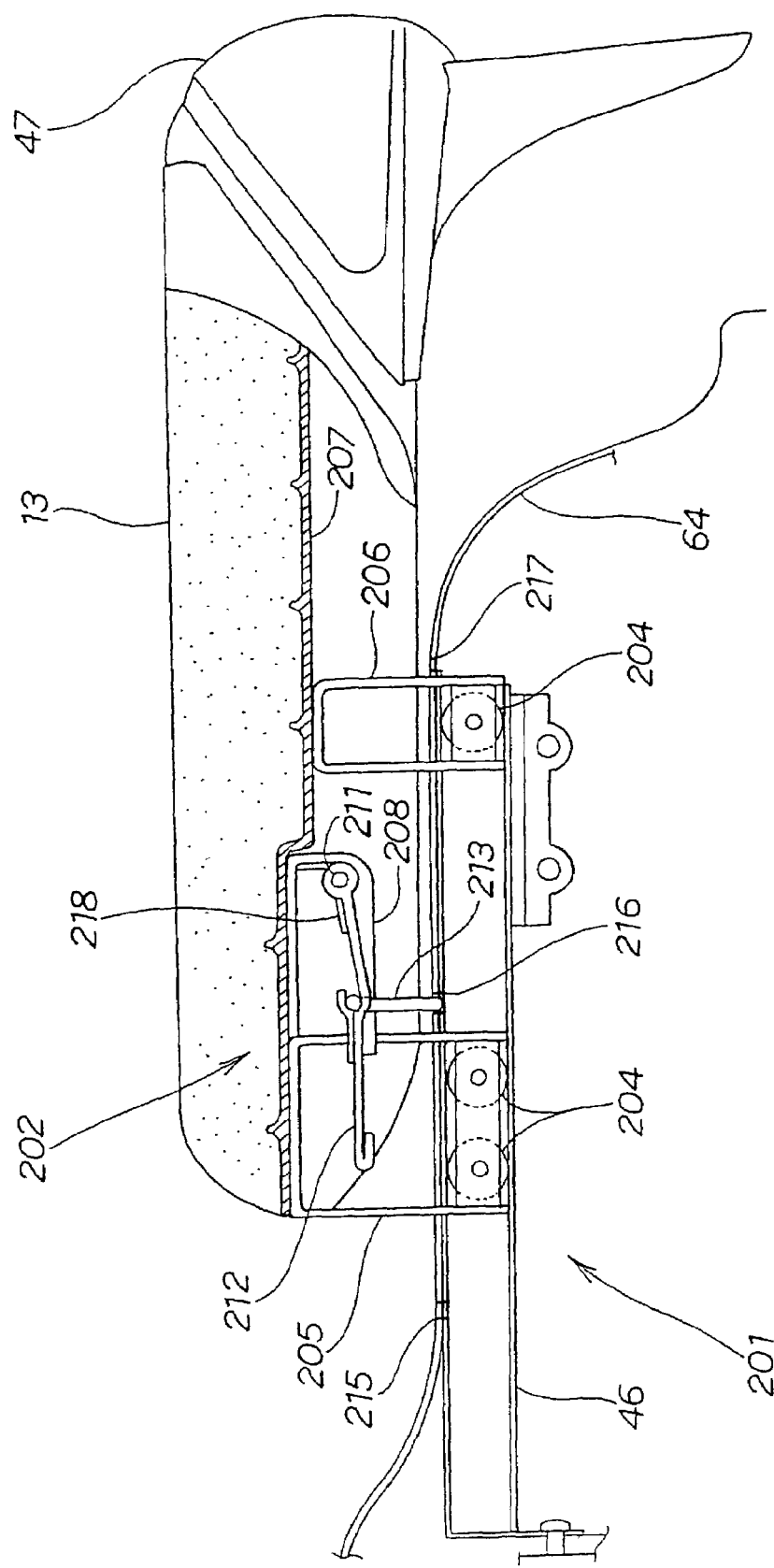
FIG. 26 is a sectional view of a seat of the two-wheel vehicle according to the present invention.

FIG. 26 is a sectional view of the seat of the two-wheel vehicle according to the present invention, and shows a part in side view.

The seat 13 is provided additionally with a slide mechanism 201 capable of sliding in the front-rear direction of the vehicle body, and a stopper mechanism 202 for restricting the sliding of the seat 13 by the slide mechanism 201.

The slide mechanism 201 includes a left-right pair of seat rails 46, 46 (the seat rail 46 on one side is not shown) extended in the front-rear direction of the vehicle body, and roller support members 205, 206 movably fitted to the seat rails 46, 46 through rollers 204 . . . .

The roller support members 205, 206 are members fitted to a bottom plate 207 provided on the back side of the seat 13.

The stopper mechanism 202 includes a base member 208 fitted to the bottom plate 207, a support shaft 211 provided on the base member 208, a stopper release lever 212 swingably fitted to the support shaft 211. The stopper mechanism 202 also includes a stopper member 213 fitted to the stopper release lever 212, and front portion insertion holes 215, intermediate portion insertion holes 216 and rear portion insertion holes 217 (the front portion insertion hole 215, the intermediate portion insertion hole 216 and the rear portion insertion hole 217 on the side of the side cover 63 are not shown) provided respectively in upper portions of side covers 63, 64 (the side cover 63 on one side is not shown) for inserting the tip ends of the stopper member 213. A torsion spring 218 presses the stopper release lever 212 and the stopper member 213 downwards.

The seat position shown in the figure, namely, the position where the lower ends of the stopper member 213 are inserted in the intermediate portion insertion holes 216, 216 (symbol 216 on the deep side is not shown) to restrict the movement of the seat 13, is the position at the time of normal running.

Figure 27:
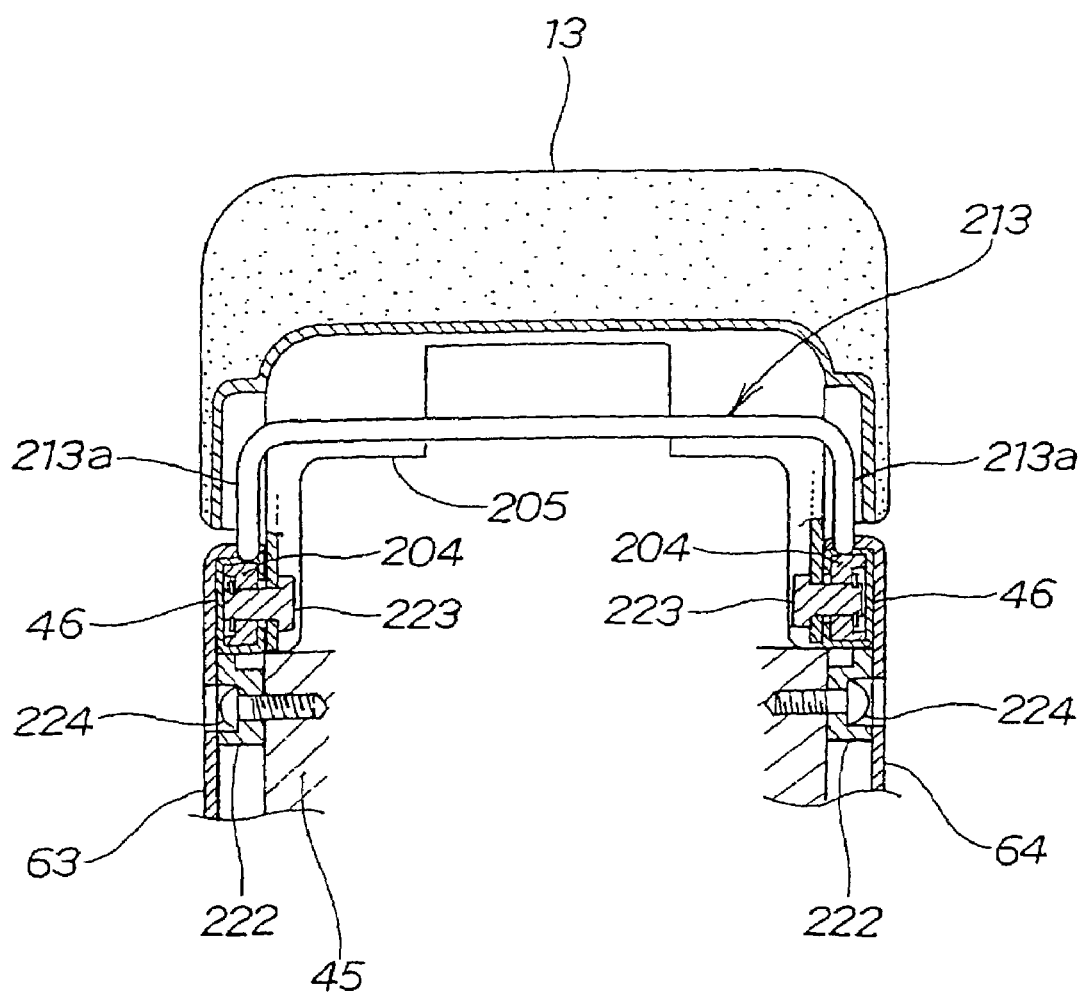
FIG. 27 is a sectional view of a slide mechanism and a stopper mechanism provided additionally to the seat according to the present invention.

FIG. 27 is a sectional view of the slide mechanism and the stopper mechanism provided additionally to the seat according to the present invention. Shown is the condition where the seat rails 46, 46 substantially C-shaped in section are fitted to the seat frame 45 through brackets 222, 222, roller shafts 223 are fitted respectively to both sides of a roller support member 205, and rollers 204 . . . disposed respectively in the seat rails 46, 46 are fitted to the roller shafts 223. Small screws 224 fit the bracket 222 to the seat frame 45.

The stopper member 213 is a member U-shaped in front view, in which the tip ends of vertical portions 213a, 213a on both sides are inserted into front portion insertion holes 215, the intermediate portion insertion holes 216 or the rear portion insertion holes 217 (See FIG. 25) provided in both of the side covers 63, 64 and the slide rails 46.

The action of the seat 13 described above will be described below.

Figure 28:
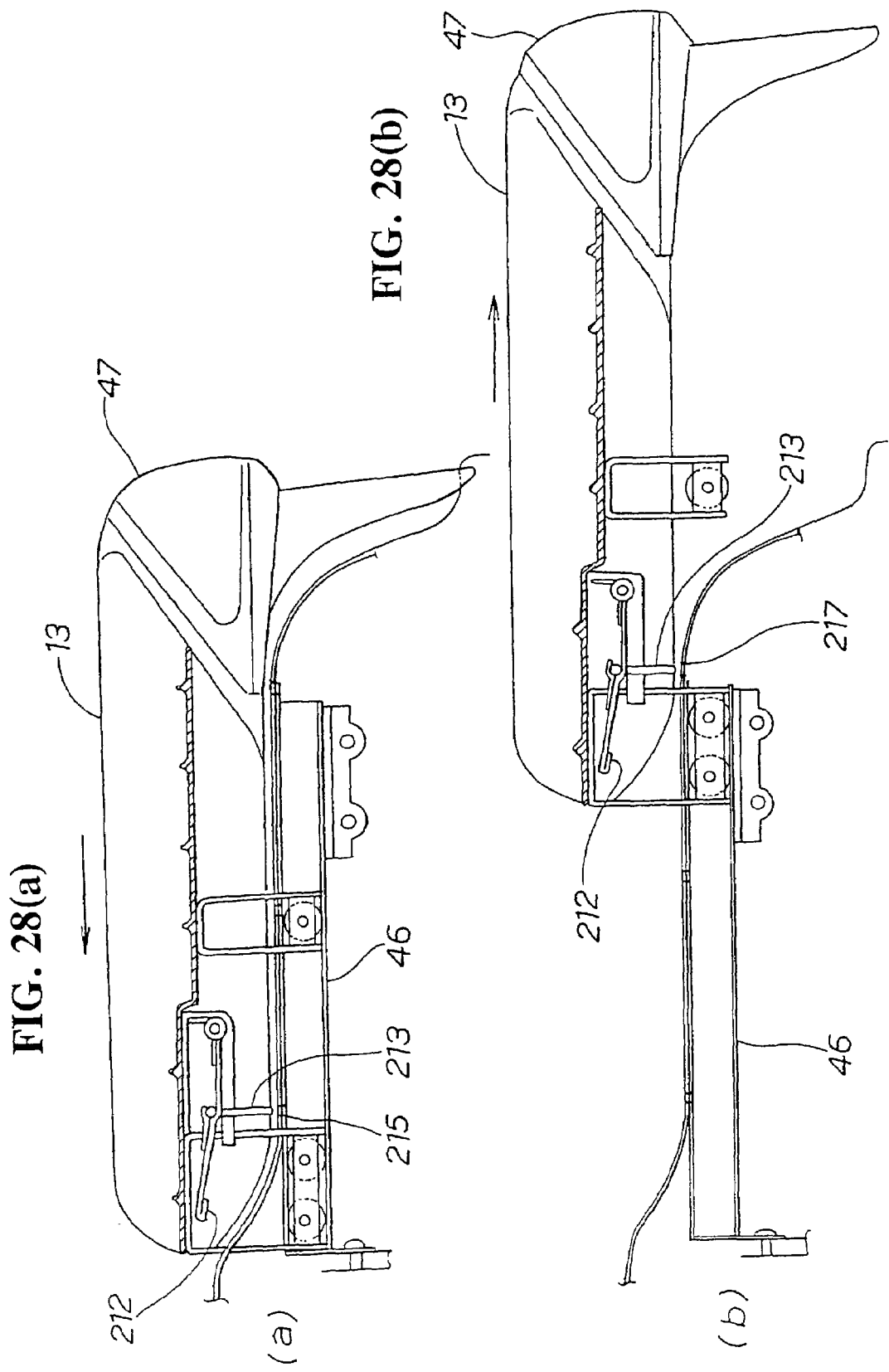
FIG. 28 is an action view for illustrating the action of the seat of the two-wheel vehicle according to the present invention.

FIG. 28 is an action view for illustrating the action of the seat of the two-wheel vehicle according to the present invention.

First, in FIG. 24, a hand is put in from the front side of the seat 13 to the lower side of the seat 13, and the stopper release lever 212 is swung upwards. By this, the lower ends of the stopper member 213 are made to come out of the intermediate portion insertion holes 216, so that the seat 13 can be slid.

With the stopper release lever 212 left swung upwards, the seat 13 is moved to the most front side portion as indicated by the arrow, as shown in FIG. 27(a). Then, the stopper release lever 212 is lowered, and the tip ends of the stopper member 213 are inserted into the front portion insertion holes 215, whereby the seat 13 can be fixed at the most front side position of sliding.

Such a movement of the seat 13 to the most front side portion is carried out at the time of folding the two-wheel vehicle 10 (See FIG. 2). When the handles are folded at this position, the stopper release lever cannot be operated from the front portion of the seat, due to the interference by the handles. Therefore, when the handles are locked, the containing space under the seat is also locked, which is effective for protection of luggage.

In addition, in FIG. 24(b), when the stopper release lever 212 is swung upwards, the seat 13 is moved to the most rear side portion as indicated by the arrow, then the stopper release lever 212 is lowered and the tip ends of the stopper member 213 are inserted 213 are inserted into the rear portion insertion holes 217, the seat 13 can be fixed at the most rear side position of sliding.

Such a movement of the seat 13 to the most rear side portion is carried out at the time of containing small articles or the like into the containing net 66 (See FIG. 2) which is a containing portion of the two-wheel vehicle 10 (See FIG. 2) or at the time of taking out small articles or the like from the containing net 66. When a multiplicity of the above-mentioned insertion holes are provided, an adjustment of the seat position according to the physique of the driver is also possible. Thus, in addition to the above-mentioned adjustments, a more useable seat structure is achieved.

Figure 29:
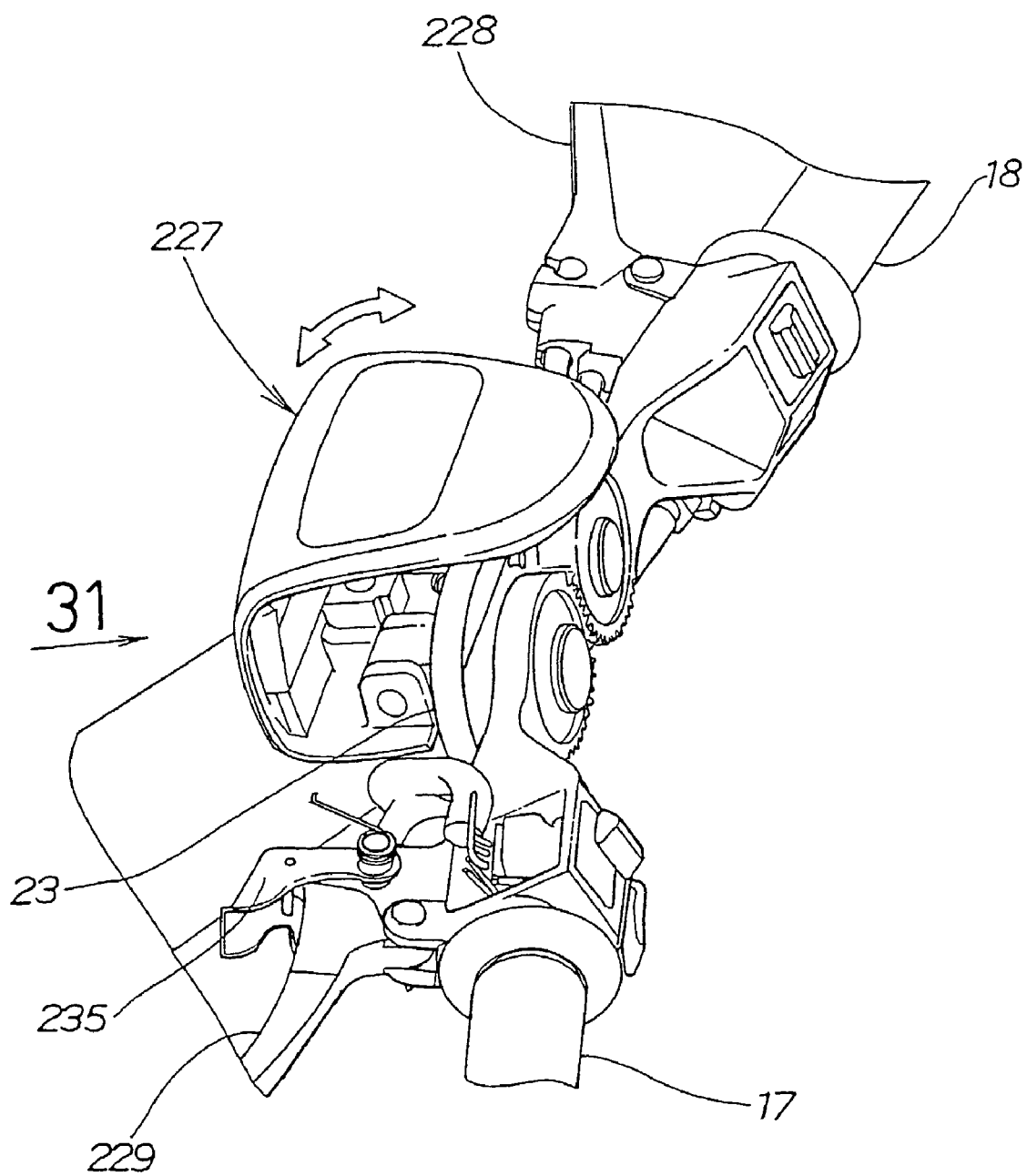
FIG. 29 is a perspective view showing the condition of the surroundings of handles of the two-wheel vehicle according to the present invention.

FIG. 29 is a perspective view showing the condition of the surroundings of the handles of the two-wheel vehicle according to the present invention, in which handle covers fitted over the handles 17, 18 are omitted.

The handles 17, 18 are foldably fitted to the handle post 23, and are supported by a handle support mechanism 227 for locking the handles 17, 18 to prevent the handles 17, 18 from being folded at the time of normal running and for unlocking the handles 17, 18 at the time of folding. Also shown is the front brake lever 228, and the rear brake lever 229.

Figure 30:
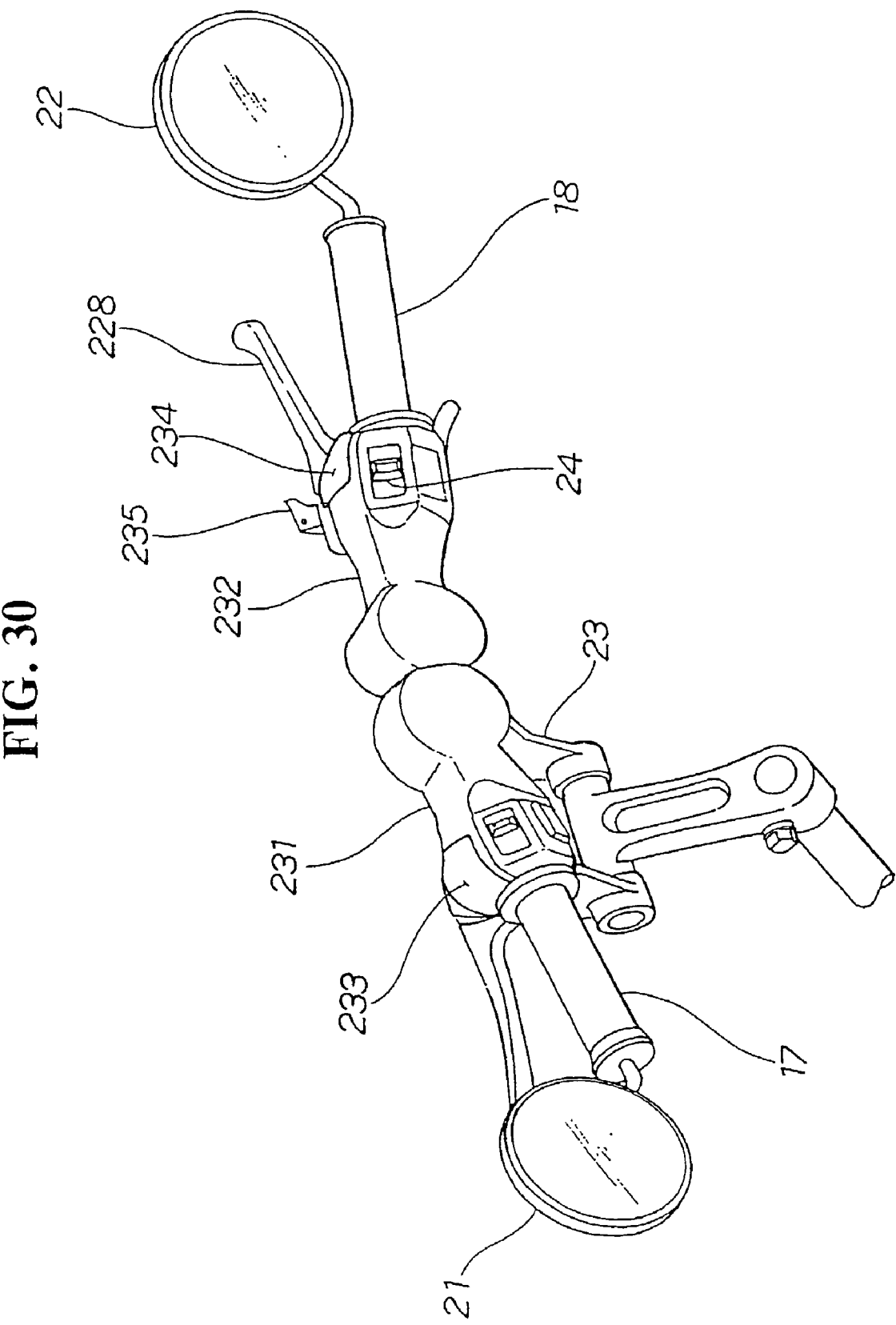
FIG. 30 is a perspective view of the handles of the two-wheel vehicle according to the present invention.

FIG. 30 is a perspective view of the handles of the two-wheel vehicle according to the present invention. The handles 17, 18 are members over which handle covers 231, 232 functioning also as switch cases are fitted, and the handle covers 231, 232 are provided respectively with winkers 233, 234.

When the brake lock lever 235 is operated while gripping the front brake lever 228, the stroked condition of the front brake lever 228 can be maintained (namely, can be locked). When the brake lock lever 235 is again operated, the locked condition of the front brake lever 228 can be released.

Figure 31:
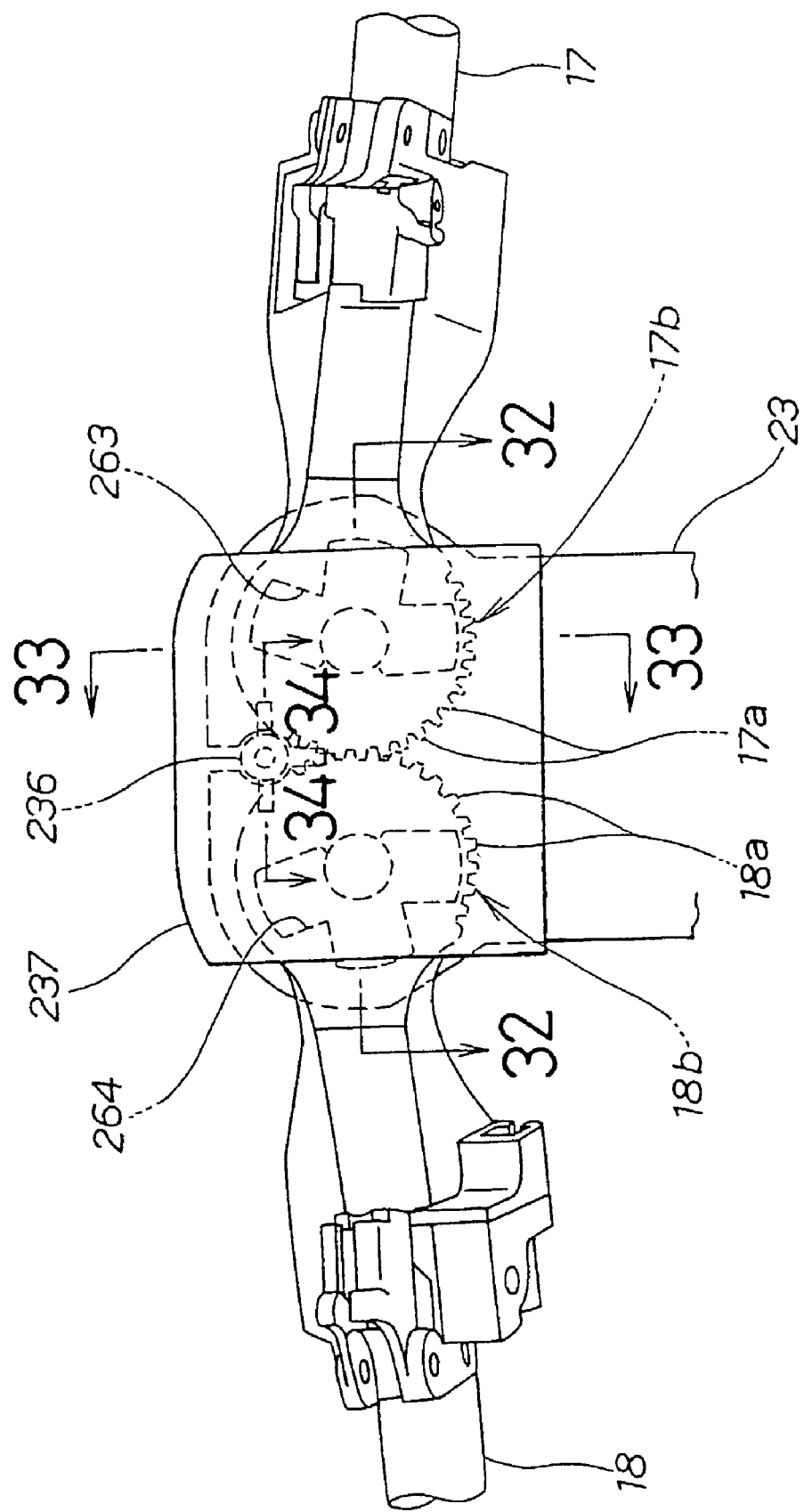
FIG. 31 is a view taken along arrow 31 of FIG. 29.

FIG. 31 is a view taken along arrow 31 of FIG. 29, and shows the condition where meshing portions 17b, 18b provided respectively with tooth portions 17a . . . , 18a . . . which are meshed with each other are provided at inside end portions of the handles 17, 18. By meshing the tooth portions 17a . . . , 18a . . . with each other, the respective handles 17, 18 can be folded at the same angle when the handles 17, 18 are folded, and can be returned with high accuracy to original positions at the time of running when the folded handles 17, 18 are unfolded. This is because the portions not provided with tooth portions function as stoppers.

In addition, the figure shows the condition where a knob 236 as a component part for locking or unlocking the folding of the left and right handles 17, 18 is disposed on the upper side of a position between the meshing portions 17b, 18b of the handles 17, 18. Numeral 237 denotes a handle clamp lever which will be detailed later.

Figure 32:
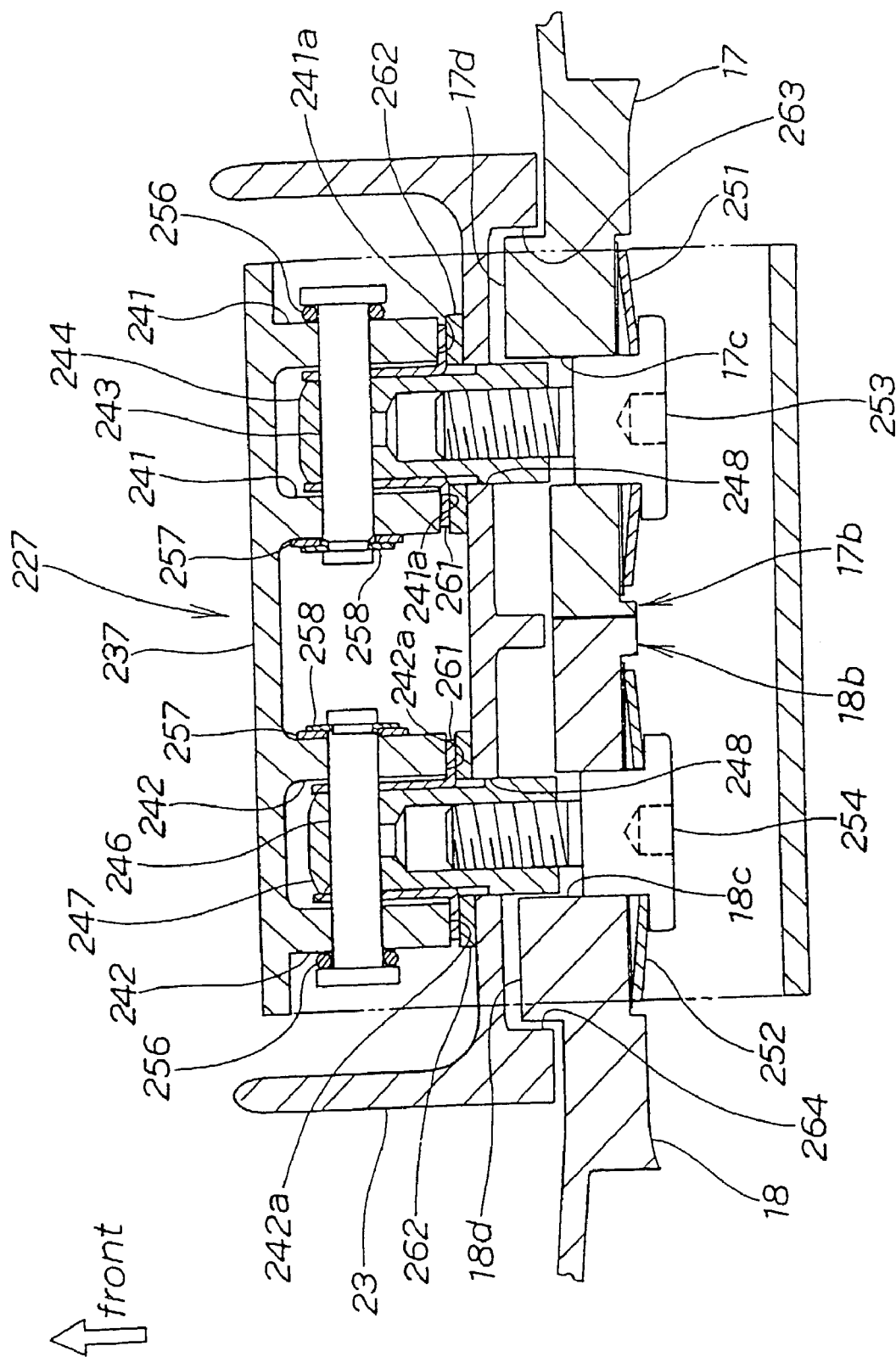
FIG. 32 is a sectional view taken along line 32—32 of FIG. 31.

FIG. 32 is a sectional view taken along line 32—32 of FIG. 31, and shows the condition where the handle clamp lever 237 is provided with projected walls 241, 241 and projected walls 242, 242. A nut member 244 is connected between the projected walls 241, 241 through a connection pin 243, and similarly a nut member 247 is connected between the projected walls 242, 242 through a connection pin 246. The nut members 244, 247 are made to penetrate through penetration holes 248, 248 provided in the handle post 23 from the front side of the vehicle body (the direction of void arrow (front) is the front side of the vehicle body). Center holes 17c, 18c provided at centers of the meshing portions 17b, 18b of the handles 17, 18 are adjusted to the thus penetrating nut members 244, 247 from the rear side of the vehicle body of the handle post 23, and center bolts 253, 254 are inserted into the center holes 17c, 18c through Bellville springs 251, 252 and are screwed into the nut members 244, 247.

Also shown are rings 256, 256, washers, 257, 257, stop rings 258, 258, spacers 261, 261, washers 262, 262, and recessed portions 263, 264provided in the handle post 23 for containing parts of the handles 17, 18.

Returning to FIG. 31, the recessed portions 263, 264 are portions having profiles substantially T-shaped in rear view, and the handles 17, 18 are provided with projected portions 17d, 18d (See FIG. 32) having substantially the same profiles as the recessed portions 263, 264, on the back side of the meshing portions 17b, 18b. When the projected portions 17d, 18d are contained in the recessed portions 263, 264, the handles 17, 18 cannot be rotated and cannot be folded.

In FIG. 32, the handle support mechanism 227 is an assembly constituted mainly of the handle clamp levers 237, the connection pins 243, 246, the nut members 244, 247, the Bellville springs 251, 252, the center bolts 253, 254, the washers 262, 262 and the knob 236 (See FIG. 29) mentioned above.

Figure 33:
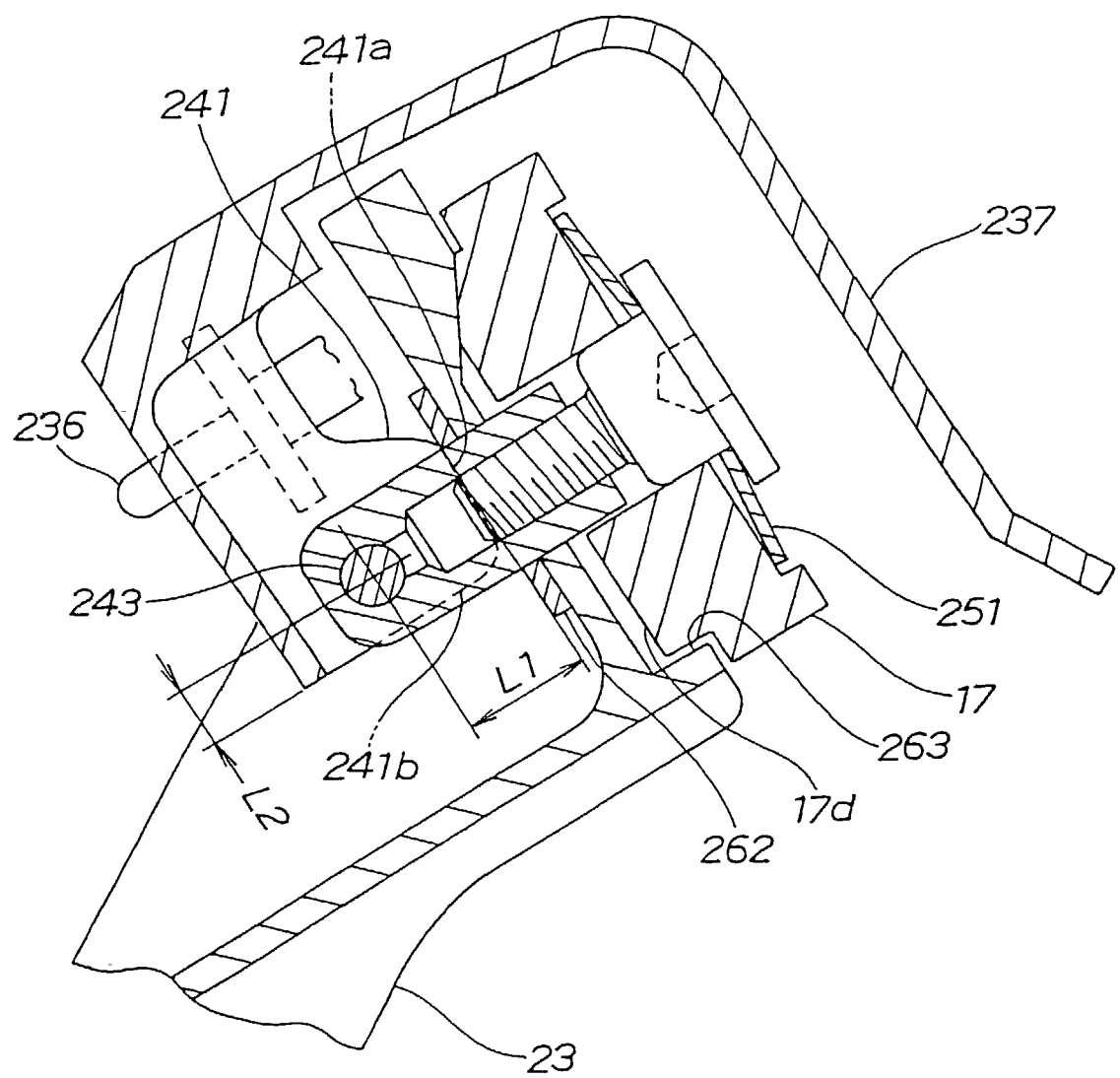
FIG. 33 is a sectional view taken along line 33—33 of FIG. 31.

FIG. 33 is a sectional view taken along line 33—33 of FIG. 31. The handle clamp lever 237 is a member having a construction in which first end portions 241a, 241a (symbol 241a on one side is not shown) of the projected walls 241, 241 (the projected wall 241 on one side is not shown) are pressed against the washer 262 by an elastic force of the Bellville spring 251, and the distance between the first end portions 241a, 241a and the axis of the connection pin 243 is L1, while the distance between second end portions 241b, 241b (symbol 241b on one side is not shown) of the projected walls 241, 241 and the axis of the connection pin 243 is L2, where L1>L2.

As for the projected walls 242, 242 of the handle clamp lever 237 shown in FIG. 32, similarly, first end portions 242a, 242a are pressed against the washer 262 by an elastic force of a Bellville spring 252. The distance between the first end portions 242a, 242a and the axis of the connection pin 246 is L1, while the distance between second end portions (not shown) of the projected walls 242, 242 and the axis of the connection pin 246 is L2.

Figure 34:
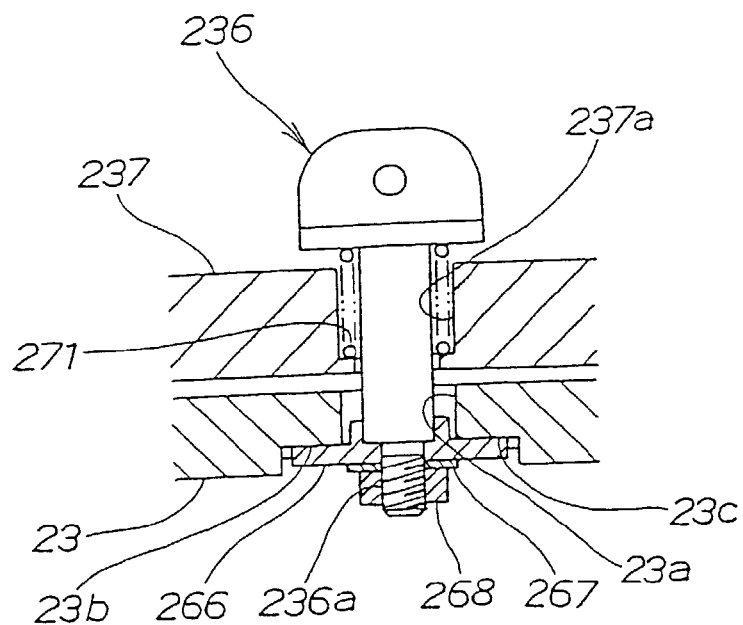
FIG. 34 is a sectional view taken along line 34—34 of FIG. 31.

FIG. 34 is a sectional view taken along line 34—34 of FIG. 31, and is a sectional view showing the fitting condition of the knob 236.

The knob 236 is a member passed through a penetration hole 237a provided in the handle clamp lever 237 and through a cutout portion 23a provided in the handle post 23, and provided at its tip end with a male screw portion 236a to which a bar 266 is fitted and a nut 268 is screw-connected through a washer 267.

The bar 266 is a member contained in groove portions 23b, 23c formed in the handle post 23. A spring 237 presses the bar 266 against the bottoms of the groove portions 23b, 23c.

Figure 35:
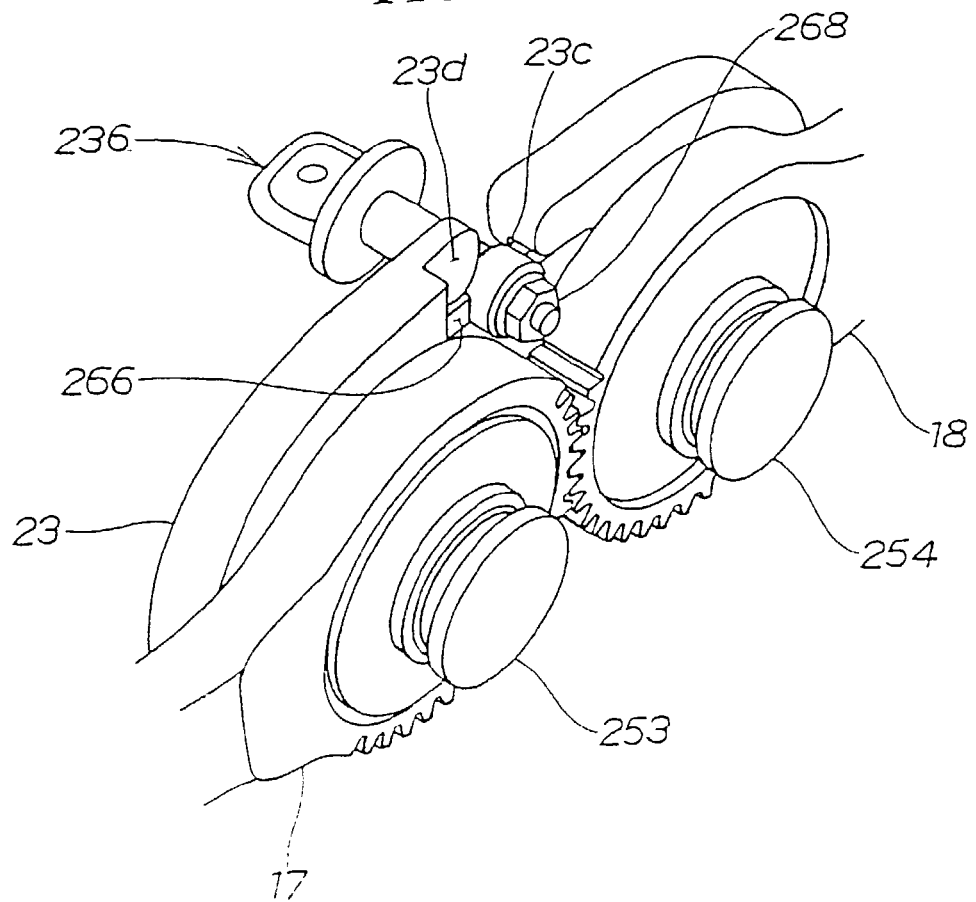
FIG. 35 is a perspective view showing major parts of the handles and a knob according to the present invention.

FIG. 35 is a perspective view showing major portions of the handles and the knob according to the present invention, and shows the condition where the bar 266 fitted to the knob 236 is contained in the groove portions 23b, 23c (symbol 23b is not shown) provided in the handle post 23.

The handle post 23 is a member provided with step portions 23d, 23e (symbol 23e is not shown; detailed later), adjacently to the groove portions 23b, 23c.

The action of the handle support mechanism 227 described above will be described below.

Figures 36A, 36B, 36C:
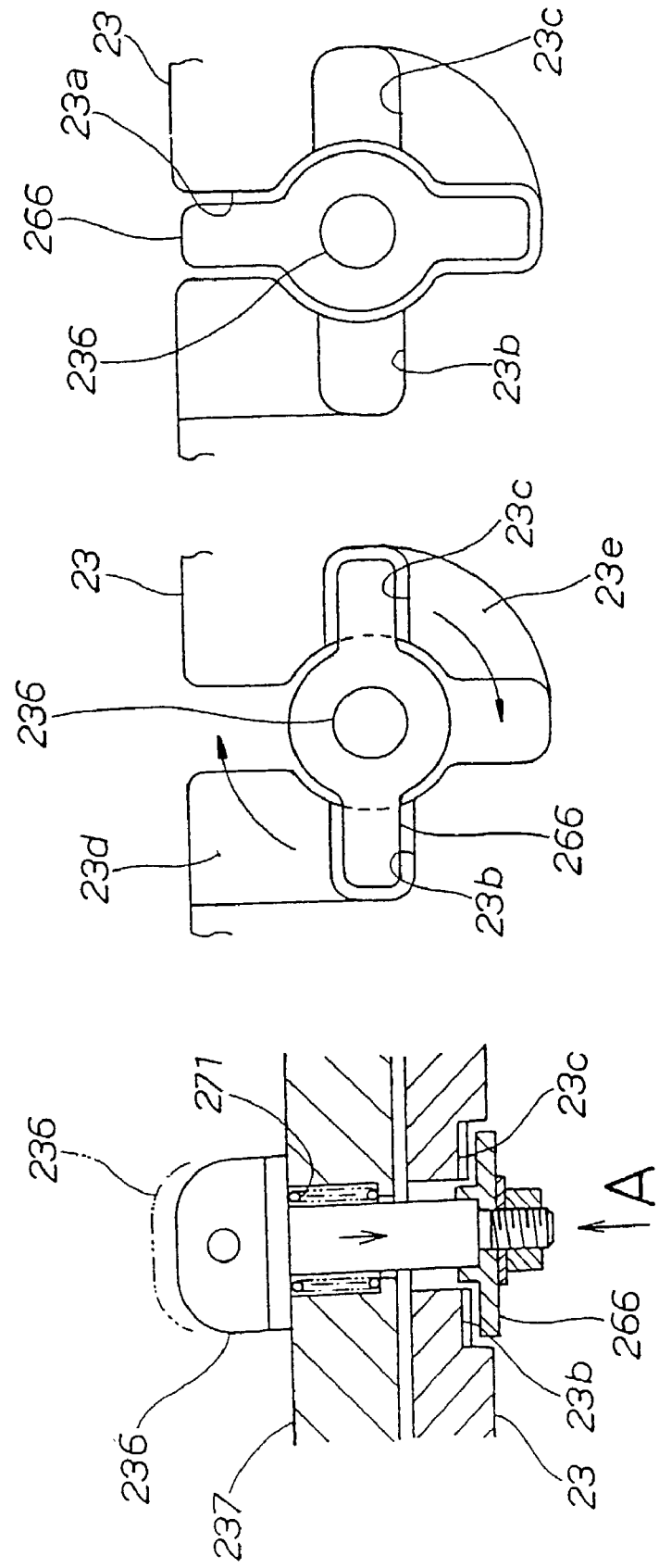
FIGS. 36(a), (b) and (c) are views illustrating the action of the knob of a handle support mechanism according to the present invention.

FIGS. 36(a), (b), and (c) are views illustrating the action of the knob of the handle support mechanism according to the present invention. FIG. 36(a) is a sectional view, and FIGS. 36(b) and (c) ale views of the bar 266 and the handle post 23 from direction A of FIG. 36(a).

In FIG. 36(a), the knob 236 is pushed, whereby the bar 266 is lifted from the groove portions 23b, 23c of the handle post 23.

In FIG. 36(b), with the bar 266 lifted from the groove portions 23b, 23c, the knob 236 becomes rotatable. Then, the knob 236 is rotated in the direction of the arrow. Since the above-mentioned step portions 23d, 23e are present in the direction of the arrow of each of the groove portions 23b, 23c, the knob 236 can be rotated without interference with the handle post 23.

In FIG. 36(c), the knob 236 is shown as being rotated by 90° from the position of FIG. 36(b). The bar 266 comes into the condition of being disposed along the cutout portion 23a of the handle post 23, whereby the knob 236 becomes capable of coming out of the cutout portion 23a of the handle post 23 together with the handle clamp lever 237 (See FIG. 36(a)), namely, the connection between the handle post 23 and the handle clamp lever 237 is released by the knob 236.

Figure 37B:
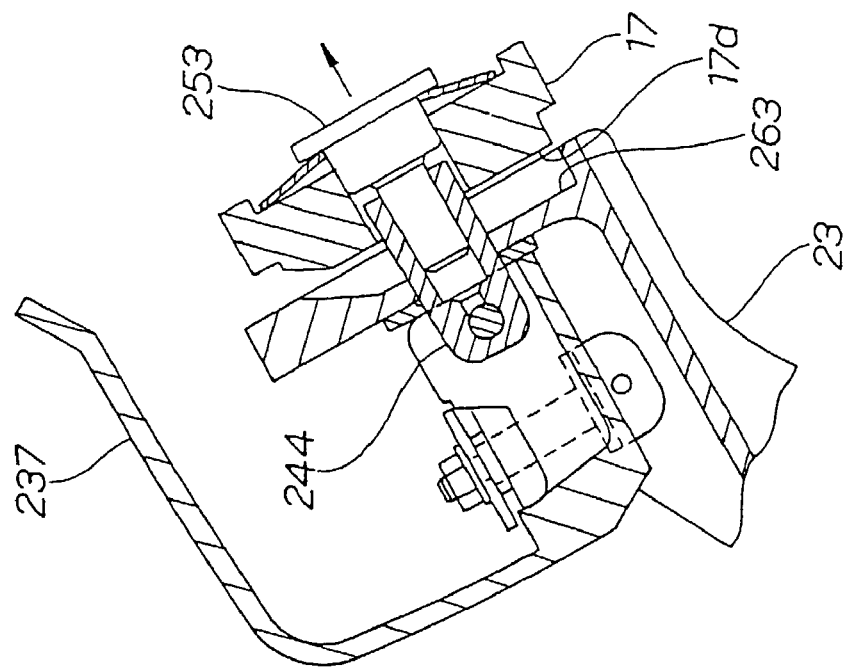
FIGS. 37(a) and (b) are views illustrating the actions of a handle clamp lever of the handle support mechanism and peripheral component parts according to the present invention.
Figure 37A:
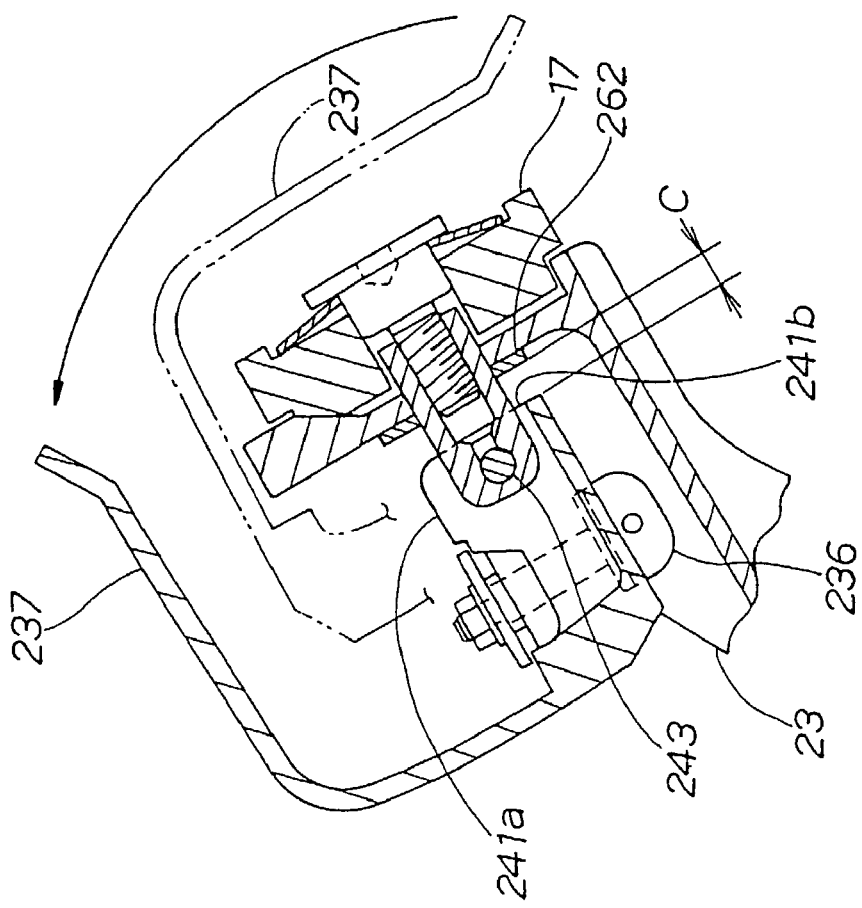

FIGS. 37(a) and (b) are views illustrating the actions of the handle clamp lever and peripheral component parts of the handle support mechanism according to the present invention. While description will be made below based on the constitution on the side of the handle 17, the same action applies also to the side of the handle 18.

In FIGS. 36(a), (b), and (c), the knob 236 is rotated to cancel the connection between the handle post 23 and the handle clamp lever 237, and, thereafter, in FIG. 37(a), the handle clamp lever 237 is kicked up in the direction of the arrow with the connection pin 243 as a center.

Returning to FIG. 33, the distance L1 between the first end portion 241a of the handle clamp lever 237 and the axis of the connection pin 243 is greater than the distance L2 between the second end portion 241b and the axis of the connection pin 243, and, therefore, in FIG. 37(a), a gap with a distance C is generated between the second end portion 241b and the washer 262 by the kick-up of the handle clamp lever 237.

With the gap with the distance C thus generated, in FIG. 37(b), the handle 17 can be moved in the direction of the arrow together with the nut member 244 and the center bolt 253, and the projected portion 17d of the handle 17 can be disengaged from the recessed portion 263 of the handle post 23, whereby restriction on the rotation of the handle 17 is eliminated, and the handle 17 can be folded.

Figure 38:
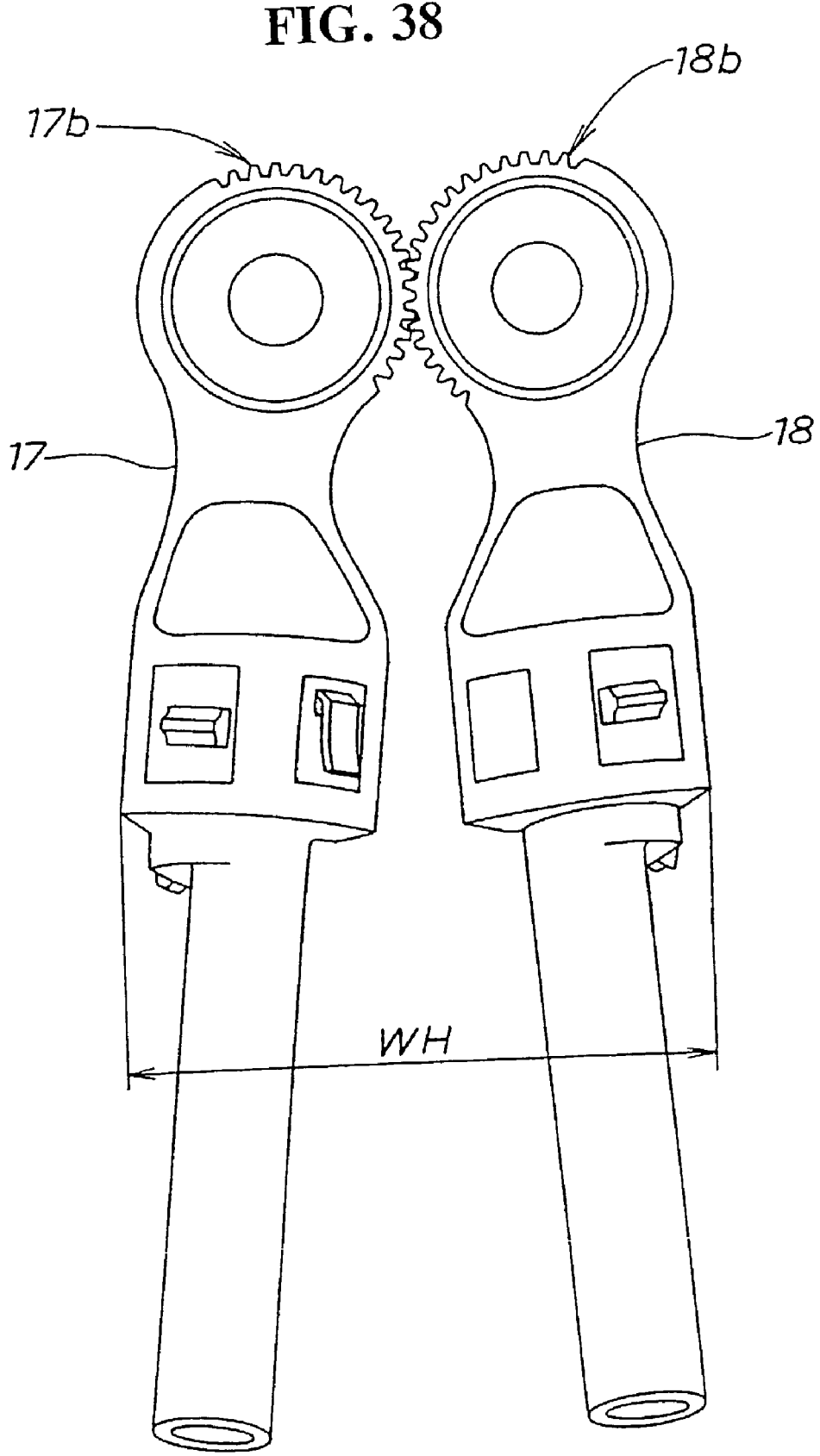
FIG. 38 is a front view showing the folded condition of the handles according to the present invention.

FIG. 38 is a front view showing the folded condition of the handles according to the present invention, and shows the condition where the handles 17, 18 are folded to the greatest extent.

Thus, by folding the handles 17, 18, the maximum width WH (The maximum width WH is smaller than the width of the above-mentioned number plate.) of the handles 17, 18 can be made to be very small, as compared with the maximum width of the handles 17, 18 before folding, which is markedly advantageous as to the containing space, particularly, the containing width in the case of mounting the two-wheel vehicle on a vehicle.

Figure 39:
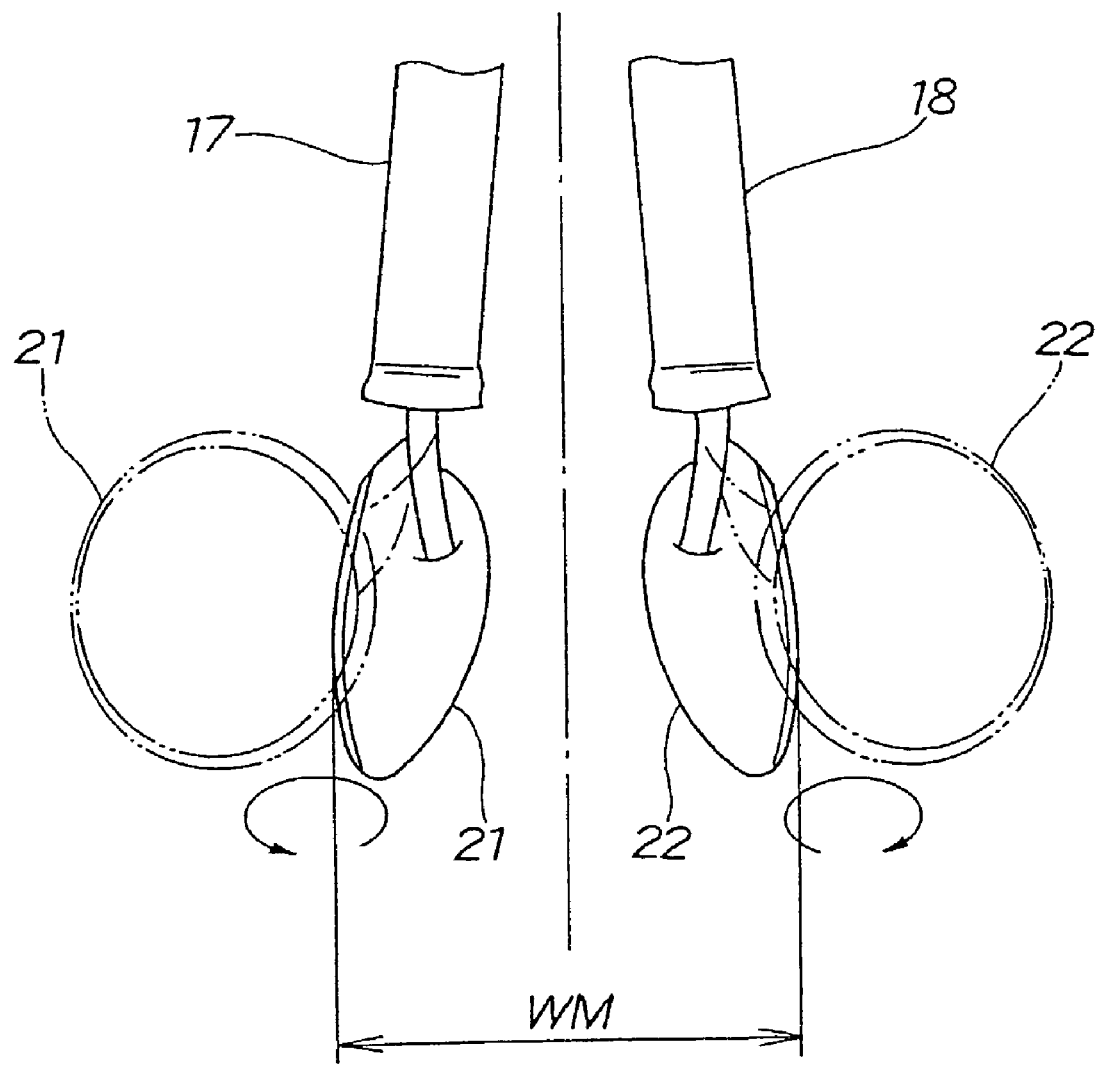
FIG. 39 is an illustration for illustrating the folding of rearview mirrors according to the present invention.

FIG. 39 illustrates the folding of the rearview mirrors according to the present invention. After the folding of the handles 17, 18 is completed, the rearview mirrors 21, 22 are rotated in the directions of the arrows so as to have substantially the same width as the width in the vehicle width direction of the handles 17, 18 (namely, the interval of the handles 17, 18). Here, after the rearview mirrors 21, 22 are rotated, the reflective surfaces of the rearview mirrors 21, 22 are directed to the lateral sides of the vehicle body. Where the maximum width of the rearview mirrors 21, 22 at this time is WM, the maximum width WM is smaller than the width of the above-mentioned number plate.

Figure 40:
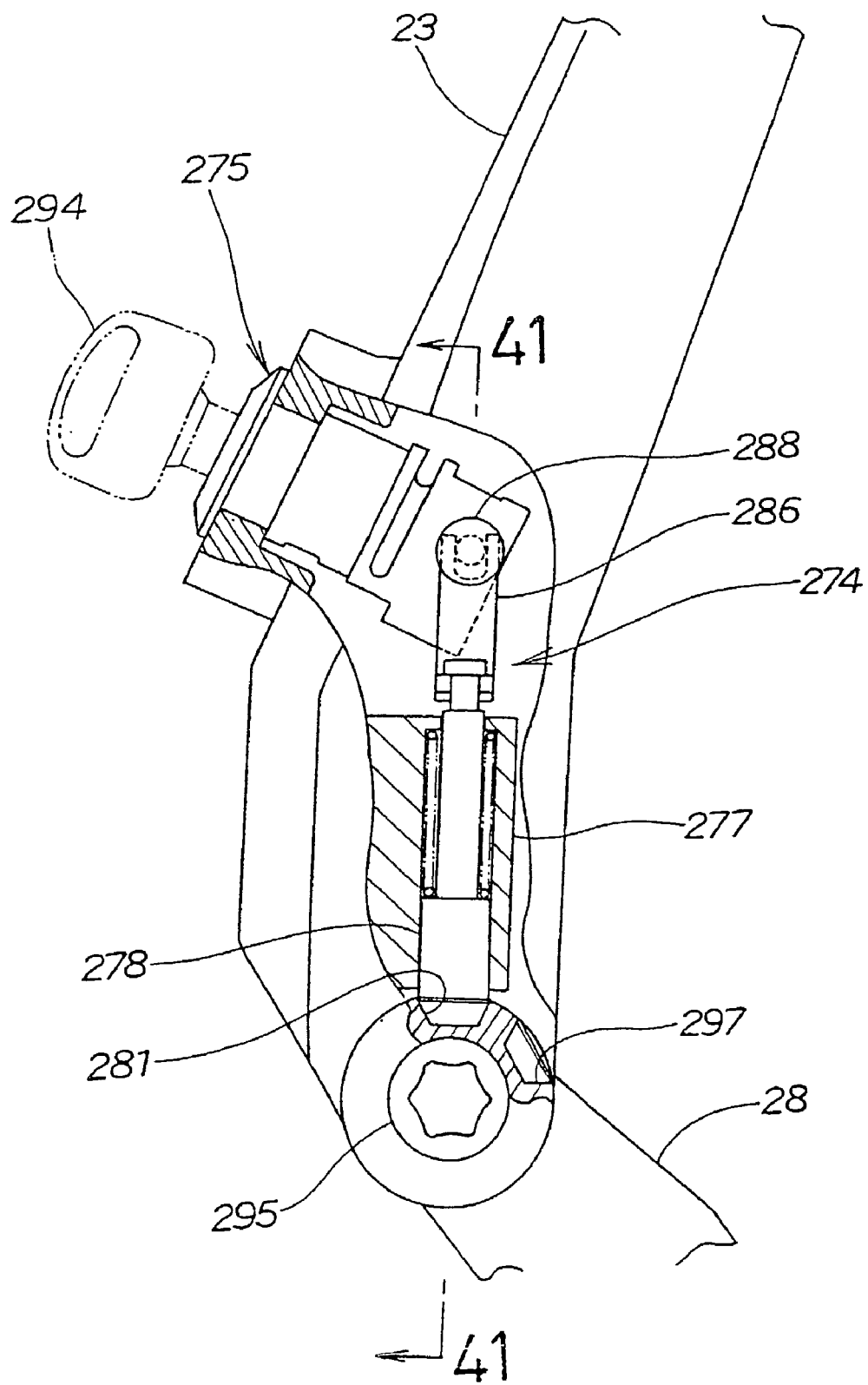
FIG. 40 is a side view (partly sectional) for illustrating a folding mechanism of a handle post of the two-wheel vehicle according to the present invention.

FIG. 40 is a side view (partly sectional) illustrating a folding mechanism for the handle post of the two-wheel vehicle according to the present invention. The handle post 23 is a member foldably fitted to the upper portion arm 28, and is provided with a handle post folding mechanism 274 for releasing the connection with the upper portion arm 28 and enabling folding, and a main switch 275, in the vicinity of a connecting portion for connection with the upper portion arm 28.

Figure 41:
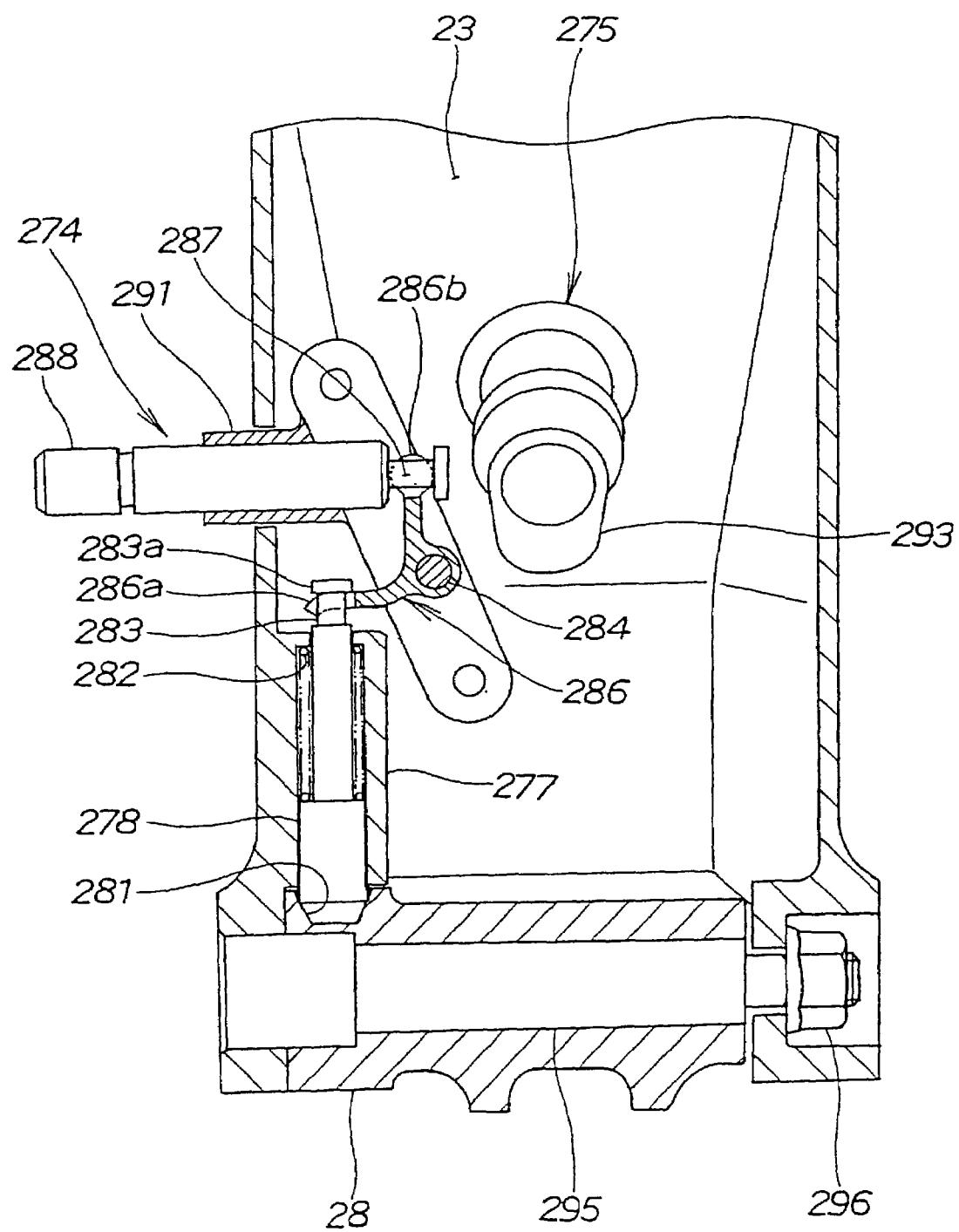
FIG. 41 is a sectional view taken along line 41—41 of FIG. 40.

FIG. 41 is a sectional view taken along line 41—41 of FIG. 40. The handle post folding mechanism 274 includes a cylinder portion 277 provided on the handle post 23, and a lock pin 278 movably inserted in the cylinder portion 277. Also included are a first lock pin insertion hole 281 provided in the upper portion arm 28 for inserting the tip end of the lock pin 278 therein, a spring 282 for pressing the lock pin 278 against the first lock pin insertion hole 281, an L-shaped arm 286 having its one end portion 286a connected to an end portion small diameter portion 283 (283a is a collar portion) of the lock pin 278 and being swingably fitted to a support shaft 284, a push rod 288 having a small diameter portion 287 connected to the other end portion 286b of the L-shaped arm 286, and a guide portion 291 for guiding the push rod 288.

An arm portion 293 is fitted to an end portion of the main switch 275, which is a member rotated integrally with a key 294 (See FIG. 40) when the key 294 inserted in the main switch 275 is turned. A socket bolt 295 connects the handle post 23 and the upper portion arm 28 to each other, a nut screw 296 connects to an end portion of the socket bolt 295, and a second lock pin insertion hole (See FIG. 40) is provided for inserting the tip end of the lock pin 278 when the handle post 23 is folded.

The action of the handle post folding mechanism 274 described above will be described below.

Figure 42A:
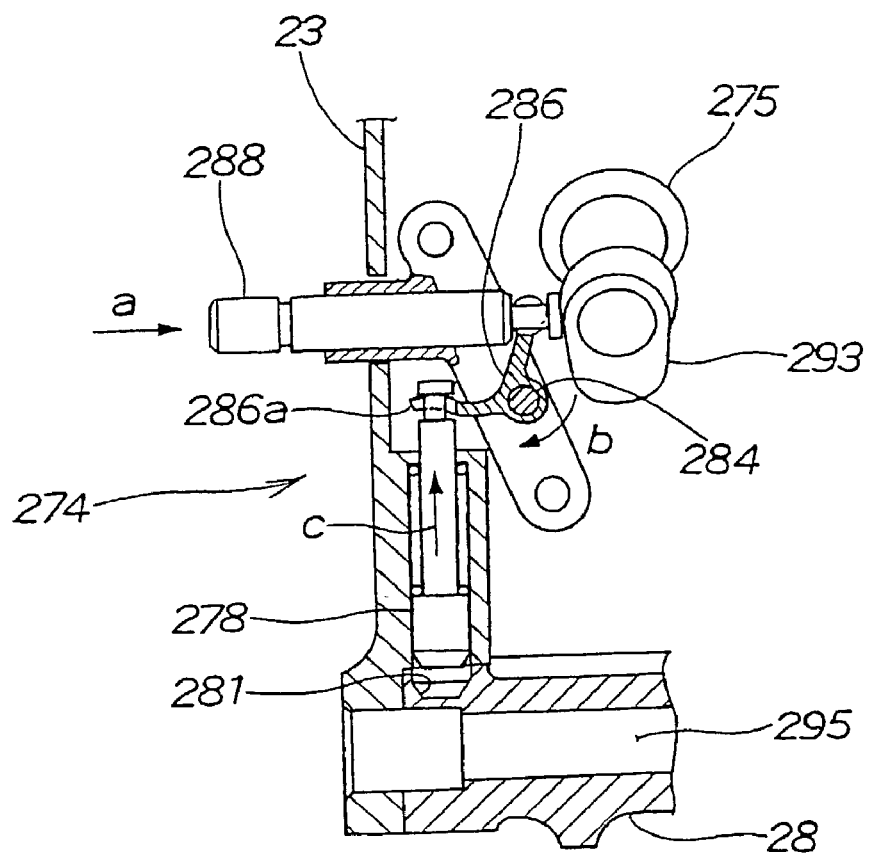
FIGS. 42(a) and (b) are first views illustrating the action of a handle folding mechanism according to the present invention.

FIGS. 42(a) and (b) are first views illustrating the action of the handle folding mechanism according to the present invention.

First, in FIG. 42(a), the push rod 288 is pushed in the direction of arrow a. By this, the L-shaped arm 286 connected to the tip end of the push rod 288 is swung in the direction of arrow b with the support shaft 284 as a center, and the lock pin 278 connected to the end portion 286a of the L-shaped arm 286 is moved in the direction of arrow c. As a result, the tip end of the lock pin 278 comes out of the first lock pin insertion hole 281, and the handle post 23 becomes swingable with reference to the upper portion arm 28.

Figure 42B:
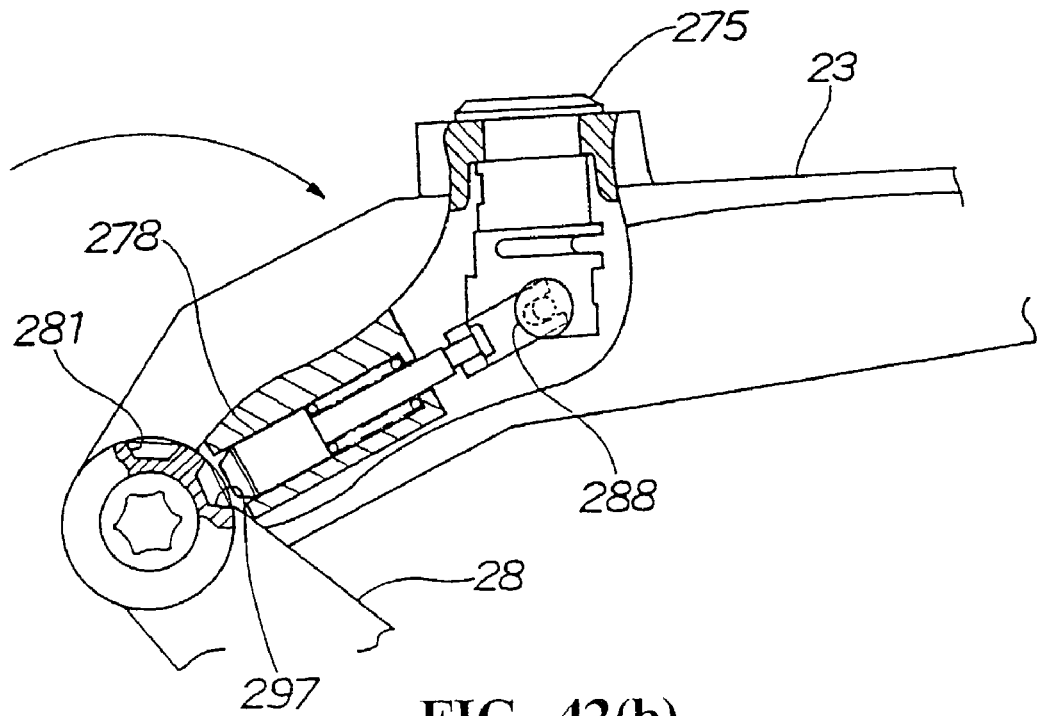

Then, as shown in FIG. 42(b), the handle post 23 is tilted down in the direction of the arrow, namely, the handle post 23 is folded. The tip end of the lock pin 278 fronts on the second lock pin insertion hole 297.

Figure 43A:
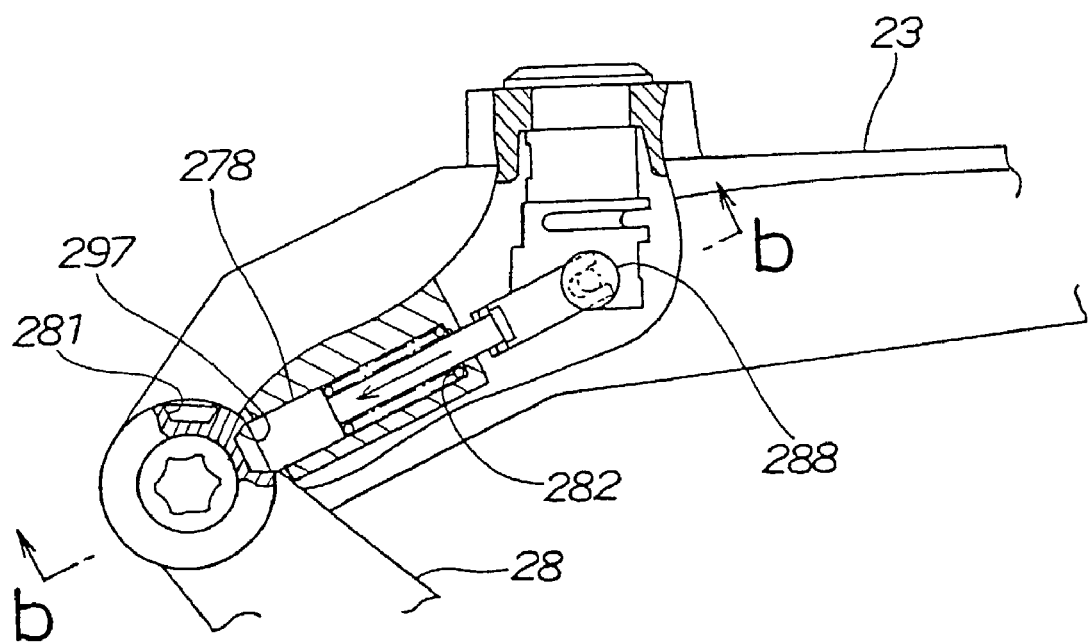
FIGS. 43(*a*) and (*b*) are second views illustrating the action of the handle folding mechanism according to the present invention.

FIGS. 43(a) and (b) are second views for illustrating the action of the handle folding mechanism according to the present invention.

In FIG. 43(a), the lock pin 278 is automatically moved in the direction of the arrow by an elastic force of the spring 282, and the tip end of the lock pin 278 is projected into the second lock pin insertion hole 297. At this time, the push rod 288 having been pushed in is automatically returned. By this, the folded handle post 23 comes into a locked condition, and is in the condition of being fixed to the upper portion arm 28.

Figure 43B:
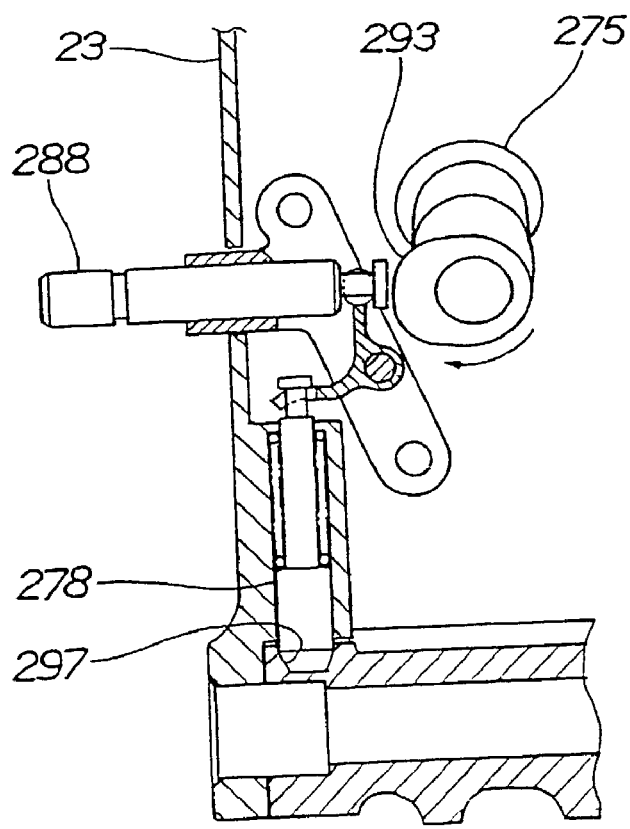

In FIG. 42(a), the arm portion 293 of the main switch 275 has been in the condition of extending to the lower side. But, in FIG. 43(b), when the key 294 (See FIG. 40) is inserted into the main switch 275 and the key 294 is turned to rotate the arm portion 293 in the direction of the arrow and to extend it to the side of the push rod 288, an end portion of the arm portion 293 approaches the tip end of the push rod 288, so that the push rod 288 cannot be pushed even if tried. Therefore, the lock pin 278 cannot be disengaged from the first lock pin insertion hole 297, and the folded handle post 23 cannot be erected.

This condition is the condition shown earlier in FIG. 3. Here, an end portion of the handle post 23 covers a front portion of the seat 13 together with base portions of the handles 17, 18, so that an operation of the stopper release lever (See FIG. 26) provided at a front portion of the seat 13 for sliding the seat 13 cannot be performed, and the luggage in the containing net 66 (See FIG. 2) under the seat 13 can be protected.

Figure 44:
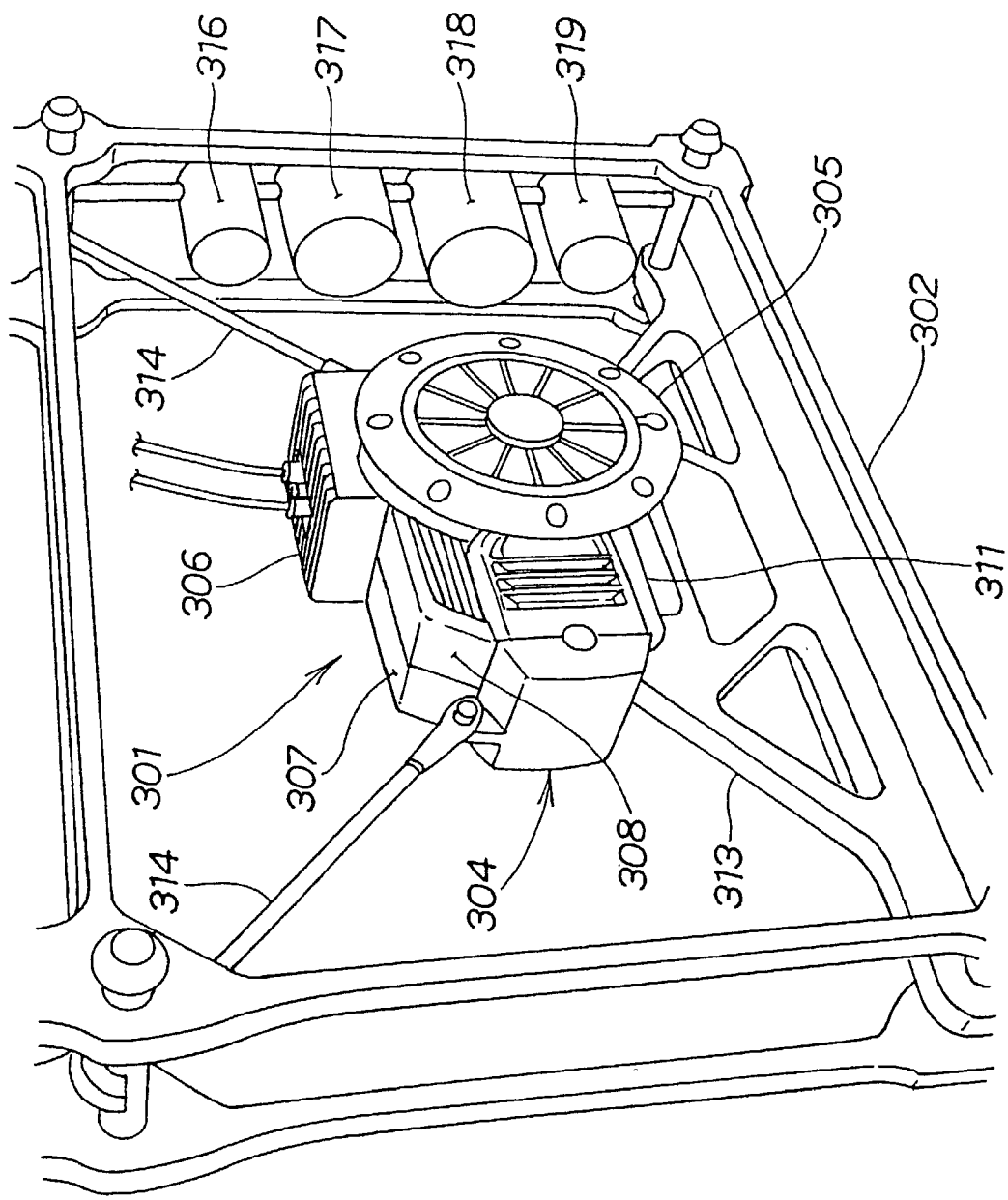
FIG. 44 is a perspective view for illustrating a major part of the four-wheel vehicle according to the present invention.

FIG. 44 is a perspective view for illustrating a major part of the four-wheel vehicle according to the present invention. An on-vehicle generator to be mounted in a lower portion space S of the side wall 74 of the four-wheel vehicle 70 shown in FIG. 4 will be described.

The on-vehicle generator 301 is a multi-pole alternator which is of a water-cooled 4-cycle engine integral type and incorporating a starter and which is fitted to a frame 302 in the side wall 74 (See FIG. 4). A battery charger is connected to an output terminal of the on-vehicle generator 301, and a battery of the two-wheel vehicle 10 (See FIG. 3) is connected to the battery charge, whereby the battery is charged.

FIG. 44 also shows an engine 304, a power meter 305 for indicating output, an inverter unit 306 for converting generated AC to DC and for raising the voltage, an air cleaner 307, a radiator 308, a muffler 311, a base 313 for fixing the on-vehicle generator 301, rods 314, 314 for supporting the on-vehicle generator 301, and tail lamps 316 to 319.

The engine 304 is provided with a fuel piping connected to a fuel tank of the four-wheel vehicle 70, and a fuel is supplied from the fuel tank to the engine 304.

The muffler 311 includes an exhaust port projected into the space under the floor in the vicinity of the side wall 74, for discharging exhaust gas to the outside.

Incidentally, the outer panel member according to claim 5 may be entirely transparent or translucent, or may be partially transparent or translucent.

The present invention, constituted as described above, displays the following effects.

The mounting structure for mounting foldable two-wheel vehicle on four-wheel vehicle according to the first aspect of the present invention, provides a two-wheel vehicle foldable to a width substantially equal to the width of a license number that can be contained in a vehicle body component member of a four-wheel vehicle. Therefore, the containing space at the time of mounting the two-wheel vehicle on the four-wheel vehicle can be made to be small, a vehicle compartment space of the four-wheel vehicle can be sufficiently secured, and the operation of mounting the two-wheel vehicle onto the four-wheel vehicle can be easily carried out.

A mounting structure for mounting foldable two-wheel vehicle on four-wheel vehicle according to the second aspect of the present invention, provides a foldable two-wheel vehicle having a structure in which a handle post is fitted to a front portion of a vehicle body so as to be foldable in the front-rear direction of the vehicle body, and handles are fitted to the handle post so as to be foldable in the vehicle width direction. Further, steps are fitted to lower portions of side portions of the vehicle body so as to be foldable in the vehicle width direction, a front wheel support member for supporting a front wheel is fitted to the vehicle body so as to be swingable to the rear side of the vehicle body, and a rear wheel support member for supporting a rear wheel is fitted to the vehicle body so as to be swingable to the front side of the vehicle body, whereby the two-wheel vehicle is foldable to a substantially rectangular parallelepiped form. Therefore, a containing space for the two-wheel vehicle provided on the side of the four-wheel vehicle may be substantially rectangular parallelepiped in shape, and the degree of freedom in designing the containing space can be increased.

A mounting structure for mounting foldable two-wheel vehicle on four-wheel vehicle according to the third aspect of the present invention, provide handles with rearview mirrors at end portions thereof, and the rearview mirrors are rotatably fitted to the handles so as to have an interval substantially equal to the interval in the vehicle width direction of the handles when the handles are folded. Therefore, the handle portions can be folded to a more compact form.

A mounting structure for mounting foldable two-wheel vehicle on four-wheel vehicle according to the fourth aspect of the present invention, provide a vehicle body component member of the four-wheel vehicle that is a side wall or a rear wall. Therefore, the two-wheel vehicle can be constituted as a strength member for the side wall or the rear wall, and, by containing the two-wheel vehicle with a small width in the side wall or the rear wall, it is possible to effectively utilize the compartment space.

A mounting structure for mounting foldable two-wheel vehicle on four-wheel vehicle according to the fifth aspect of the present invention, provides a side wall or a rear wall of the four-wheel vehicle which includes an outer panel member permitting the inside to be seen therethrough. Therefore, the two-wheel vehicle mounted on the four-wheel vehicle can be visually recognized from the outside, the four-wheel vehicle permitting the two-wheel vehicle mounted thereon to be recognized at a glance as having a characteristic design. As such, the attractiveness of the article of commerce can be enhanced.

A mounting structure for mounting foldable two-wheel vehicle on four-wheel vehicle according to the sixth aspect of the present invention, provides a vehicle body component member of the four-wheel vehicle that is a door movable to the outside. Therefore, for example, by opening the door and containing the two-wheel vehicle into the door through an end portion of the door, the operation of mounting the two-wheel vehicle can be easily carried out.

A mounting structure for mounting foldable two-wheel vehicle on four-wheel vehicle according to the seventh aspect of the present invention, provides that the door includes a rail member which can be drawn out to serve as a bridge between the ground and the door at the time of mounting the two-wheel vehicle. Therefore, with the two-wheel vehicle moved on the rail member, the two-wheel vehicle can be mounted easily.

According to the eighth aspect of the present invention, the rail member has a lifter structure, whereby the rail member can be raised and lowered by an electric motor. Therefore, the rail member can be made to be an electric lifter, and the operations of loading and unloading the two-wheel vehicle becomes easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure for mounting a foldable two-wheel vehicle on a four-wheel vehicle, comprising:
a vehicle body component member of said four-wheel vehicle, capable of containing said foldable two-wheel vehicle which has been folded to reduce at least a width dimension of the two-wheel vehicle,
wherein the vehicle body component member is a side wall fitted to a side body constituting the vehicle body of the four-wheel vehicle, an outer profile and an inner profile of said side wall including inner and outer rectangular-shaped frames made of pipe material,
wherein at least the width dimension of the folded two-wheel vehicle is less than a width of a rear end of said side wall and is less than a distance between the inner and the outer rectangular-shaped frames, and
wherein the rear end of said side wall is open in order to allow the folded two-wheel vehicle to enter into said side wall, so that after entering the rear end of the side wall, the folded two-wheel vehicle can be contained between the inner and the outer rectangular-shaped frames of the rear end of the side wall.

2. The mounting structure for mounting a two-wheel vehicle on a four-wheel vehicle according to claim 1, wherein said side wall of said four-wheel vehicle comprises an outer panel member through which an inside of said vehicle body component member can be seen.

3. The mounting structure for mounting a two-wheel vehicle on a four-wheel vehicle according to claim 1, wherein said side wall fitted to the side body of said four-wheel vehicle is a door movable about a vertical axis thereof to an outside of the four-wheel vehicle.

4. The mounting structure for mounting a two-wheel vehicle on a four-wheel vehicle according to claim 3, wherein said side wall comprises a rail member which can be drawn out and can be set between a ground surface and said door to form a bridge for mounting said two-wheel vehicle onto said four-wheeled vehicle.

5. The mounting structure for mounting a two-wheel vehicle on a four-wheel vehicle according to claim 4, wherein said rail member has a lifter structure, and said rail member can be raised and lowered by an electric motor.

6. The mounting structure for mounting a two-wheel vehicle on a four-wheel vehicle according to claim 5, the lifter structure further comprising:
a parallel link fitted to the rail member; and
a slide plate upon which the two-wheel vehicle can be mounted,
the slide plate being capable of sliding onto said parallel link, and including a stopper member for restraining the two-wheel vehicle.

7. The mounting structure for mounting a two-wheel vehicle on a four wheel vehicle according to claim 4, further comprising a rollable truck for mounting said two-wheel vehicle thereon, and said two-wheel vehicle and said truck capable of being pushed together into said door.

8. A mounting structure for mounting a foldable two-wheel vehicle on a four-wheel vehicle, comprising:
a door fitted into a side wall of said four-wheel vehicle, capable of containing said foldable two-wheel vehicle which has been folded to reduce at least a width dimension of the two-wheel vehicle,
wherein an outer profile and an inner profile of the door include an outer and an inner rectangular-shaped frame, respectively, each being made of pipe material,
wherein at least the width dimension of the folded two-wheel vehicle is less than a distance between the inner and the outer rectangular-shaped frames, and
wherein at least a rear end of said door is open in order to allow the folded two-wheel vehicle to enter into said door, so that the folded two-wheel vehicle can be contained between the inner and the outer rectangular-shaped frames of the door in the side wall.

9. A combination of the mounting structure for mounting a foldable two-wheel vehicle on a four-wheel vehicle according to claim 8 and said foldable two-wheel vehicle, said foldable two-wheel vehicle comprising:
a handle post fitted to a front portion of a body of the two-wheel vehicle so as to be foldable in a front-rear direction of said body;
handles fitted to said handle post so as to be foldable in the vehicle width direction; steps fitted to lower portions of side portions of said body so as to be foldable in the vehicle width direction;
a front wheel support member for supporting a front wheel fitted to said body so as to be swingable to a rear side of said body; and
a rear wheel support member for supporting a rear wheel fitted to said body so as to be swingable to a front side of said body,
wherein said foldable two-wheel vehicle is foldable into a substantially rectangular parallelepiped form.

10. A combination of the mounting structure for mounting a two-wheel vehicle on a four-wheel vehicle according to claim 9 and said foldable two wheel-vehicle, wherein said handles are provided with rearview mirrors at end portions thereof, and said rearview mirrors are rotatably fitted to said handles so as to have an interval substantially equal to the interval in the vehicle width direction of said handles when said handles are folded.

11. The mounting structure for mounting a two-wheel vehicle on a four-wheel vehicle according to claim 8, wherein the open rear end of said door allows the two-wheel vehicle to enter the door along one side of the four-wheel vehicle.

12. The mounting structure for mounting a two-wheel vehicle on a four-wheel vehicle according to claim 11, wherein said door of said four-wheel vehicle comprises an outer panel member through which an inside of said door can be seen.

13. The mounting structure for mounting a two-wheel vehicle on a four-wheel vehicle according to claim 8, wherein said door of said four-wheel vehicle is movable to an outside of a side body of the four-wheel vehicle.

14. The mounting structure for mounting a two-wheel vehicle on a four-wheel vehicle according to claim 13, wherein said door comprises a rail member which can be drawn out and can be set between a ground surface and said door to form a bridge for mounting said two-wheel vehicle onto said four-wheeled vehicle.

15. The mounting structure for mounting a two-wheel vehicle on a four-wheel vehicle according to claim 14, wherein said rail member has a lifter structure, and said rail member can be raised and lowered by an electric motor.

16. The mounting structure for mounting a two-wheel vehicle on a four wheel vehicle according to claim 15, the lifter structure further comprising:
 a parallel link fitted to the rail member; and
 a slide plate upon which the two-wheel vehicle can be mounted,
 the slide plate being capable of sliding onto said parallel link, and including a stopper member for restraining the two-wheel vehicle.

17. The mounting structure for mounting a two-wheel vehicle on a four-wheel vehicle according to claim 14, further comprising a rollable truck for mounting said two-wheel vehicle thereon, and said two-wheel vehicle and said truck capable of being pushed together into said door.

* * * * *